US012638913B2

(12) United States Patent
Rickwald et al.

(10) Patent No.: US 12,638,913 B2
(45) Date of Patent: May 26, 2026

(54) DEVICES, METHODS, AND GRAPHICAL USER INTERFACES FOR CONTROLLING AVATARS WITHIN THREE-DIMENSIONAL ENVIRONMENTS

(71) Applicant: Apple Inc., Cupertino, CA (US)

(72) Inventors: Jason D. Rickwald, Santa Cruz, CA (US); Andrew R. Bacon, Vancouver (CA); Kristi E. Bauerly, Los Altos, CA (US); Rupert Burton, San Francisco, CA (US); Jordan A. Cazamias, San Francisco, CA (US); Tong Chen, Bellevue, WA (US); Shih-Sang Chiu, San Francisco, CA (US); Stephen O. Lemay, Palo Alto, CA (US); Jonathan Perron, Felton, CA (US); William A. Sorrentino, III, Mill Valley, CA (US); Giancarlo Yerkes, San Francisco, CA (US); Alan C. Dye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/972,738

(22) Filed: Dec. 6, 2024

(65) Prior Publication Data

US 2025/0103132 A1 Mar. 27, 2025

Related U.S. Application Data

(63) Continuation of application No. 18/241,802, filed on Sep. 1, 2023, now Pat. No. 12,287,913.

(60) Provisional application No. 63/470,879, filed on Jun. 3, 2023, provisional application No. 63/404,022, filed on Sep. 6, 2022.

(51) Int. Cl.
*G06F 3/01* (2006.01)
*G06T 19/00* (2011.01)

(52) U.S. Cl.
CPC ............ *G06F 3/011* (2013.01); *G06T 19/006* (2013.01)

(58) Field of Classification Search
CPC .... G06F 3/011; G06F 3/04842; G06F 3/0346; G06T 19/006
USPC ........................................ 715/810
See application file for complete search history.

(56) References Cited

U.S. PATENT DOCUMENTS

| | | | |
|---|---|---|---|
| 3,633,354 A | 1/1972 | Stemmler |
| 4,847,819 A | 7/1989 | Hong |
| 4,945,521 A | 7/1990 | Klaus |
| 5,383,165 A | 1/1995 | Vaucher |

(Continued)

FOREIGN PATENT DOCUMENTS

| | | |
|---|---|---|
| AU | 2015101639 A4 | 12/2015 |
| AU | 2017100683 B4 | 1/2018 |

(Continued)

OTHER PUBLICATIONS

Corrected Notice of Allowance received for U.S. Appl. No. 17/031,671, mailed on Mar. 19, 2025, 3 pages.

(Continued)

*Primary Examiner* — Abdul-Samad A Adediran
(74) *Attorney, Agent, or Firm* — YHE Law LLP

(57) ABSTRACT

The present disclosure generally relates to techniques and user interfaces for controlling and displaying representations of user in environments, such as during a live communication session and/or a live collaboration session.

49 Claims, 26 Drawing Sheets

900

902
While in a real-time communication session, display, via the display generation component, a representation of a first user, where:

904
In accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner.

906
In accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

(56)  References Cited

U.S. PATENT DOCUMENTS

| | | | |
|---|---|---|---|
| 6,084,598 A | 7/2000 | Chekerylla |
| 6,621,524 B1 | 9/2003 | Tijima et al. |
| 7,180,524 B1 | 2/2007 | Axelrod |
| 7,227,976 B1 | 6/2007 | Jung et al. |
| 7,716,057 B2 | 5/2010 | Horvitz |
| 7,751,285 B1 | 7/2010 | Cain et al. |
| 7,840,668 B1 | 11/2010 | Sylvain et al. |
| 7,908,554 B1 | 3/2011 | Blattner |
| 8,156,060 B2 | 4/2012 | Borzestowski et al. |
| 8,169,438 B1 | 5/2012 | Baraff et al. |
| 8,234,218 B2 | 7/2012 | Robinson et al. |
| 8,280,979 B2 | 10/2012 | Kunz et al. |
| 8,295,546 B2 | 10/2012 | Craig et al. |
| 8,390,628 B2 | 3/2013 | Harding et al. |
| 8,423,089 B2 | 4/2013 | Song et al. |
| 8,506,396 B1 | 8/2013 | Snyder et al. |
| 8,896,652 B2 | 11/2014 | Ralston |
| 9,035,999 B2 | 5/2015 | Carpenter et al. |
| 9,041,764 B2 | 5/2015 | Wang et al. |
| 9,094,576 B1 | 7/2015 | Karakotsios |
| 9,153,031 B2 | 10/2015 | El-Saban et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,264,660 B1 | 2/2016 | Petterson et al. |
| 9,298,257 B2 | 3/2016 | Hwang et al. |
| 9,298,263 B2 | 3/2016 | Geisner et al. |
| 9,349,414 B1 | 5/2016 | Furment et al. |
| 9,411,506 B1 | 8/2016 | Marra et al. |
| 9,448,708 B1 | 9/2016 | Bennett et al. |
| 9,461,876 B2 | 10/2016 | Van Dusen et al. |
| 9,542,070 B2 | 1/2017 | Xu et al. |
| 9,542,422 B2 | 1/2017 | Duggal et al. |
| 9,547,763 B1 | 1/2017 | Avital |
| 9,602,559 B1 | 3/2017 | Barros et al. |
| 9,625,987 B1 | 4/2017 | Lapenna et al. |
| 9,628,416 B2 | 4/2017 | Henderson |
| 9,638,730 B2 | 5/2017 | Umamoto |
| 9,686,466 B1 | 6/2017 | Billinghurst et al. |
| 9,686,497 B1 | 6/2017 | Terry |
| 9,760,976 B2 | 9/2017 | Kameyama |
| 9,786,084 B1 | 10/2017 | Bhat et al. |
| 9,948,589 B2 | 4/2018 | Gonnen et al. |
| 9,949,697 B2 | 4/2018 | Iscoe et al. |
| 10,062,133 B1 | 8/2018 | Mishra et al. |
| 10,095,385 B2 | 10/2018 | Walkin et al. |
| 10,139,218 B2 | 11/2018 | Matsushita |
| 10,235,408 B1 | 3/2019 | Lao et al. |
| 10,270,983 B1 | 4/2019 | Van Os et al. |
| 10,289,265 B2 | 5/2019 | Kulkarni |
| 10,325,416 B1 | 6/2019 | Scapel et al. |
| 10,325,417 B1 | 6/2019 | Scapel et al. |
| 10,341,612 B2 | 7/2019 | Imaoka |
| 10,356,136 B2 | 7/2019 | Van Wie et al. |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,410,434 B1 | 9/2019 | Scapel et al. |
| 10,505,726 B1 | 12/2019 | Andon et al. |
| 10,521,091 B2 | 12/2019 | Anzures et al. |
| 10,521,948 B2 | 12/2019 | Rickwald et al. |
| 10,580,221 B2 | 3/2020 | Scapel et al. |
| 10,620,590 B1 | 4/2020 | Guzman et al. |
| 10,628,985 B2 | 4/2020 | Mishra et al. |
| 10,657,695 B2 | 5/2020 | Chand et al. |
| 10,659,405 B1 | 5/2020 | Chang et al. |
| 10,698,575 B2 | 6/2020 | Walkin et al. |
| 10,708,545 B2 | 7/2020 | Rivard et al. |
| 10,789,753 B2 | 9/2020 | Miller et al. |
| 10,796,480 B2 | 10/2020 | Chen et al. |
| 10,798,035 B2 | 10/2020 | Lewis et al. |
| 10,810,409 B2 | 10/2020 | Bacivarov et al. |
| 10,811,055 B1 | 10/2020 | Kimber et al. |
| 10,817,981 B1 | 10/2020 | Belkin |
| 10,845,968 B2 | 11/2020 | Scapel et al. |
| 10,855,910 B2 | 12/2020 | Tano et al. |
| 10,861,248 B2 | 12/2020 | Scapel et al. |
| 10,902,661 B1 | 1/2021 | Mourkogiannis et al. |
| 11,061,372 B1 | 7/2021 | Chen et al. |
| 11,107,261 B2 | 8/2021 | Scapel et al. |
| 11,188,190 B2 | 11/2021 | Blackstock et al. |
| 11,282,174 B1 | 3/2022 | Demaio |
| 11,729,339 B2 | 8/2023 | Morii |
| 11,798,246 B2 | 10/2023 | Lee et al. |
| 12,033,296 B2 | 7/2024 | Scapel et al. |
| 2001/0019330 A1 | 9/2001 | Bickmore et al. |
| 2001/0050689 A1 | 12/2001 | Park |
| 2002/0054157 A1 | 5/2002 | Hayashi et al. |
| 2002/0135581 A1 | 9/2002 | Russell et al. |
| 2003/0135769 A1 | 7/2003 | Loughran |
| 2003/0140309 A1 | 7/2003 | Saito et al. |
| 2003/0157983 A1 | 8/2003 | Kobayashi et al. |
| 2003/0206170 A1 | 11/2003 | Bickmore et al. |
| 2004/0075699 A1 | 4/2004 | Franchi et al. |
| 2004/0179039 A1 | 9/2004 | Blattner et al. |
| 2004/0203342 A1 | 10/2004 | Sibecas et al. |
| 2004/0225966 A1 | 11/2004 | Besharat et al. |
| 2005/0122543 A1 | 6/2005 | Walker |
| 2005/0124389 A1 | 6/2005 | Yang |
| 2005/0174216 A1 | 8/2005 | Lintell |
| 2005/0190653 A1 | 9/2005 | Chen |
| 2005/0248574 A1 | 11/2005 | Ashtekar et al. |
| 2005/0257042 A1 | 11/2005 | Sierra et al. |
| 2005/0261031 A1 | 11/2005 | Seo et al. |
| 2006/0020904 A1 | 1/2006 | Aaltonen et al. |
| 2006/0046684 A1 | 3/2006 | Kameyama |
| 2006/0166708 A1 | 7/2006 | Kim et al. |
| 2006/0188144 A1 | 8/2006 | Sasaki et al. |
| 2006/0294465 A1 | 12/2006 | Ronen et al. |
| 2007/0003915 A1 | 1/2007 | Templeman |
| 2007/0024614 A1 | 2/2007 | Tam et al. |
| 2007/0052851 A1 | 3/2007 | Ochs et al. |
| 2007/0113181 A1 | 5/2007 | Blattner et al. |
| 2007/0168863 A1 | 7/2007 | Blattner et al. |
| 2007/0171091 A1 | 7/2007 | Nisenboim et al. |
| 2007/0192718 A1 | 8/2007 | Voorhees et al. |
| 2007/0226653 A1 | 9/2007 | Moore et al. |
| 2007/0260984 A1 | 11/2007 | Marks et al. |
| 2008/0052242 A1 | 2/2008 | Merritt et al. |
| 2008/0095470 A1 | 4/2008 | Chao et al. |
| 2008/0098031 A1 | 4/2008 | Ducharme |
| 2008/0158232 A1 | 7/2008 | Shuster |
| 2008/0201438 A1 | 8/2008 | Mandre et al. |
| 2008/0250315 A1 | 10/2008 | Eronen et al. |
| 2008/0298571 A1 | 12/2008 | Kurtz et al. |
| 2009/0027337 A1 | 1/2009 | Hildreth |
| 2009/0031240 A1 | 1/2009 | Hildreth |
| 2009/0044113 A1 | 2/2009 | Jones et al. |
| 2009/0066817 A1 | 3/2009 | Sakamaki |
| 2009/0077497 A1 | 3/2009 | Cho et al. |
| 2009/0144173 A1 | 6/2009 | Mo et al. |
| 2009/0144639 A1 | 6/2009 | Nims et al. |
| 2009/0201297 A1 | 8/2009 | Johansson |
| 2009/0202114 A1 | 8/2009 | Morin et al. |
| 2009/0216691 A1 | 8/2009 | Borzestowski et al. |
| 2009/0233650 A1 | 9/2009 | Hosono |
| 2009/0251484 A1 | 10/2009 | Zhao et al. |
| 2009/0254843 A1 | 10/2009 | Van et al. |
| 2009/0254859 A1 | 10/2009 | Arrasvuori et al. |
| 2009/0254862 A1 | 10/2009 | Viginisson et al. |
| 2009/0271705 A1 | 10/2009 | Sheng et al. |
| 2009/0297022 A1 | 12/2009 | Pettigrew et al. |
| 2009/0300513 A1 | 12/2009 | Nims et al. |
| 2009/0300525 A1 | 12/2009 | Jolliff et al. |
| 2009/0325701 A1 | 12/2009 | Andres Del Valle |
| 2010/0009747 A1 | 1/2010 | Reville et al. |
| 2010/0030660 A1 | 2/2010 | Edwards |
| 2010/0035682 A1 | 2/2010 | Gentile et al. |
| 2010/0097375 A1 | 4/2010 | Tadaishi et al. |
| 2010/0123915 A1 | 5/2010 | Kashimoto |
| 2010/0124941 A1 | 5/2010 | Cho |
| 2010/0149573 A1 | 6/2010 | Pat et al. |

(56)             References Cited

U.S. PATENT DOCUMENTS

| | | |
|---|---|---|
| 2010/0153847 A1 | 6/2010 | Fama |
| 2010/0169801 A1 | 7/2010 | Blattner et al. |
| 2010/0188426 A1 | 7/2010 | Ohmori et al. |
| 2010/0203968 A1 | 8/2010 | Gill et al. |
| 2010/0211899 A1 | 8/2010 | Fujioka |
| 2010/0218089 A1 | 8/2010 | Chao et al. |
| 2010/0225773 A1 | 9/2010 | Lee |
| 2010/0257469 A1 | 10/2010 | Kim et al. |
| 2010/0277470 A1 | 11/2010 | Margolis |
| 2010/0302138 A1 | 12/2010 | Poot et al. |
| 2010/0317410 A1 | 12/2010 | Song et al. |
| 2011/0007174 A1 | 1/2011 | Bacivarov et al. |
| 2011/0009241 A1 | 1/2011 | Lane et al. |
| 2011/0025689 A1 | 2/2011 | Perez et al. |
| 2011/0072394 A1 | 3/2011 | Victor et al. |
| 2011/0074807 A1 | 3/2011 | Inada et al. |
| 2011/0119610 A1 | 5/2011 | Hackborn et al. |
| 2011/0175809 A1 | 7/2011 | Markovic et al. |
| 2011/0221755 A1 | 9/2011 | Geisner et al. |
| 2011/0239115 A1 | 9/2011 | Williams et al. |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1 | 10/2011 | Van Os |
| 2011/0256848 A1 | 10/2011 | Bok et al. |
| 2011/0304632 A1 | 12/2011 | Evertt et al. |
| 2012/0017180 A1 | 1/2012 | Flik et al. |
| 2012/0069028 A1 | 3/2012 | Bouguerra |
| 2012/0075328 A1 | 3/2012 | Goossens |
| 2012/0079378 A1 | 3/2012 | Goossens |
| 2012/0113762 A1 | 5/2012 | Frost |
| 2012/0174029 A1 | 7/2012 | Bastide et al. |
| 2012/0206452 A1 | 8/2012 | Geisner et al. |
| 2012/0210263 A1 | 8/2012 | Perry et al. |
| 2012/0256967 A1 | 10/2012 | Baldwin et al. |
| 2012/0293686 A1 | 11/2012 | Karn et al. |
| 2012/0299945 A1 | 11/2012 | Aarabi |
| 2012/0309520 A1 | 12/2012 | Evertt et al. |
| 2012/0314047 A1 | 12/2012 | Kasahara et al. |
| 2012/0319985 A1 | 12/2012 | Moore et al. |
| 2013/0015946 A1 | 1/2013 | Lau et al. |
| 2013/0038759 A1 | 2/2013 | Jo et al. |
| 2013/0080287 A1 | 3/2013 | Currie et al. |
| 2013/0101164 A1 | 4/2013 | Leclerc et al. |
| 2013/0113956 A1 | 5/2013 | Anderson et al. |
| 2013/0121119 A1 | 5/2013 | Umamoto |
| 2013/0135315 A1 | 5/2013 | Bares et al. |
| 2013/0141513 A1 | 6/2013 | Setton et al. |
| 2013/0147933 A1 | 6/2013 | Kulas et al. |
| 2013/0157646 A1 | 6/2013 | Ferren et al. |
| 2013/0159900 A1 | 6/2013 | Pendharkar |
| 2013/0160141 A1 | 6/2013 | Tseng et al. |
| 2013/0194378 A1 | 8/2013 | Brown |
| 2013/0198210 A1 | 8/2013 | Lee et al. |
| 2013/0201104 A1 | 8/2013 | Ptucha et al. |
| 2013/0227651 A1 | 8/2013 | Schultz et al. |
| 2013/0234964 A1 | 9/2013 | Kim et al. |
| 2013/0238686 A1 | 9/2013 | O'Donoghue et al. |
| 2013/0286161 A1 | 10/2013 | Lv et al. |
| 2013/0290905 A1 | 10/2013 | Luvogt et al. |
| 2013/0293686 A1 | 11/2013 | Blow et al. |
| 2013/0305189 A1 | 11/2013 | Kim |
| 2013/0321412 A1 | 12/2013 | Coon et al. |
| 2013/0322218 A1 | 12/2013 | Burkhardt et al. |
| 2013/0342730 A1 | 12/2013 | Lee et al. |
| 2014/0043329 A1 | 2/2014 | Wang et al. |
| 2014/0047389 A1 | 2/2014 | Aarabi |
| 2014/0055554 A1 | 2/2014 | Du et al. |
| 2014/0075004 A1 | 3/2014 | Van Dusen et al. |
| 2014/0078144 A1 | 3/2014 | Berriman et al. |
| 2014/0115488 A1 | 4/2014 | Hackborn |
| 2014/0137013 A1 | 5/2014 | Matas |
| 2014/0143693 A1 | 5/2014 | Goossens et al. |
| 2014/0168217 A1 | 6/2014 | Kim et al. |
| 2014/0218371 A1 | 8/2014 | Du et al. |
| 2014/0267311 A1 | 9/2014 | Evertt et al. |
| 2014/0267618 A1 | 9/2014 | Esteban et al. |
| 2014/0270351 A1 | 9/2014 | Hoof et al. |
| 2014/0300635 A1 | 10/2014 | Suzuki |
| 2014/0333671 A1 | 11/2014 | Phang et al. |
| 2014/0336808 A1 | 11/2014 | Taylor et al. |
| 2014/0351720 A1 | 11/2014 | Mn |
| 2014/0362091 A1 | 12/2014 | Bouaziz et al. |
| 2014/0362195 A1 | 12/2014 | Ng-Thow-Hing et al. |
| 2014/0368601 A1 | 12/2014 | Decharms |
| 2015/0011204 A1 | 1/2015 | Seo et al. |
| 2015/0033192 A1 | 1/2015 | Bohannon et al. |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0042571 A1 | 2/2015 | Lombardi et al. |
| 2015/0043046 A1 | 2/2015 | Iwamoto |
| 2015/0052462 A1 | 2/2015 | Kulkarni |
| 2015/0058754 A1 | 2/2015 | Rauh |
| 2015/0062052 A1 | 3/2015 | Bernstein et al. |
| 2015/0070378 A1 | 3/2015 | Kriese et al. |
| 2015/0077502 A1 | 3/2015 | Jordan et al. |
| 2015/0078621 A1 | 3/2015 | Choi et al. |
| 2015/0082193 A1 | 3/2015 | Wallace et al. |
| 2015/0082446 A1 | 3/2015 | Flowers et al. |
| 2015/0091896 A1 | 4/2015 | Tarquini et al. |
| 2015/0149899 A1 | 5/2015 | Bernstein et al. |
| 2015/0149927 A1 | 5/2015 | Walkin et al. |
| 2015/0213604 A1 | 7/2015 | Li et al. |
| 2015/0248235 A1 | 9/2015 | Offenberg et al. |
| 2015/0253740 A1 | 9/2015 | Nishijima et al. |
| 2015/0254396 A1 | 9/2015 | Tamura et al. |
| 2015/0281145 A1 | 10/2015 | Ji |
| 2015/0302624 A1 | 10/2015 | Burke |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317945 A1 | 11/2015 | Andress et al. |
| 2015/0334075 A1 | 11/2015 | Wang et al. |
| 2015/0350141 A1 | 12/2015 | Yang et al. |
| 2015/0370529 A1 | 12/2015 | Zambetti et al. |
| 2016/0005211 A1 | 1/2016 | Sarkis et al. |
| 2016/0006987 A1 | 1/2016 | Li et al. |
| 2016/0030844 A1 | 2/2016 | Nair et al. |
| 2016/0034133 A1 | 2/2016 | Wilson et al. |
| 2016/0050169 A1 | 2/2016 | Ben Atar et al. |
| 2016/0062582 A1 | 3/2016 | Wilson et al. |
| 2016/0086387 A1 | 3/2016 | Os et al. |
| 2016/0092035 A1 | 3/2016 | Crocker et al. |
| 2016/0092043 A1 | 3/2016 | Missig et al. |
| 2016/0103427 A1 | 4/2016 | Westra et al. |
| 2016/0110593 A1 | 4/2016 | Hoof et al. |
| 2016/0132200 A1 | 5/2016 | Walkin et al. |
| 2016/0134840 A1 | 5/2016 | Mcculloch |
| 2016/0150215 A1 | 5/2016 | Chen et al. |
| 2016/0163084 A1 | 6/2016 | Corazza et al. |
| 2016/0187995 A1 | 6/2016 | Rosewall |
| 2016/0217601 A1 | 7/2016 | Tsuda et al. |
| 2016/0226926 A1 | 8/2016 | Singh et al. |
| 2016/0227121 A1 | 8/2016 | Matsushita |
| 2016/0247309 A1 | 8/2016 | Li et al. |
| 2016/0259413 A1 | 9/2016 | Anzures et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0275724 A1 | 9/2016 | Adeyoola et al. |
| 2016/0284123 A1 | 9/2016 | Hare et al. |
| 2016/0323507 A1 | 11/2016 | Chong et al. |
| 2016/0327911 A1 | 11/2016 | Eim et al. |
| 2016/0328875 A1 | 11/2016 | Fang et al. |
| 2016/0357282 A1 | 12/2016 | Block et al. |
| 2016/0370974 A1 | 12/2016 | Stenneth |
| 2017/0003659 A1 | 1/2017 | Nakanishi |
| 2017/0018289 A1 | 1/2017 | Morgenstern |

(56) References Cited

U.S. PATENT DOCUMENTS

| | | |
|---|---|---|
| 2017/0032554 A1 | 2/2017 | O'Donovan et al. |
| 2017/0046065 A1 | 2/2017 | Zeng et al. |
| 2017/0061635 A1 | 3/2017 | Petrovich et al. |
| 2017/0080346 A1 | 3/2017 | Abbas |
| 2017/0082983 A1 | 3/2017 | Katzer et al. |
| 2017/0083086 A1 | 3/2017 | Mazur et al. |
| 2017/0111616 A1 | 4/2017 | Li et al. |
| 2017/0124751 A1 | 5/2017 | Ross et al. |
| 2017/0131886 A1 | 5/2017 | Kim et al. |
| 2017/0140214 A1 | 5/2017 | Matas et al. |
| 2017/0164888 A1 | 6/2017 | Matsuda et al. |
| 2017/0178287 A1 | 6/2017 | Anderson |
| 2017/0193684 A1 | 7/2017 | Du et al. |
| 2017/0206095 A1 | 7/2017 | Gibbs et al. |
| 2017/0220212 A1 | 8/2017 | Yang et al. |
| 2017/0236298 A1 | 8/2017 | Vetter |
| 2017/0255169 A1 | 9/2017 | Lee et al. |
| 2017/0269715 A1 | 9/2017 | Kim et al. |
| 2017/0285916 A1 | 10/2017 | Xu et al. |
| 2017/0286913 A1 | 10/2017 | Liu et al. |
| 2017/0322711 A1 | 11/2017 | Robinson et al. |
| 2017/0323266 A1 | 11/2017 | Seo |
| 2017/0336926 A1 | 11/2017 | Chaudhri et al. |
| 2017/0336928 A1 | 11/2017 | Chaudhri et al. |
| 2017/0337554 A1 | 11/2017 | Mokhasi et al. |
| 2018/0004404 A1 | 1/2018 | Delfino et al. |
| 2018/0034867 A1 | 2/2018 | Zahn et al. |
| 2018/0047200 A1 | 2/2018 | O'Hara et al. |
| 2018/0059903 A1 | 3/2018 | Lim et al. |
| 2018/0067633 A1 | 3/2018 | Wilson et al. |
| 2018/0074693 A1 | 3/2018 | Jones et al. |
| 2018/0081515 A1 | 3/2018 | Block et al. |
| 2018/0088787 A1 | 3/2018 | Bereza et al. |
| 2018/0091732 A1 | 3/2018 | Wilson et al. |
| 2018/0095649 A1 | 4/2018 | Valdivia et al. |
| 2018/0114543 A1 | 4/2018 | Novikoff |
| 2018/0121060 A1 | 5/2018 | Jeong et al. |
| 2018/0131878 A1 | 5/2018 | Charlton et al. |
| 2018/0165862 A1 | 6/2018 | Sawaki |
| 2018/0165863 A1 | 6/2018 | Kubo et al. |
| 2018/0189549 A1 | 7/2018 | Inomata |
| 2018/0191944 A1 | 7/2018 | Carbonell et al. |
| 2018/0246639 A1 | 8/2018 | Han et al. |
| 2018/0268589 A1 | 9/2018 | Grant |
| 2018/0275750 A1 | 9/2018 | Zeng |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349795 A1 | 12/2018 | Boyle et al. |
| 2018/0365904 A1 | 12/2018 | Holmes |
| 2019/0050045 A1 | 2/2019 | Jha et al. |
| 2019/0058827 A1 | 2/2019 | Park et al. |
| 2019/0072909 A1 | 3/2019 | Misaki et al. |
| 2019/0080066 A1 | 3/2019 | Van Os et al. |
| 2019/0088018 A1 | 3/2019 | Shenton et al. |
| 2019/0094981 A1 | 3/2019 | Bradski et al. |
| 2019/0096106 A1 | 3/2019 | Shapiro et al. |
| 2019/0114038 A1 | 4/2019 | Geiger et al. |
| 2019/0139207 A1 | 5/2019 | Jeong et al. |
| 2019/0158735 A1 | 5/2019 | Wilson et al. |
| 2019/0160378 A1 | 5/2019 | Fajt et al. |
| 2019/0235748 A1 | 8/2019 | Seol et al. |
| 2019/0266807 A1 | 8/2019 | Lee et al. |
| 2019/0278894 A1 | 9/2019 | Andalo et al. |
| 2019/0310761 A1 | 10/2019 | Agarawala et al. |
| 2019/0339847 A1 | 11/2019 | Scapel et al. |
| 2019/0340419 A1 | 11/2019 | Milman et al. |
| 2019/0342507 A1 | 11/2019 | Dye et al. |
| 2019/0347868 A1 | 11/2019 | Scapel et al. |
| 2020/0045245 A1 | 2/2020 | Van Os et al. |
| 2020/0051304 A1 | 2/2020 | Choi et al. |
| 2020/0068095 A1 | 2/2020 | Nabetani |
| 2020/0082135 A1 | 3/2020 | Tagawa et al. |
| 2020/0089302 A1 | 3/2020 | Kim et al. |
| 2020/0110864 A1 | 4/2020 | Casado et al. |
| 2020/0134383 A1 | 4/2020 | Rhee et al. |
| 2020/0193669 A1 | 6/2020 | Churchill et al. |
| 2020/0226848 A1 | 7/2020 | Van Os et al. |
| 2020/0234481 A1 | 7/2020 | Scapel et al. |
| 2020/0234508 A1 | 7/2020 | Shaburov et al. |
| 2020/0285851 A1 | 9/2020 | Lin et al. |
| 2020/0380103 A1 | 12/2020 | Hosoda |
| 2020/0380768 A1 | 12/2020 | Harris et al. |
| 2020/0380781 A1 | 12/2020 | Barlier et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0019541 A1 | 1/2021 | Wang et al. |
| 2021/0056769 A1 | 2/2021 | Scapel et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0089136 A1 | 3/2021 | Hossain et al. |
| 2021/0096703 A1 | 4/2021 | Anzures et al. |
| 2021/0097766 A1 | 4/2021 | Palangie et al. |
| 2021/0099568 A1 | 4/2021 | Depue et al. |
| 2021/0099761 A1 | 4/2021 | Zhang |
| 2021/0110015 A1 | 4/2021 | Mccarty et al. |
| 2021/0152505 A1 | 5/2021 | Baldwin et al. |
| 2021/0168108 A1 | 6/2021 | Antmen et al. |
| 2021/0264656 A1 | 8/2021 | Barlier et al. |
| 2021/0287343 A1 | 9/2021 | Kaida |
| 2021/0311609 A1 | 10/2021 | Dandoko |
| 2021/0312167 A1 | 10/2021 | Shirai |
| 2021/0335055 A1 | 10/2021 | Scapel et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2021/0349612 A1 | 11/2021 | Triverio |
| 2021/0375042 A1 | 12/2021 | Chen et al. |
| 2021/0382544 A1 | 12/2021 | Butcher et al. |
| 2021/0390753 A1 | 12/2021 | Scapel et al. |
| 2021/0407215 A1 | 12/2021 | Evangelista et al. |
| 2022/0012922 A1 | 1/2022 | Ishikawa |
| 2022/0020220 A1 | 1/2022 | Lehman |
| 2022/0070385 A1 | 3/2022 | Van Os et al. |
| 2022/0083636 A1 | 3/2022 | Sarkis et al. |
| 2022/0084279 A1* | 3/2022 | Lindmeier .......... G06F 3/04842 |
| 2022/0105389 A1 | 4/2022 | Lianides et al. |
| 2022/0124140 A1 | 4/2022 | Okina et al. |
| 2022/0134234 A1 | 5/2022 | Sachson et al. |
| 2022/0147148 A1 | 5/2022 | Begley |
| 2022/0262080 A1 | 8/2022 | Burton et al. |
| 2022/0366626 A1 | 11/2022 | Miller et al. |
| 2022/0392132 A1 | 12/2022 | Sepulveda et al. |
| 2023/0004270 A1 | 1/2023 | Chen et al. |
| 2023/0043249 A1 | 2/2023 | Van Os et al. |
| 2023/0103161 A1 | 3/2023 | Li et al. |
| 2023/0229283 A1* | 7/2023 | Long ..................... G06F 3/0346 |
| | | 715/810 |
| 2023/0283884 A1 | 9/2023 | Van Os et al. |
| 2023/0316674 A1 | 10/2023 | Boesel et al. |
| 2023/0343053 A1 | 10/2023 | Scapel et al. |
| 2023/0350564 A1 | 11/2023 | Chen et al. |
| 2023/0379573 A1 | 11/2023 | Wilson et al. |
| 2024/0029334 A1 | 1/2024 | Sepulveda et al. |
| 2024/0036717 A1 | 2/2024 | Triverio |
| 2024/0077937 A1 | 3/2024 | Rickwald et al. |
| 2024/0144626 A1 | 5/2024 | Van Os et al. |
| 2024/0259676 A1 | 8/2024 | Wilson et al. |
| 2024/0372968 A1 | 11/2024 | Rickwald et al. |
| 2025/0022237 A1 | 1/2025 | Burton et al. |
| 2025/0024134 A1 | 1/2025 | Van Os et al. |
| 2025/0029344 A1 | 1/2025 | Li et al. |
| 2025/0037398 A1 | 1/2025 | Scapel et al. |
| 2025/0044932 A1 | 2/2025 | Chen et al. |
| 2025/0166330 A1 | 5/2025 | Van Os et al. |

(56)                    References Cited

U.S. PATENT DOCUMENTS

2025/0245942 A1    7/2025  Boesel et al.
2025/0272938 A1    8/2025  Scapel et al.

FOREIGN PATENT DOCUMENTS

| | | | |
|---|---|---|---|
| AU | 2015297035 | B2 | 6/2018 |
| AU | 2020269590 | A1 | 12/2021 |
| CA | 2356232 | A1 | 3/2002 |
| CN | 1083229 | A | 3/1994 |
| CN | 2602404 | Y | 2/2004 |
| CN | 101055646 | A | 10/2007 |
| CN | 101329707 | A | 12/2008 |
| CN | 101692681 | A | 4/2010 |
| CN | 101742053 | A | 6/2010 |
| CN | 102035990 | A | 4/2011 |
| CN | 102075727 | A | 5/2011 |
| CN | 102142149 | A | 8/2011 |
| CN | 102271241 | A | 12/2011 |
| CN | 102298797 | A | 12/2011 |
| CN | 102447873 | A | 5/2012 |
| CN | 202217134 | U | 5/2012 |
| CN | 102622085 | A | 8/2012 |
| CN | 102750070 | A | 10/2012 |
| CN | 102854979 | A | 1/2013 |
| CN | 103516894 | A | 1/2014 |
| CN | 103703438 | A | 4/2014 |
| CN | 103927190 | A | 7/2014 |
| CN | 103947190 | A | 7/2014 |
| CN | 104115503 | A | 10/2014 |
| CN | 104182741 | A | 12/2014 |
| CN | 104246793 | A | 12/2014 |
| CN | 104270597 | A | 1/2015 |
| CN | 104376160 | A | 2/2015 |
| CN | 104753762 | A | 7/2015 |
| CN | 104869346 | A | 8/2015 |
| CN | 104898402 | A | 9/2015 |
| CN | 104952063 | A | 9/2015 |
| CN | 105100462 | A | 11/2015 |
| CN | 105139438 | A | 12/2015 |
| CN | 105190700 | A | 12/2015 |
| CN | 105391937 | A | 3/2016 |
| CN | 105611215 | A | 5/2016 |
| CN | 105611275 | A | 5/2016 |
| CN | 105653031 | A | 6/2016 |
| CN | 106303690 | A | 1/2017 |
| CN | 106792147 | A | 5/2017 |
| CN | 106909064 | A | 6/2017 |
| CN | 107533356 | A | 1/2018 |
| CN | 107561904 | A | 1/2018 |
| CN | 107924113 | A | 4/2018 |
| CN | 107944397 | A | 4/2018 |
| CN | 108885795 | A | 11/2018 |
| DK | 201670652 | A1 | 12/2017 |
| EP | 0579093 | A1 | 1/1994 |
| EP | 1215867 | A2 | 6/2002 |
| EP | 1429291 | A1 | 6/2004 |
| EP | 1592212 | A1 | 11/2005 |
| EP | 1736931 | A2 | 12/2006 |
| EP | 2416563 | A2 | 2/2012 |
| EP | 2492873 | B1 | 9/2013 |
| EP | 2990887 | A2 | 3/2016 |
| EP | 3026636 | A1 | 6/2016 |
| EP | 3047884 | A1 | 7/2016 |
| EP | 3051525 | A1 | 8/2016 |
| EP | 3079044 | A1 | 10/2016 |
| EP | 3101958 | A1 | 12/2016 |
| EP | 3190563 | A1 | 7/2017 |
| EP | 3211587 | A1 | 8/2017 |
| EP | 2556665 | B1 | 8/2018 |
| EP | 3401770 | A1 | 11/2018 |
| EP | 3531377 | A1 | 8/2019 |
| EP | 3627450 | A1 | 3/2020 |
| EP | 3537378 | B1 | 11/2021 |
| JP | 53-31170 | A | 3/1978 |
| JP | 56-621 | A | 1/1981 |
| JP | 3007616 | U | 2/1995 |
| JP | 9-9072 | A | 1/1997 |
| JP | 10-506472 | A | 6/1998 |
| JP | 10-293860 | A | 11/1998 |
| JP | 11-109066 | A | 4/1999 |
| JP | 11-312159 | A | 11/1999 |
| JP | 2000-76460 | A | 3/2000 |
| JP | 2000-162349 | A | 6/2000 |
| JP | 2001-144884 | A | 5/2001 |
| JP | 2001-273064 | A | 10/2001 |
| JP | 2001-313886 | A | 11/2001 |
| JP | 2002-251238 | A | 9/2002 |
| JP | 2003-9404 | A | 1/2003 |
| JP | 2003-219217 | A | 7/2003 |
| JP | 2003-233616 | A | 8/2003 |
| JP | 2004-28918 | A | 1/2004 |
| JP | 2004-184396 | A | 7/2004 |
| JP | 2005-521890 | A | 7/2005 |
| JP | 2005-227581 | A | 8/2005 |
| JP | 2006-69296 | A | 3/2006 |
| JP | 2006-102327 | A | 4/2006 |
| JP | 2006-520053 | A | 8/2006 |
| JP | 2007-528240 | A | 10/2007 |
| JP | 2008-27086 | A | 2/2008 |
| JP | 2009-217612 | A | 9/2009 |
| JP | 2011-515726 | A | 5/2011 |
| JP | 2011-517810 | A | 6/2011 |
| JP | 2011-525648 | A | 9/2011 |
| JP | 2011-209887 | A | 10/2011 |
| JP | 2012-18569 | A | 1/2012 |
| JP | 2012-38292 | A | 2/2012 |
| JP | 2012-78982 | A | 4/2012 |
| JP | 2012-159781 | A | 8/2012 |
| JP | 2012-223357 | A | 11/2012 |
| JP | 2013-3671 | A | 1/2013 |
| JP | 2013-92989 | A | 5/2013 |
| JP | 2013-97760 | A | 5/2013 |
| JP | 2013-101528 | A | 5/2013 |
| JP | 2013-526099 | A | 6/2013 |
| JP | 2013-232230 | A | 11/2013 |
| JP | 2014-206817 | A | 10/2014 |
| JP | 2014-222439 | A | 11/2014 |
| JP | 2015-504619 | A | 2/2015 |
| JP | 2016-136324 | A | 7/2016 |
| JP | 2016-528571 | A | 9/2016 |
| JP | 2017-54195 | A | 3/2017 |
| JP | 2017-521804 | A | 8/2017 |
| JP | 2017-527917 | A | 9/2017 |
| JP | 2017-531225 | A | 10/2017 |
| JP | 6240301 | B1 | 11/2017 |
| JP | 6266736 | B1 | 1/2018 |
| JP | 2018-50279 | A | 3/2018 |
| JP | 2018-514838 | A | 6/2018 |
| JP | 2018-106365 | A | 7/2018 |
| JP | 2018-116067 | A | 7/2018 |
| JP | 2019-145108 | A | 8/2019 |
| JP | 2019-164825 | A | 9/2019 |
| JP | 2019-532400 | A | 11/2019 |
| JP | 2020-525868 | A | 8/2020 |
| JP | 2020-156919 | A | 10/2020 |
| KR | 10-2004-0009115 | A | 1/2004 |
| KR | 10-2004-0046272 | A | 6/2004 |
| KR | 10-2004-0107489 | A | 12/2004 |
| KR | 10-2005-0086630 | A | 8/2005 |
| KR | 10-2008-0050336 | A | 6/2008 |
| KR | 10-2010-0086052 | A | 7/2010 |
| KR | 10-2011-0028581 | A | 3/2011 |
| KR | 10-2012-0026004 | A | 3/2012 |
| KR | 10-2012-0113252 | A | 10/2012 |
| KR | 10-2012-0132134 | A | 12/2012 |
| KR | 10-2014-0033088 | A | 3/2014 |
| KR | 10-2014-0049340 | A | 4/2014 |
| KR | 10-2015-0008996 | A | 1/2015 |
| KR | 10-2015-0024899 | A | 3/2015 |
| KR | 10-2015-0067197 | A | 6/2015 |
| KR | 10-1540544 | B1 | 7/2015 |
| KR | 10-1587115 | B1 | 1/2016 |
| KR | 10-2016-0016910 | A | 2/2016 |
| KR | 10-2016-0047891 | A | 5/2016 |

(56) References Cited

FOREIGN PATENT DOCUMENTS

| | | | |
|---|---|---|---|
| KR | 10-2016-0063058 A | 6/2016 | |
| KR | 10-1655078 B1 | 9/2016 | |
| KR | 10-2016-0146942 A | 12/2016 | |
| KR | 10-2017-0081391 A | 7/2017 | |
| KR | 10-2017-0112267 A | 10/2017 | |
| KR | 10-2017-0112406 A | 10/2017 | |
| KR | 10-2017-0117306 A | 10/2017 | |
| KR | 10-2017-0139621 A | 12/2017 | |
| KR | 10-2018-0017227 A | 2/2018 | |
| KR | 10-1875907 B1 | 7/2018 | |
| KR | 10-2019-0114034 A | 10/2019 | |
| KR | 10-2020-0117685 A | 10/2020 | |
| KR | 10-2338576 B1 | 12/2021 | |
| WO | 98/40795 A1 | 9/1998 | |
| WO | 03/085460 A2 | 10/2003 | |
| WO | 2004/010672 A2 | 1/2004 | |
| WO | 2004/079530 A2 | 9/2004 | |
| WO | 2007/120981 A2 | 10/2007 | |
| WO | 2009/073607 A2 | 6/2009 | |
| WO | 2009/114239 A1 | 9/2009 | |
| WO | 2009/133710 A1 | 11/2009 | |
| WO | 2011/084860 A2 | 7/2011 | |
| WO | 2011/127309 A1 | 10/2011 | |
| WO | 2012/033708 A1 | 3/2012 | |
| WO | 2012/170354 A2 | 12/2012 | |
| WO | 2013/082325 A1 | 6/2013 | |
| WO | 2013/097139 A1 | 7/2013 | |
| WO | 2013/120851 A1 | 8/2013 | |
| WO | 2013/152453 A1 | 10/2013 | |
| WO | 2013/152454 A1 | 10/2013 | |
| WO | 2013/152455 A1 | 10/2013 | |
| WO | 2013/189058 A1 | 12/2013 | |
| WO | 2014/053063 A1 | 4/2014 | |
| WO | 2014/094199 A1 | 6/2014 | |
| WO | 2014/161429 A1 | 10/2014 | |
| WO | 2014/200734 A1 | 12/2014 | |
| WO | 2015/034960 A1 | 3/2015 | |
| WO | 2015/064144 A1 | 5/2015 | |
| WO | 2015/084891 A1 | 6/2015 | |
| WO | 2015/144209 A1 | 10/2015 | |
| WO | 2015/183756 A1 | 12/2015 | |
| WO | 2015/187458 A1 | 12/2015 | |
| WO | 2016/022203 A1 | 2/2016 | |
| WO | 2016/022204 A1 | 2/2016 | |
| WO | 2016/022205 A1 | 2/2016 | |
| WO | 2016/036218 A1 | 3/2016 | |
| WO | 2016/042926 A1 | 3/2016 | |
| WO | 2016/045005 A1 | 3/2016 | |
| WO | 2016/057062 A1 | 4/2016 | |
| WO | 2016/064435 A1 | 4/2016 | |
| WO | 2016/101124 A1 | 6/2016 | |
| WO | 2016/101131 A1 | 6/2016 | |
| WO | 2016/101132 A1 | 6/2016 | |
| WO | 2016/144385 A1 | 9/2016 | |
| WO | 2016/144975 A2 | 9/2016 | |
| WO | 2016/145129 A1 | 9/2016 | |
| WO | 2016/161556 A1 | 10/2016 | |
| WO | 2016/200587 A1 | 12/2016 | |
| WO | 2017/030646 A1 | 2/2017 | |
| WO | 2017/043314 A1 | 3/2017 | |
| WO | 2017/077751 A1 | 5/2017 | |
| WO | 2017/153771 A1 | 9/2017 | |
| WO | 2017/173319 A1 | 10/2017 | |
| WO | 2017/201326 A1 | 11/2017 | |
| WO | 2017/213439 A1 | 12/2017 | |
| WO | 2017/218193 A1 | 12/2017 | |
| WO | 2018/006053 A1 | 1/2018 | |
| WO | 2018/049430 A2 | 3/2018 | |
| WO | 2018/057272 A1 | 3/2018 | |
| WO | 2018/212802 A1 | 11/2018 | |
| WO | 2018/226265 A1 | 12/2018 | |
| WO | 2019/216997 A1 | 11/2019 | |
| WO | 2019/216999 A1 | 11/2019 | |
| WO | 2020/075308 A1 | 4/2020 | |
| WO | 2020/129959 A1 | 6/2020 | |
| WO | 2021/050190 A1 | 3/2021 | |

OTHER PUBLICATIONS

Corrected Notice of Allowance received for U.S. Appl. No. 18/241,802, mailed on Mar. 28, 2025, 9 pages.

Corrected Notice of Allowance received for U.S. Appl. No. 18/677,585, mailed on Mar. 31, 2025, 5 pages.

International Preliminary Report on Patentability received for PCT Patent Application No. PCT/US2023/031979, mailed on Mar. 20, 2025, 11 pages.

Office Action received for Chinese Patent Application No. 202010330318.1, mailed on Mar. 6, 2025, 27 pages (15 pages of English Translation and 12 pages of Official Copy).

Office Action received for Chinese Patent Application No. 202080009772.5, mailed on Feb. 15, 2025, 24 pages (13 pages of English Translation and 11 pages of Official Copy).

Summons to Attend Oral Proceedings received for European Patent Application No. 20704768.9, mailed on Mar. 17, 2025, 9 pages.

Notice of Acceptance received for Australian Patent Application No. 2025205217, mailed on Sep. 5, 2025, 3 pages.

Office Action received for European Patent Application No. 22787099.5, mailed on Sep. 1, 2025, 7 pages.

Non-Final Office Action received for U.S. Appl. No. 18/893,427, mailed on Jul. 7, 2025, 13 pages.

Notice of Allowance received for Japanese Patent Application No. 2022-194369, mailed on Jul. 7, 2025, 3 pages (1 page of English Translation and 2 pages of Official Copy).

Final Office Action received for U.S. Appl. No. 18/375,309, mailed on Dec. 4, 2024, 18 pages.

Intention to Grant received for European Patent Application No. 21728746.5, mailed on Dec. 6, 2024, 8 pages.

Non-Final Office Action received for U.S. Appl. No. 18/677,585, mailed on Dec. 27, 2024, 14 pages.

Notice of Allowance received for Korean Patent Application No. 10-2024-7004853, mailed on Nov. 14, 2024, 8 pages (2 pages of English Translation and 6 pages of Official Copy).

Office Action received for Australian Patent Application No. 2023219926, mailed on Dec. 3, 2024, 4 pages.

Office Action received for Japanese Patent Application No. 2024-144411, mailed on Nov. 25, 2024, 4 pages (2 pages of English Translation and 2 pages of Official Copy).

Corrected Notice of Allowance received for U.S. Appl. No. 18/677,585, mailed on May 7, 2025, 5 pages.

Office Action received for Chinese Patent Application No. 201910691865.X, mailed on Apr. 14, 2025, 14 pages (5 pages of English Translation and 9 pages of Official Copy).

Corrected Notice of Allowance received for U.S. Appl. No. 17/461,014, mailed on May 28, 2025, 2 pages.

Corrected Notice of Allowance received for U.S. Appl. No. 18/378,470, mailed on May 29, 2025, 2 pages.

Notice of Allowance received for U.S. Appl. No. 18/378,470, mailed on May 20, 2025, 41 pages.

Notice of Allowance received for U.S. Appl. No. 18/677,585, mailed on May 19, 2025, 8 pages.

Office Action received for Indian Patent Application No. 202315036344, mailed on May 22, 2025, 8 pages.

Applicant-Initiated Interview Summary received for U.S. Appl. No. 18/375,309, mailed on Feb. 28, 2025, 4 pages.

Decision to Grant received for Japanese Patent Application No. 2023-548256, mailed on Feb. 17, 2025, 3 pages (1 page of English Translation and 2 pages of Official Copy).

Intention to Grant received for European Patent Application No. 22154034.7, mailed on Feb. 26, 2025, 9 pages.

Notice of Allowance received for Korean Patent Application No. 10-2023-0189466, mailed on Feb. 17, 2025, 10 pages (2 pages of English Translation and 8 pages of Official Copy).

Notice of Allowance received for U.S. Appl. No. 18/677,585, mailed on Mar. 5, 2025, 9 pages.

(56)                  References Cited

OTHER PUBLICATIONS

Record of Oral Hearing received for U.S. Appl. No. 17/461,014, mailed on Feb. 12, 2025, 17 pages.
Supplemental Notice of Allowance received for U.S. Appl. No. 17/031,671, mailed on Feb. 27, 2025, 3 pages.
Corrected Notice of Allowance received for U.S. Appl. No. 18/125,600, mailed on Apr. 17, 2025, 5 pages.
Corrected Notice of Allowance received for U.S. Appl. No. 18/677,585, mailed on Apr. 7, 2025, 5 pages.
Extended European Search Report received for European Patent Application No. 24215123.1, mailed on Apr. 8, 2025, 9 pages.
Intention to Grant received for European Patent Application No. 23168077.8, mailed on Apr. 7, 2025, 9 pages.
Non-Final Office Action received for U.S. Appl. No. 18/375,309, mailed on Apr. 23, 2025, 21 pages.
Notice of Acceptance received for Australian Patent Application No. 2023219926, mailed on Apr. 7, 2025, 3 pages.
Notice of Acceptance received for Australian Patent Application No. 2024201007, mailed on Apr. 7, 2025, 3 pages.
Notice of Allowance received for U.S. Appl. No. 17/461,014, mailed on Apr. 17, 2025, 7 pages.
Intention to Grant received for European Patent Application No. 22154034.7, mailed on Jun. 12, 2025, 8 pages.
Office Action received for Chinese Patent Application No. 201910691872.X, mailed on May 15, 2025, 18 pages (10 pages of English Translation and 8 pages of Official Copy).
Office Action received for Chinese Patent Application No. 202080009772.5, mailed on Apr. 30, 2025, 23 pages (14 pages of English Translation and 9 pages of Official Copy).
Decision to Grant received for European Patent Application No. 21728746.5, mailed on Feb. 6, 2025, 4 pages.
Office Action received for Australian Patent Application No. 2024201007, mailed on Feb. 7, 2025, 2 pages.
Office Action received for Japanese Patent Application No. 2023-210355, mailed on Feb. 4, 2025, 6 pages (3 pages of English Translation and 3 pages of Official Copy).
Supplemental Notice of Allowance received for U.S. Appl. No. 17/031,671, mailed on Feb. 12, 2025, 4 pages.
VS Media, "Selfie Camera App "B612" and "SNOW" Collaborate with Doraemon The Movie: Nobita's Antarctic Adventure", Online available at: https://vsmedia.info/2017/03/03/b612_snow_doraemon, Mar. 3, 2017, 2 pages (Official copy only).{ See Communication Under Rule 37 CFR § 1.98(a)(3)}.
Corrected Notice of Allowance received for U.S. Appl. No. 18/378,470, mailed on Jan. 23, 2025, 2 pages.
Decision on Appeal received for U.S. Appl. No. 17/461,014, mailed on Feb. 4, 2025, 12 pages.
Notice of Allowance received for U.S. Appl. No. 17/031,671, mailed on Jan. 29, 2025, 37 pages.
Notice of Allowance received for U.S. Appl. No. 18/125,600, mailed on Jan. 23, 2025, 13 pages.
Decision to Grant received for European Patent Application No. 23168077.8, mailed on Aug. 21, 2025, 4 pages.
How to use B612 with pictures! A Selfie App that makes your photo look better than SNOW, Online available at: https://www.kaoru-blog.com/entry/b612-how, Oct. 22, 2017, 28 pages (Official Copy Only).{See Communication Under Rule 37 CFR § 1.98(a)(3)}.
Office Action received for Japanese Patent Application No. 2023-210355, mailed on Aug. 18, 2025, 6 pages (3 pages of English Translation and 3 pages of Official Copy).
Office Action received for Japanese Patent Application No. 2024-152389, mailed on Aug. 25, 2025, 12 pages (6 pages of English Translation and 6 pages of Official Copy).
[B612] Addition of Facial Recognition Bear/Cat Stamps And ar Background Function Having Moving Sparkles Or Hearts, Available Online at: <URL, htpps://apptopi.jp/2017/01/22/b612>, Jan. 22, 2017, 11 pages.
Advisory Action received for U.S. Appl. No. 13/082,035, mailed on Jun. 19, 2015, 5 pages.

Advisory Action received for U.S. Appl. No. 13/082,035, mailed on Oct. 23, 2013, 3 pages.
Advisory Action received for U.S. Appl. No. 16/259,771, mailed on Feb. 26, 2020, 3 pages.
Advisory Action received for U.S. Appl. No. 16/259,771, mailed on Jul. 14, 2020, 6 pages.
Advisory Action received for U.S. Appl. No. 17/031,765, mailed on Dec. 12, 2022, 7 pages.
Advisory Action received for U.S. Appl. No. 17/031,765, mailed on Nov. 13, 2023, 5 pages.
Advisory Action received for U.S. Appl. No. 17/093,408, mailed on Jun. 5, 2023, 4 pages.
Ali et al., "Facial Expression Recognition Using Human to Animated-Character Expression Translation", Oct. 12, 2019, 8 pages.
Applicant-Initiated Interview Summary received for U.S. Appl. No. 16/259,771, mailed on May 5, 2020, 10 pages.
Applicant-Initiated Interview Summary received for U.S. Appl. No. 17/031,671, mailed on Aug. 2, 2021, 5 pages.
Applicant-Initiated Interview Summary received for U.S. Appl. No. 17/031,671, mailed on Jun. 13, 2022, 7 pages.
Applicant-Initiated Interview Summary received for U.S. Appl. No. 17/031,671, mailed on Nov. 8, 2021, 5 pages.
Applicant-Initiated Interview Summary received for U.S. Appl. No. 13/082,035, mailed on Apr. 4, 2013, 3 pages.
Applicant-Initiated Interview Summary received for U.S. Appl. No. 13/082,035, mailed on Aug. 1, 2016, 3 pages.
Applicant-Initiated Interview Summary received for U.S. Appl. No. 13/082,035, mailed on Jan. 29, 2015, 3 pages.
Applicant-Initiated Interview Summary received for U.S. Appl. No. 13/082,035, mailed on Oct. 30, 2013, 3 pages.
Applicant-Initiated Interview Summary received for U.S. Appl. No. 14/866,560, mailed on Jan. 30, 2019, 3 pages.
Applicant-Initiated Interview Summary received for U.S. Appl. No. 14/866,560, mailed on Jul. 26, 2018, 3 pages.
Applicant-Initiated Interview Summary received for U.S. Appl. No. 14/866,560, mailed on May 14, 2019, 4 pages.
Applicant-Initiated Interview Summary received for U.S. Appl. No. 14/866,560, mailed on Oct. 21, 2019, 3 pages.
Applicant-Initiated Interview Summary received for U.S. Appl. No. 16/259,771, mailed on Apr. 18, 2022, 2 pages.
Applicant-Initiated Interview Summary received for U.S. Appl. No. 16/519,850, mailed on Jun. 26, 2020, 4 pages.
Applicant-Initiated Interview Summary received for U.S. Appl. No. 16/599,433, mailed on Apr. 20, 2021, 7 pages.
Applicant-Initiated Interview Summary received for U.S. Appl. No. 16/663,062, mailed on Dec. 18, 2020, 3 pages.
Applicant-Initiated Interview Summary received for U.S. Appl. No. 16/833,436, mailed on Jan. 27, 2022, 2 pages.
Applicant-Initiated Interview Summary received for U.S. Appl. No. 16/833,436, mailed on Jul. 1, 2021, 2 pages.
Applicant-Initiated Interview Summary received for U.S. Appl. No. 17/031,654, mailed on Feb. 1, 2021, 2 pages.
Applicant-Initiated Interview Summary received for U.S. Appl. No. 17/031,671, mailed on Dec. 9, 2022, 5 pages.
Applicant-Initiated Interview Summary received for U.S. Appl. No. 17/031,671, mailed on May 23, 2023, 3 pages.
Applicant-Initiated Interview Summary received for U.S. Appl. No. 17/031,765, mailed on Apr. 17, 2023, 4 pages.
Applicant-Initiated Interview Summary received for U.S. Appl. No. 17/031,765, mailed on Dec. 15, 2021, 4 pages.
Applicant-Initiated Interview Summary received for U.S. Appl. No. 17/031,765, mailed on May 3, 2023, 6 pages.
Applicant-Initiated Interview Summary received for U.S. Appl. No. 17/031,765, mailed on May 23, 2022, 5 pages.
Applicant-Initiated Interview Summary received for U.S. Appl. No. 17/031,765, mailed on Nov. 16, 2022, 5 pages.
Applicant-Initiated Interview Summary received for U.S. Appl. No. 17/031,765, mailed on Oct. 31, 2023, 5 pages.
Applicant-Initiated Interview Summary received for U.S. Appl. No. 17/031,765, mailed on Sep. 22, 2021, 5 pages.
Applicant-Initiated Interview Summary received for U.S. Appl. No. 17/093,408, mailed on Jan. 5, 2023, 3 pages.

(56) References Cited

OTHER PUBLICATIONS

Applicant-Initiated Interview Summary received for U.S. Appl. No. 17/093,408, mailed on Jul. 1, 2022, 3 pages.
Applicant-Initiated Interview Summary received for U.S. Appl. No. 17/093,408, mailed on Mar. 1, 2022, 3 pages.
Applicant-Initiated Interview Summary received for U.S. Appl. No. 17/093,408, mailed on May 10, 2023, 3 pages.
Applicant-Initiated Interview Summary received for U.S. Appl. No. 17/093,408, mailed on May 25, 2023, 2 pages.
Applicant-Initiated Interview Summary received for U.S. Appl. No. 17/370,505, mailed on Oct. 17, 2022, 4 pages.
Applicant-Initiated Interview Summary received for U.S. Appl. No. 17/373,163, mailed on Apr. 11, 2022, 2 pages.
Applicant-Initiated Interview Summary received for U.S. Appl. No. 17/461,014, mailed on Feb. 21, 2023, 3 pages.
Applicant-Initiated Interview Summary received for U.S. Appl. No. 17/667,350, mailed on Jan. 18, 2024, 4 pages.
Applicant-Initiated Interview Summary received for U.S. Appl. No. 17/667,350, mailed on May 24, 2024, 4 pages.
Applicant-Initiated Interview Summary received for U.S. Appl. No. 17/667,350, mailed on May 31, 2023, 4 pages.
Applicant-Initiated Interview Summary received for U.S. Appl. No. 17/667,350, mailed on Sep. 20, 2023, 4 pages.
Applicant-Initiated Interview Summary received for U.S. Appl. No. 17/941,962, mailed on May 30, 2023, 2 pages.
Applicant-Initiated Interview Summary received for U.S. Appl. No. 18/138,634, mailed on Feb. 9, 2024, 4 pages.
Applicant-Initiated Interview Summary received for U.S. Appl. No. 18/197,242, mailed on Feb. 22, 2024, 2 pages.
Applicant-Initiated Interview Summary received for U.S. Appl. No. 18/241,802, mailed on Jul. 17, 2024, 6 pages.
Applicant-Initiated Interview Summary received for U.S. Appl. No. 18/375,309, mailed on Sep. 27, 2024, 2 pages.
Applivgames, ""Super Mario Run" Stickers for iMessage: Free Delivery Started!", Available online at: <https://games.app-liv.jp/archives/178627>, Sep. 13, 2016, 3 pages.
Board Decision received for Chinese Patent Application No. 201911199054.4, mailed on Sep. 25, 2024, 40 pages.
Board Opinion received for Chinese Patent Application No. 201911199054.4, mailed on May 10, 2024, 24 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Brief Communication Regarding Oral Proceedings received for European Patent Application No. 19181242.9, mailed on Oct. 5, 2022, 4 pages.
Carretero et al., "Preserving Avatar Genuineness in Different Display Media", Mobile Networks and Applications, Kluwer Academic Publishers, BO, vol. 13, No. 6, Jul. 15, 2008, pp. 627-634.
Certificate of Examination received for Australian Patent Application No. 2019100420, mailed on Jul. 3, 2019, 2 pages.
Certificate of Examination received for Australian Patent Application No. 2019100497, mailed on Jul. 29, 2019, 2 pages.
Certificate of Examination received for Australian Patent Application No. 2019100794, mailed on Dec. 19, 2019, 2 pages.
Certificate of Examination received for Australian Patent Application No. 2019101019, mailed on Nov. 12, 2019, 2 pages.
Certificate of Examination received for Australian Patent Application No. 2019101667, mailed on Mar. 20, 2020, 2 pages.
Certificate of Examination received for Australian Patent Application No. 2020100189, mailed on May 12, 2020, 2 pages.
Certificate of Examination received for Australian Patent Application No. 2020100675, mailed on Jun. 30, 2020, 2 pages.
Certificate of Examination received for Australian Patent Application No. 2020101043, mailed on Dec. 22, 2020, 2 pages.
Certificate of Examination received for Australian Patent Application No. 2020101715, mailed on Oct. 6, 2020, 2 pages.

Chan et al., "FrontFace", Facilitating Communication Between HMD Users and Outsiders Using Front-Facing-Screen HMDs, Sep. 4-7, 2017, 5 pages.
Communication for Board of Appeal received for European Patent Application No. 19204230.7, mailed on Feb. 16, 2024, 1 page.
Communication for Board of Appeal received for European Patent Application No. 19204230.7, mailed on Jun. 18, 2024, 15 pages.
Communication for Board of Appeal received for European Patent Application No. 19724959.2, mailed on Sep. 27, 2023, 14 pages.
Contents Pocket, "Line Stamp Information", Available online at: <https://web.archive.org/web/20150404080541/http://contents-pocket.net/linestamp.html>, Apr. 2015, 2 pages.
Corrected Notice of Allowance received for U.S. Appl. No. 15/713,490, mailed on May 1, 2019, 2 pages.
Corrected Notice of Allowance received for U.S. Appl. No. 16/142,288, mailed on Jul. 30, 2019, 5 pages.
Corrected Notice of Allowance received for U.S. Appl. No. 16/143,097, mailed on Nov. 8, 2019, 3 pages.
Corrected Notice of Allowance received for U.S. Appl. No. 16/519,850, mailed on Nov. 2, 2020, 5 pages.
Corrected Notice of Allowance received for U.S. Appl. No. 16/519,850, mailed on Sep. 8, 2020, 5 pages.
Corrected Notice of Allowance received for U.S. Appl. No. 16/599,433, mailed on Aug. 13, 2021, 5 pages.
Corrected Notice of Allowance received for U.S. Appl. No. 16/599,433, mailed on Oct. 14, 2021, 3 pages.
Corrected Notice of Allowance received for U.S. Appl. No. 16/663,062, mailed on Apr. 14, 2021, 2 pages.
Corrected Notice of Allowance received for U.S. Appl. No. 16/663,062, mailed on Jul. 21, 2021, 2 pages.
Corrected Notice of Allowance received for U.S. Appl. No. 17/091,460, mailed on Feb. 16, 2022, 6 pages.
Corrected Notice of Allowance received for U.S. Appl. No. 17/091,460, mailed on Feb. 25, 2022, 6 pages.
Corrected Notice of Allowance received for U.S. Appl. No. 17/093,408, mailed on Sep. 13, 2023, 2 pages.
Corrected Notice of Allowance received for U.S. Appl. No. 17/093,408, mailed on Sep. 20, 2023, 3 pages.
Corrected Notice of Allowance received for U.S. Appl. No. 17/370,505, mailed on Apr. 4, 2023, 5 pages.
Corrected Notice of Allowance received for U.S. Appl. No. 17/370,505, mailed on Apr. 28, 2023, 5 pages.
Corrected Notice of Allowance received for U.S. Appl. No. 17/370,505, mailed on Mar. 8, 2023, 5 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jun. 27, 2022, 5 pages.
Corrected Notice of Allowance received for U.S. Appl. No. 17/525,664, mailed on Apr. 11, 2023, 2 pages.
Corrected Notice of Allowance received for U.S. Appl. No. 17/525,664, mailed on Feb. 23, 2023, 2 pages.
Corrected Notice of Allowance received for U.S. Appl. No. 17/525,664, mailed on May 17, 2023, 2 pages.
Corrected Notice of Allowance received for U.S. Appl. No. 17/525,664, mailed on Nov. 3, 2022, 2 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Corrected Notice of Allowance received for U.S. Appl. No. 18/138,634, mailed on May 2, 2024, 5 pages.
Corrected Notice of Allowance received for U.S. Appl. No. 18/138,634, mailed on May 20, 2024, 5 pages.
Corrected Notice of Allowance received for U.S. Appl. No. 18/197,242, mailed on Apr. 4, 2024, 2 pages.
Corrected Notice of Allowance received for U.S. Appl. No. 18/197,242, mailed on Jul. 22, 2024, 2 pages.
Corrected Notice of Allowance received for U.S. Appl. No. 18/197,242, mailed on Mar. 18, 2024, 2 pages.
Corrected Notice of Allowance received for U.S. Appl. No. 18/197,242, mailed on Mar. 27, 2024, 2 pages.

(56) References Cited

OTHER PUBLICATIONS

Corrected Notice of Allowance received for U.S. Appl. No. 18/197,242, mailed on May 15, 2024, 2 pages.
Corrected Notice of Allowance received for U.S. Appl. No. 18/197,242, mailed on Nov. 6, 2024, 2 pages.
Corrected Notice of Allowance received for U.S. Appl. No. 18/220,715, mailed on Apr. 8, 2024, 2 pages.
Corrected Notice of Allowance received for U.S. Appl. No. 18/220,715, mailed on Apr. 25, 2024, 2 pages.
Corrected Notice of Allowance received for U.S. Appl. No. 18/220,715, mailed on Jul. 23, 2024, 2 pages.
Corrected Notice of Allowance received for U.S. Appl. No. 18/220,715, mailed on Jun. 24, 2024, 2 pages.
Corrected Notice of Allowance received for U.S. Appl. No. 18/230,465, mailed on Nov. 5, 2024, 2 pages.
Corrected Notice of Allowance received for U.S. Appl. No. 18/230,465, mailed on Oct. 9, 2024, 2 pages.
Corrected Notice of Allowance received for U.S. Appl. No. 18/230,465, mailed on Oct. 17, 2024, 2 pages.
Corrected Notice of Allowance received for U.S. Appl. No. 18/230,465, mailed on Oct. 24, 2024, 2 pages.
Corrected Notice of Allowance received for U.S. Appl. No. 18/241,802, mailed on Oct. 22, 2024, 9 pages.
Decision on Appeal received for Korean Patent Application No. 10-2021-7002582, mailed on May 13, 2022, 29 pages.
Decision on Appeal received for U.S. Appl. No. 16/259,771, mailed on Aug. 19, 2021, 12 pages.
Decision on Appeal received for U.S. Appl. No. 16/259,771, mailed on Feb. 8, 2024, 18 pages.
Decision on Appeal received for U.S. Appl. No. 17/031,671, mailed on Nov. 1, 2024, 24 pages.
Decision to Grant received for Danish Patent Application No. PA201870372, mailed on Jun. 17, 2020, 2 pages.
Decision to Grant received for Danish Patent Application No. PA201870375, mailed on Jul. 24, 2019, 2 pages.
Decision to Grant received for Danish Patent Application No. PA201870377, mailed on May 14, 2019, 2 pages.
Decision to Grant received for European Patent Application No. 19172407.9, mailed on Jun. 17, 2021, 2 pages.
Decision to Grant received for European Patent Application No. 19181242.9, mailed on Mar. 23, 2023, 3 pages.
Decision to Grant received for European Patent Application No. 20168021.2, mailed on Feb. 3, 2022, 2 pages.
Decision to Grant received for Japanese Patent Application No. 2018-182607, mailed on Apr. 13, 2022, 3 pages.
Decision to Grant received for Japanese Patent Application No. 2020-193703, mailed on Aug. 10, 2021, 3 pages.
Decision to Grant received for Japanese Patent Application No. 2021-166686, mailed on Apr. 20, 2023, 2 pages.
Decision to Grant received for Japanese Patent Application No. 2023-083816, mailed on Aug. 9, 2023, 2 pages.
Decision to Grant received for Japanese Patent Application No. 2023-146062, mailed on Nov. 13, 2023, 2 pages.
Decision to Refuse received for European Patent Application No. 17853657.9, mailed on Feb. 2, 2024, 17 pages.
Decision to Refuse received for European Patent Application No. 19204230.7, mailed on Feb. 4, 2022, 15 pages.
Decision to Refuse received for European Patent Application No. 19212057.4, mailed on Feb. 5, 2024, 18 pages.
Decision to Refuse received for European Patent Application No. 19724959.2, mailed on Jun. 22, 2021, 13 pages.
Decision to Refuse received for Japanese Patent Application No. 2020-159824, mailed on Sep. 30, 2022, 6 pages.
Droid Life, "20+ Galaxy S9, S9+ Tips and Tricks", Available Online at: https://www.youtube.com/watch?v=sso0mYTfV6w, Mar. 22, 2018, pp. 1-33.
Enterbrain, "No. 5 Create your own Avatar Mii Studio", vol. 26, No. 11, p. 138, Feb. 24, 2011, 4 pages.
European Search Report received for European Patent Application No. 19172407.9, mailed on Oct. 9, 2019, 4 pages.

European Search Report received for European Patent Application No. 19181242.9, mailed on Nov. 27, 2019, 4 pages.
European Search Report received for European Patent Application No. 20168021.2, mailed on Jul. 8, 2020, 4 pages.
Examiner's Answer to Appeal Brief received for U.S. Appl. No. 16/259,771, mailed on May 26, 2023, 23 pages.
Examiner's Answer to Appeal Brief received for U.S. Appl. No. 16/259,771, mailed on Oct. 23, 2020, 15 pages.
Examiner's Answer to Appeal Brief received for U.S. Appl. No. 17/031,671, mailed on Dec. 8, 2023, 16 pages.
Examiner's Answer to Appeal Brief received for U.S. Appl. No. 17/461,014, mailed on Jan. 29, 2024, 13 pages.
Examiner's Pre-Review Report received for Japanese Patent Application No. 2019-215503, mailed on Aug. 20, 2021, 15 pages.
Extended European Search Report received for European Patent Application No. 17853657.9, mailed on May 28, 2020, 9 pages.
Extended European Search Report received for European Patent Application No. 19204230.7, mailed on Feb. 21, 2020, 7 pages.
Extended European Search Report received for European Patent Application No. 19212057.4, mailed on Feb. 27, 2020, 8 pages.
Extended European Search Report received for European Patent Application No. 22154034.7, mailed on May 11, 2022, 14 pages.
Extended European Search Report received for European Patent Application No. 23168077.8, mailed on Jul. 11, 2023, 12 pages.
Fedko Daria, "AR Hair Styles", Online Available at <https://www.youtube.com/watch?v=FrS6tHRbFE0>, Jan. 24, 2017, 2 pages.
Final Office Action received for U.S. Appl. No. 13/082,035, mailed on Apr. 16, 2015, 24 pages.
Final Office Action received for U.S. Appl. No. 13/082,035, mailed on Aug. 15, 2013, 24 pages.
Final Office Action received for U.S. Appl. No. 14/866,560, mailed on Oct. 9, 2018, 22 pages.
Final Office Action received for U.S. Appl. No. 16/116,221, mailed on Mar. 22, 2019, 35 pages.
Final Office Action received for U.S. Appl. No. 16/259,771, mailed on Aug. 12, 2022, 25 pages.
Final Office Action received for U.S. Appl. No. 16/259,771, mailed on Nov. 18, 2019, 13 pages.
Final Office Action received for U.S. Appl. No. 16/833,436, mailed on Sep. 21, 2021, 29 pages.
Final Office Action received for U.S. Appl. No. 17/031,671, mailed on Nov. 15, 2022, 27 pages.
Final Office Action received for U.S. Appl. No. 17/031,671, mailed on Sep. 7, 2021, 27 pages.
Final Office Action received for U.S. Appl. No. 17/031,765, mailed on Oct. 29, 2021, 34 pages.
Final Office Action received for U.S. Appl. No. 17/031,765, mailed on Sep. 1, 2023, 37 pages.
Final Office Action received for U.S. Appl. No. 17/031,765, mailed on Sep. 12, 2022, 37 pages.
Final Office Action received for U.S. Appl. No. 17/093,408, mailed on Mar. 2, 2023, 51 pages.
Final Office Action received for U.S. Appl. No. 17/093,408, mailed on May 18, 2022, 41 pages.
Final Office Action received for U.S. Appl. No. 17/461,014, mailed on Apr. 6, 2023, 24 pages.
Final Office Action received for U.S. Appl. No. 17/667,350, mailed on Jul. 26, 2023, 19 pages.
Final Office Action received for U.S. Appl. No. 17/667,350, mailed on Mar. 21, 2024, 19 pages.
Flatlinevertigo, "Black Desert Online:: Intro to Hair Customization", Online Available at: <https://www.youtube.com/watch?v=9MCbfd_eMEg>, Sep. 9, 2015, 3 pages.
Gao et al., "Automatic Unpaired Shape Deformation Transfer", ACM Transactions on Graphics, Online available at: https://doi.org/10.1145/3272127.3275028, 2018, 11 pages.
Gauging Gadgets, "How to Customize Watch Faces—Garmin Venu Tutorial", Online Available at: https://www.youtube.com/watch?v=dxajKKulaP0, Jan. 7, 2020, 14 pages.
Here are Warez Files:Eve Online Character Creator, Online Available at: <http://theherearewarezfiles.blogspot.com/2014/03/eve-online-character-creator-download.html>, Mar. 3, 2014, 7 pages.

(56)         References Cited

OTHER PUBLICATIONS

How to create a character for beginners in FF14 and recommended races, Available online at: https://ff14startup.net/character-making-99/, Sep. 20, 2016, 16 pages.

ILovex, ""Stripe Generator", a tool that makes it easy to create striped materials", Online available at: https://www.ilovex.co.jp/blog/system/webconsulting/stripe-generator.html, May 2, 2012, 3 pages.

Intention to Grant received for Danish Patent Application No. PA201870372, mailed on Feb. 13, 2020, 2 pages.

Intention to Grant received for Danish Patent Application No. PA201870375, mailed on Jun. 3, 2019, 2 pages.

Intention to Grant received for Danish Patent Application No. PA201870375, mailed on Mar. 26, 2019, 2 pages.

Intention to Grant received for Danish Patent Application No. PA201870377, mailed on Mar. 26, 2019, 2 pages.

Intention to Grant received for Danish Patent Application No. PA202070623, mailed on Jul. 20, 2022, 2 pages.

Intention to Grant received for European Patent Application No. 19172407.9, mailed on Feb. 11, 2021, 9 pages.

Intention to Grant received for European Patent Application No. 19181242.9, mailed on Nov. 17, 2022, 9 pages.

Intention to Grant received for European Patent Application No. 19181242.9, mailed on Oct. 28, 2021, 16 pages.

Intention to Grant received for European Patent Application No. 20168021.2, mailed on Apr. 15, 2021, 8 pages.

Intention to Grant received for European Patent Application No. 20168021.2, mailed on Sep. 20, 2021, 8 pages.

Intention to Grant received for European Patent Application No. 21728746.5, mailed on Jul. 12, 2024, 10 pages.

International Preliminary Report on Patentability received for PCT Patent Application No. PCT/US2011/031616, mailed on Oct. 18, 2012, 6 pages.

International Preliminary Report on Patentability received for PCT Patent Application No. PCT/US2017/049795, mailed on Apr. 4, 2019, 16 pages.

International Preliminary Report on Patentability received for PCT Patent Application No. PCT/US2019/023793, mailed on Nov. 19, 2020, 12 pages.

International Preliminary Report on Patentability received for PCT Patent Application No. PCT/US2019/024067, mailed on Nov. 19, 2020, 12 pages.

International Preliminary Report on Patentability received for PCT Patent Application No. PCT/US2020/014176, mailed on Jul. 29, 2021, 9 pages.

International Preliminary Report on Patentability received for PCT Patent Application No. PCT/US2021/031096, mailed on Nov. 24, 2022, 11 pages.

International Preliminary Report on Patentability received for PCT Patent Application No. PCT/US2021/031212, mailed on Nov. 24, 2022, 16 pages.

International Preliminary Report on Patentability received for PCT Patent Application No. PCT/US2022/016451, mailed on Aug. 31, 2023, 13 pages.

International Preliminary Report on Patentability received for PCT Patent Application No. PCT/US2022/044194, mailed on Apr. 4, 2024, 12 pages.

International Preliminary Report on Patentability received for PCT Patent Application No. PCT/US2023/017484, mailed on Oct. 17, 2024, 21 pages.

International Search Report and Written Opinion received for PCT Application No. PCT/US2017/049795, mailed on Dec. 27, 2017, 26 pages.

International Search Report and Written Opinion received for PCT Patent Application No. PCT/US2011/031616, mailed on Aug. 30, 2011, 8 pages.

International Search Report and Written Opinion received for PCT Patent Application No. PCT/US2019/023793, mailed on Aug. 27, 2019, 17 pages.

International Search Report and Written Opinion received for PCT Patent Application No. PCT/US2019/024067, mailed on Oct. 9, 2019, 18 pages.

International Search Report and Written Opinion received for PCT Patent Application No. PCT/US2020/014176, mailed on Mar. 26, 2020, 12 pages.

International Search Report and Written Opinion received for PCT Patent Application No. PCT/US2021/031096, mailed on Oct. 13, 2021, 16 pages.

International Search Report and Written Opinion received for PCT Patent Application No. PCT/US2021/031212, mailed on Sep. 21, 2021, 21 pages.

International Search Report and Written Opinion received for PCT Patent Application No. PCT/US2022/016451, mailed on Jun. 24, 2022, 18 pages.

International Search Report and Written Opinion received for PCT Patent Application No. PCT/US2022/044194, mailed on Feb. 13, 2023, 18 pages.

International Search Report and Written Opinion received for PCT Patent Application No. PCT/US2023/017484, mailed on Aug. 28, 2023, 28 pages.

International Search Report and Written Opinion received for PCT Patent Application No. PCT/US2023/031979, mailed on Mar. 12, 2024, 16 pages.

International Search Report and Written Opinion received for PCT Patent Application No. PCT/US2024/025380, mailed on Sep. 23, 2024, 23 pages.

Invitation to Pay Additional Fees and Partial International Search Report received for PCT Patent Application No. PCT/US2022/044194, mailed on Dec. 15, 2022, 10 pages.

Invitation to Pay Additional Fees and Partial International Search Report received for PCT Patent Application No. PCT/US2023/017484, mailed on Jul. 7, 2023, 20 pages.

Invitation to Pay Additional Fees and Partial International Search Report received for PCT Patent Application No. PCT/US2023/031979, mailed on Jan. 19, 2024, 9 pages.

Invitation to Pay Additional Fees and Partial International Search Report received for PCT Patent Application No. PCT/US2024/025380, mailed on Aug. 1, 2024, 15 pages.

Invitation to Pay Additional Fees received for PCT Patent Application No. PCT/US2017/049795, mailed on Nov. 3, 2017, 3 pages.

Invitation to Pay Additional Fees received for PCT Patent Application No. PCT/US2019/023793, mailed on Jul. 5, 2019, 11 pages.

Invitation to Pay Additional Fees received for PCT Patent Application No. PCT/US2019/024067, mailed on Jul. 16, 2019, 13 pages.

Invitation to Pay Additional Fees received for PCT Patent Application No. PCT/US2021/031096, mailed on Aug. 19, 2021, 8 pages.

Invitation to Pay Additional Fees received for PCT Patent Application No. PCT/US2021/031212, mailed on Jul. 28, 2021, 19 pages.

Invitation to Pay Additional Fees received for PCT Patent Application No. PCT/US2022/016451, mailed on Apr. 28, 2022, 11 pages.

Invitation to Pay Search Fees received for European Patent Application No. 19724959.2, mailed on Feb. 25, 2020, 3 pages.

Invitation to Pay Search Fees received for European Patent Application No. 21727979.3, mailed on Jul. 10, 2024, 4 pages.

Kafai et al., "Your Second Selves: Player-Designed Avatars", Games and Culture, May 23, 2010, 21 pages.

Koti Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.

Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.

Kyoko Makino, "How to Make a Lookalike Face Icon for Your Friend", ASCII, Japan Weekly, ASCII Media Works Inc., vol. 24, pp. 90-93, Jul. 17, 2014, 7 pages.

Lang Brian, "How to Audio & Video Chat with Multiple Users at the Same Time in Groups", Snapchat 101, Online Available at:

(56)                References Cited

OTHER PUBLICATIONS

<https://smartphones.gadgethacks.com/how-to/snapchat-101-audio-video-chat-with-multiple-users-same-time-groups-0184113/>, Apr. 17, 2018, 4 pages.
Lein et al., "Patternizer", Available online at: https://patternizer.com/, Apr. 2016, 5 pages.
Mai et al., "Frontal Screens on Head-Mounted Displays to Increase Awareness of the HMD Users' State in Mixed Presence Collaboration", May 15, 2019, 10 pages.
Mai et al., "TransparentHMD", Revealing the HMD User's Face to Bystanders, Nov. 26-29, 2017, 6 pages.
Maruberi, "[App Introduction] #3 Luxambra (Selecting the game to play with Hotman next after Maruberi)", Available online at: https://www.youtube.com/watch?v=e4ukNZ-1OrY, Jun. 22, 2014, 2 pages.
Minutes of the Oral Proceedings received for European Patent Application No. 19181242.9, mailed on Dec. 15, 2020, 6 pages.
Minutes of the Oral Proceedings received for European Patent Application No. 19204230.7, mailed on Feb. 2, 2022, 9 pages.
Minutes of the Oral Proceedings received for European Patent Application No. 19212057.4, mailed on Jan. 31, 2024, 6 pages.
Minutes of the Oral Proceedings received for European Patent Application No. 19724959.2, mailed on Jun. 14, 2021, 6 pages.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages.
Neurotechnology, "Sentimask SDK", Available at: https://www.neurotechnology.com/sentimask.html, Apr. 22, 2018, 5 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 13/082,035, mailed on Apr. 21, 2016, 25 pages.
Non-Final Office Action received for U.S. Appl. No. 13/082,035, mailed on Dec. 19, 2012, 19 pages.
Non-Final Office Action received for U.S. Appl. No. 13/082,035, mailed on Sep. 11, 2014, 23 pages.
Non-Final Office Action received for U.S. Appl. No. 14/866,560, mailed on Apr. 19, 2018, 10 pages.
Non-Final Office Action received for U.S. Appl. No. 14/866,560, mailed on Apr. 30, 2019, 23 pages.
Non-Final Office Action received for U.S. Appl. No. 16/116,221, mailed on Nov. 13, 2018, 27 pages.
Non-Final Office Action received for U.S. Appl. No. 16/142,288, mailed on Nov. 20, 2018, 15 pages.
Non-Final Office Action received for U.S. Appl. No. 16/142,305, mailed on Nov. 23, 2018, 32 pages.
Non-Final Office Action received for U.S. Appl. No. 16/142,328, mailed on Nov. 8, 2018, 18 pages.
Non-Final Office Action received for U.S. Appl. No. 16/143,097, mailed on Feb. 28, 2019, 17 pages.
Non-Final Office Action received for U.S. Appl. No. 16/259,771, mailed on Jan. 25, 2022, 20 pages.
Non-Final Office Action received for U.S. Appl. No. 16/259,771, mailed on May 8, 2019, 11 pages.
Non-Final Office Action received for U.S. Appl. No. 16/519,850, mailed on Mar. 23, 2020, 8 pages.
Non-Final Office Action received for U.S. Appl. No. 16/599,433, mailed on Jan. 28, 2021, 16 pages.
Non-Final Office Action received for U.S. Appl. No. 16/663,062, mailed on Oct. 28, 2020, 14 pages.
Non-Final Office Action received for U.S. Appl. No. 16/833,436, mailed on Mar. 29, 2021, 27 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 1, 2022, 32 pages.
Non-Final Office Action received for U.S. Appl. No. 17/031,671, mailed on Apr. 30, 2021, 27 pages.
Non-Final Office Action received for U.S. Appl. No. 17/031,671, mailed on Mar. 17, 2023, 34 pages.
Non-Final Office Action received for U.S. Appl. No. 17/031,765, mailed on Jun. 28, 2021, 32 pages.
Non-Final Office Action received for U.S. Appl. No. 17/031,765, mailed on Mar. 28, 2023, 31 pages.
Non-Final Office Action received for U.S. Appl. No. 17/031,765, mailed on Mar. 29, 2022, 33 pages.
Non-Final Office Action received for U.S. Appl. No. 17/091,460, mailed on Sep. 10, 2021, 10 pages.
Non-Final Office Action received for U.S. Appl. No. 17/093,408, mailed on Dec. 8, 2021, 37 pages.
Non-Final Office Action received for U.S. Appl. No. 17/093,408, mailed on Sep. 14, 2022, 46 pages.
Non-Final Office Action received for U.S. Appl. No. 17/370,505, mailed on Jul. 6, 2022, 14 pages.
Non-Final Office Action received for U.S. Appl. No. 17/373,163, mailed on Jan. 27, 2022, 14 pages.
Non-Final Office Action received for U.S. Appl. No. 17/461,014, mailed on Dec. 7, 2022, 22 pages.
Non-Final Office Action received for U.S. Appl. No. 17/667,350, mailed on Apr. 21, 2023, 16 pages.
Non-Final Office Action received for U.S. Appl. No. 17/667,350, mailed on Oct. 12, 2023, 21 pages.
Non-Final Office Action received for U.S. Appl. No. 17/944,911, mailed on Dec. 26, 2023, 21 pages.
Non-Final Office Action received for U.S. Appl. No. 17/944,911, mailed on Mar. 26, 2024, 11 pages.
Non-Final Office Action received for U.S. Appl. No. 18/138,634, mailed on Jan. 16, 2024, 14 pages.
Non-Final Office Action received for U.S. Appl. No. 18/197,242, mailed on Dec. 7, 2023, 24 pages.
Non-Final Office Action received for U.S. Appl. No. 18/230,465, mailed on Aug. 15, 2024, 37 pages.
Non-Final Office Action received for U.S. Appl. No. 18/241,802, mailed on May 17, 2024, 57 pages.
Non-Final Office Action received for U.S. Appl. No. 18/375,309, mailed on Jul. 29, 2024, 19 pages.
Non-Final Office Action received for U.S. Appl. No. 18/407,241, mailed on Oct. 1, 2024, 9 pages.
Notice of Acceptance received for Australian Patent Application No. 2017330212, mailed on Apr. 28, 2020, 3 pages.
Notice of Acceptance received for Australian Patent Application No. 2019265357, mailed on Dec. 24, 2020, 3 pages.
Notice of Acceptance received for Australian Patent Application No. 2019266049, mailed on Nov. 24, 2020, 3 pages.
Notice of Acceptance received for Australian Patent Application No. 2020213402, mailed on Sep. 21, 2020, 3 pages.
Notice of Acceptance received for Australian Patent Application No. 2020239749, mailed on May 27, 2022, 3 pages.
Notice of Acceptance received for Australian Patent Application No. 2020294208, mailed on Mar. 2, 2022, 3 pages.
Notice of Acceptance received for Australian Patent Application No. 2021201295, mailed on May 10, 2022, 3 pages.
Notice of Acceptance received for Australian Patent Application No. 2021202254, mailed on Nov. 16, 2022, 3 pages.
Notice of Acceptance received for Australian Patent Application No. 2022200965, mailed on May 11, 2023, 3 pages.
Notice of Acceptance received for Australian Patent Application No. 2022215297, mailed on Sep. 26, 2022, 3 pages.
Notice of Acceptance received for Australian Patent Application No. 2022220279, mailed on Sep. 27, 2022, 3 pages.
Notice of Acceptance received for Australian Patent Application No. 2023200039, mailed on Aug. 31, 2023, 3 pages.
Notice of Acceptance received for Australian Patent Application No. 2023201250, mailed on Nov. 21, 2023, 3 pages.
Notice of Acceptance received for Australian Patent Application No. 2023282284, mailed on Jul. 18, 2024, 3 pages.
Notice of Allowance received for Chinese Patent Application No. 201780058426.4, mailed on Jun. 30, 2023, 2 pages.

(56)     References Cited

OTHER PUBLICATIONS

Notice of Allowance received for Chinese Patent Application No. 201910315328.5, mailed on Aug. 24, 2022, 4 pages.
Notice of Allowance received for Chinese Patent Application No. 201910379481.4, mailed on Nov. 9, 2020, 6 pages.
Notice of Allowance received for Chinese Patent Application No. 201910692978.1, mailed on Feb. 4, 2021, 6 pages.
Notice of Allowance received for Chinese Patent Application No. 201911202668.3, mailed on Feb. 4, 2021, 5 pages.
Notice of Allowance received for Chinese Patent Application No. 201911219525.3, mailed on Sep. 29, 2020, 2 pages.
Notice of Allowance received for Chinese Patent Application No. 202110530629.7, mailed on Oct. 28, 2024, 2 pages.
Notice of Allowance received for Chinese Patent Application No. 202110820692.4, mailed on Nov. 16, 2022, 2 pages.
Notice of Allowance received for Chinese Patent Application No. 202310124087.2, mailed on Jan. 25, 2024, 4 pages.
Notice of Allowance received for Danish Patent Application No. PA202070623, mailed on Sep. 20, 2022, 2 pages.
Notice of Allowance received for Japanese Patent Application No. 2018-184254, mailed on Jun. 15, 2020, 5 pages.
Notice of Allowance received for Japanese Patent Application No. 2019-215503, mailed on Aug. 26, 2022, 3 pages.
Notice of Allowance received for Japanese Patent Application No. 2019-511767, mailed on Mar. 30, 2020, 4 pages.
Notice of Allowance received for Japanese Patent Application No. 2020-120086, mailed on Nov. 15, 2021, 5 pages.
Notice of Allowance received for Japanese Patent Application No. 2020-159823, mailed on Jul. 24, 2023, 23 pages.
Notice of Allowance received for Japanese Patent Application No. 2020-159825, mailed on Mar. 25, 2022, 5 pages.
Notice of Allowance received for Japanese Patent Application No. 2021-092483, mailed on Sep. 30, 2022, 4 pages.
Notice of Allowance received for Japanese Patent Application No. 2021-153573, mailed on Feb. 17, 2023, 4 pages.
Notice of Allowance received for Japanese Patent Application No. 2022-170806, mailed on Aug. 9, 2024, 4 pages.
Notice of Allowance received for Japanese Patent Application No. 2023-043407, mailed on Jul. 26, 2024, 4 pages.
Notice of Allowance received for Korean Patent Application No. 10-2019-7005369, mailed on Oct. 26, 2020, 4 pages.
Notice of Allowance received for Korean Patent Application No. 10-2020-0123852, mailed on Mar. 9, 2023, 7 pages.
Notice of Allowance received for Korean Patent Application No. 10-2020-0123852, mailed on Nov. 28, 2022, 7 pages.
Notice of Allowance received for Korean Patent Application No. 10-2020-0123857, mailed on Feb. 21, 2023, 6 pages.
Notice of Allowance received for Korean Patent Application No. 10-2020-0123887, mailed on Nov. 28, 2022, 7 pages.
Notice of Allowance received for Korean Patent Application No. 10-2020-7031855, mailed on Mar. 22, 2021, 5 pages.
Notice of Allowance received for Korean Patent Application No. 10-2020-7032147, mailed on May 12, 2021, 5 pages.
Notice of Allowance received for Korean Patent Application No. 10-2021-7019525, mailed on Jul. 13, 2021, 5 pages.
Notice of Allowance received for Korean Patent Application No. 10-2021-7023617, mailed on Dec. 21, 2021, 6 pages.
Notice of Allowance received for Korean Patent Application No. 10-2022-7002829, mailed on Feb. 12, 2022, 6 pages.
Notice of Allowance received for Korean Patent Application No. 10-2022-7003364, mailed on Jul. 28, 2023, 7 pages.
Notice of Allowance received for Korean Patent Application No. 10-2022-7009437, mailed on Jun. 22, 2023, 7 pages.
Notice of Allowance received for Korean Patent Application No. 10-2022-7016421, mailed on May 25, 2022, 6 pages.
Notice of Allowance received for Korean Patent Application No. 10-2022-7029729, mailed on Nov. 9, 2023, 8 pages.
Notice of Allowance received for Korean Patent Application No. 10-2023-0064928, mailed on Sep. 22, 2023, 7 pages.

Notice of Allowance received for Korean Patent Application No. 10-2023-0189466, mailed on Jul. 22, 2024, 8 pages.
Notice of Allowance received for Korean Patent Application No. 10-2023-0189466, mailed on Nov. 5, 2024, 10 pages.
Notice of Allowance received for Korean Patent Application No. 10-2023-7032383, mailed on Aug. 29, 2024, 10 pages.
Notice of Allowance received for U.S. Appl. No. 13/082,035, mailed on Oct. 5, 2016, 9 pages.
Notice of Allowance received for U.S. Appl. No. 14/866,560, mailed on Nov. 15, 2019, 9 pages.
Notice of Allowance received for U.S. Appl. No. 15/713,490, mailed on Mar. 20, 2019, 15 pages.
Notice of Allowance received for U.S. Appl. No. 16/110,514, mailed on Apr. 29, 2019, 9 pages.
Notice of Allowance received for U.S. Appl. No. 16/110,514, mailed on Mar. 13, 2019, 11 pages.
Notice of Allowance received for U.S. Appl. No. 16/116,221, mailed on Nov. 22, 2019, 13 pages.
Notice of Allowance received for U.S. Appl. No. 16/116,221, mailed on Sep. 20, 2019, 13 pages.
Notice of Allowance received for U.S. Appl. No. 16/142,288, mailed on Jun. 24, 2019, 10 pages.
Notice of Allowance received for U.S. Appl. No. 16/142,288, mailed on Mar. 27, 2019, 9 pages.
Notice of Allowance received for U.S. Appl. No. 16/142,288, mailed on May 1, 2019, 4 pages.
Notice of Allowance received for U.S. Appl. No. 16/142,305, mailed on Apr. 3, 2019, 5 pages.
Notice of Allowance received for U.S. Appl. No. 16/142,305, mailed on May 1, 2019, 2 pages.
Notice of Allowance received for U.S. Appl. No. 16/142,328, mailed on Apr. 5, 2019, 7 pages.
Notice of Allowance received for U.S. Appl. No. 16/143,097, mailed on Aug. 29, 2019, 23 pages.
Notice of Allowance received for U.S. Appl. No. 16/143,201, mailed on Feb. 8, 2019, 9 pages.
Notice of Allowance received for U.S. Appl. No. 16/143,201, mailed on Nov. 28, 2018, 14 pages.
Notice of Allowance received for U.S. Appl. No. 16/519,850, mailed on Aug. 26, 2020, 8 pages.
Notice of Allowance received for U.S. Appl. No. 16/599,433, mailed on May 14, 2021, 11 pages.
Notice of Allowance received for U.S. Appl. No. 16/599,433, mailed on Oct. 4, 2021, 13 pages.
Notice of Allowance received for U.S. Appl. No. 16/663,062, mailed on Jul. 13, 2021, 7 pages.
Notice of Allowance received for U.S. Appl. No. 16/663,062, mailed on Mar. 24, 2021, 8 pages.
Notice of Allowance received for U.S. Appl. No. 16/833,436, mailed on Jul. 7, 2022, 8 pages.
Notice of Allowance received for U.S. Appl. No. 16/833,436, mailed on Sep. 8, 2022, 8 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/031,765, mailed on Apr. 2, 2024, 34 pages.
Notice of Allowance received for U.S. Appl. No. 17/091,460, mailed on Apr. 28, 2022, 9 pages.
Notice of Allowance received for U.S. Appl. No. 17/091,460, mailed on Feb. 4, 2022, 10 pages.
Notice of Allowance received for U.S. Appl. No. 17/091,460, mailed on May 23, 2022, 9 pages.
Notice of Allowance received for U.S. Appl. No. 17/093,408, mailed on Aug. 30, 2023, 59 pages.
Notice of Allowance received for U.S. Appl. No. 17/370,505, mailed on Feb. 2, 2023, 8 pages.
Notice of Allowance received for U.S. Appl. No. 17/373,163, mailed on Jul. 27, 2022, 8 pages.
Notice of Allowance received for U.S. Appl. No. 17/373,163, mailed on May 11, 2022, 8 pages.

(56)　　　　References Cited

OTHER PUBLICATIONS

Notice of Allowance received for U.S. Appl. No. 17/525,664, mailed on Apr. 26, 2023, 10 pages.
Notice of Allowance received for U.S. Appl. No. 17/525,664, mailed on Feb. 14, 2023, 10 pages.
Notice of Allowance received for U.S. Appl. No. 17/525,664, mailed on Oct. 27, 2022, 11 pages.
Notice of Allowance received for U.S. Appl. No. 17/667,350, mailed on Jul. 8, 2024, 10 pages.
Notice of Allowance received for U.S. Appl. No. 17/736,925, mailed on Apr. 24, 2023, 10 pages.
Notice of Allowance received for U.S. Appl. No. 17/736,925, mailed on Aug. 3, 2023, 9 pages.
Notice of Allowance received for U.S. Appl. No. 17/941,962, mailed on Jul. 3, 2023, 9 pages.
Notice of Allowance received for U.S. Appl. No. 17/941,962, mailed on Mar. 10, 2023, 11 pages.
Notice of Allowance received for U.S. Appl. No. 17/941,962, mailed on May 3, 2023, 10 pages.
Notice of Allowance received for U.S. Appl. No. 17/944,911, mailed on Jul. 9, 2024, 10 pages.
Notice of Allowance received for U.S. Appl. No. 17/971,456, mailed on Jun. 26, 2023, 9 pages.
Notice of Allowance received for U.S. Appl. No. 18/138,634, mailed on Apr. 18, 2024, 9 pages.
Notice of Allowance received for U.S. Appl. No. 18/197,242, mailed on Jul. 10, 2024, 12 pages.
Notice of Allowance received for U.S. Appl. No. 18/197,242, mailed on Mar. 6, 2024, 11 pages.
Notice of Allowance received for U.S. Appl. No. 18/197,242, mailed on Oct. 17, 2024, 12 pages.
Notice of Allowance received for U.S. Appl. No. 18/220,715, mailed on Jun. 13, 2024, 10 pages.
Notice of Allowance received for U.S. Appl. No. 18/220,715, mailed on Mar. 7, 2024, 11 pages.
Notice of Allowance received for U.S. Appl. No. 18/230,465, mailed on Sep. 16, 2024, 5 pages.
Notice of Allowance received for U.S. Appl. No. 18/241,802, mailed on Dec. 4, 2024, 12 pages.
Notice of Allowance received for U.S. Appl. No. 18/241,802, mailed on Oct. 8, 2024, 11 pages.
Notice of Allowance received for U.S. Appl. No. 18/407,241, mailed on Nov. 14, 2024, 8 pages.
Notice of Hearing received for Indian Patent Application No. 201814036470, mailed on Feb. 7, 2024, 4 pages.
Notice of Hearing received for Indian Patent Application No. 201814036472, mailed on May 9, 2024, 2 pages.
Office Action received for Australian Patent Application No. 2017330212, mailed on Feb. 21, 2020, 2 pages.
Office Action received for Australian Patent Application No. 2019100794, mailed on Oct. 3, 2019, 4 pages.
Office Action received for Australian Patent Application No. 2020100189, mailed on Apr. 1, 2020, 3 pages.
Office Action received for Australian Patent Application No. 2020101043, mailed on Aug. 14, 2020, 5 pages.
Office Action received for Australian Patent Application No. 2020101043, mailed on Oct. 30, 2020, 4 pages.
Office Action received for Australian Patent Application No. 2020239749, mailed on Jan. 21, 2022, 4 pages.
Office Action received for Australian Patent Application No. 2020239749, mailed on Jul. 16, 2021, 5 pages.
Office Action received for Australian Patent Application No. 2020294208, mailed on Dec. 17, 2021, 2 pages.
Office Action received for Australian Patent Application No. 2021201295, mailed on Jan. 14, 2022, 3 pages.
Office Action received for Australian Patent Application No. 2021202254, mailed on Jun. 20, 2022, 2 pages.
Office Action received for Australian Patent Application No. 2022200965, mailed on Feb. 14, 2023, 4 pages.

Office Action received for Australian Patent Application No. 2023200039, mailed on Jul. 4, 2023, 2 pages.
Office Action received for Australian Patent Application No. 2023201250, mailed on Sep. 11, 2023, 3 pages.
Office Action received for Australian Patent Application No. 2023219926, mailed on Aug. 24, 2024, 5 pages.
Office Action received for Australian Patent Application No. 2023282284, mailed on Jan. 19, 2024, 6 pages.
Office Action received for Chinese Patent Application No. 201780058426.4, mailed on Dec. 2, 2022, 11 pages.
Office Action received for Chinese Patent Application No. 201910315328.5, mailed on Nov. 30, 2021, 21 pages.
Office Action received for Chinese Patent Application No. 201910379481.4, mailed on Mar. 2, 2020, 18 pages.
Office Action received for Chinese Patent Application No. 201910691865.X, mailed on Aug. 4, 2021, 10 pages.
Office Action received for Chinese Patent Application No. 201910691865.X, mailed on Feb. 4, 2021, 16 pages.
Office Action received for Chinese Patent Application No. 201910691865.X, mailed on Jul. 8, 2020, 17 pages.
Office Action received for Chinese Patent Application No. 201910691872.X, mailed on Jun. 3, 2020, 10 pages.
Office Action received for Chinese Patent Application No. 201910691872.X, mailed on Jun. 23, 2021, 10 pages.
Office Action received for Chinese Patent Application No. 201910691872.X, mailed on Mar. 24, 2021, 19 pages.
Office Action received for Chinese Patent Application No. 201910691872.X, mailed on Nov. 10, 2021, 16 pages.
Office Action received for Chinese Patent Application No. 201910692978.1, mailed on Apr. 3, 2020, 19 pages.
Office Action received for Chinese Patent Application No. 201910692978.1, mailed on Nov. 4, 2020, 4 pages.
Office Action received for Chinese Patent Application No. 201911199054.4, mailed on Jan. 20, 2021, 19 pages.
Office Action received for Chinese Patent Application No. 201911199054.4, mailed on Jul. 3, 2020, 15 pages.
Office Action received for Chinese Patent Application No. 201911199054.4, mailed on Jun. 10, 2021, 13 pages.
Office Action received for Chinese Patent Application No. 201911202668.3, mailed on Aug. 4, 2020, 13 pages.
Office Action received for Chinese Patent Application No. 201911219525.3, mailed on Jul. 10, 2020, 7 pages.
Office Action received for Chinese Patent Application No. 202010330318.1, mailed on Jul. 13, 2021, 12 pages.
Office Action received for Chinese Patent Application No. 202010330318.1, mailed on Mar. 31, 2021, 13 pages.
Office Action received for Chinese Patent Application No. 202010330318.1, mailed on Nov. 19, 2020, 18 pages.
Office Action received for Chinese Patent Application No. 202080009772.5, mailed on Aug. 17, 2024, 28 pages.
Office Action received for Chinese Patent Application No. 202110530629.7, mailed on Mar. 14, 2024, 13 pages.
Office Action received for Chinese Patent Application No. 202110820692.4, mailed on Mar. 15, 2022, 18 pages.
Office Action received for Chinese Patent Application No. 202310124087.2, mailed on Sep. 9, 2023, 24 pages.
Office Action received for Danish Patent Application No. PA201870366, mailed on Aug. 22, 2019, 3 pages.
Office Action received for Danish Patent Application No. PA201870366, mailed on Dec. 12, 2018, 3 pages.
Office Action received for Danish Patent Application No. PA201870367, mailed on Dec. 20, 2018, 5 pages.
Office Action received for Danish Patent Application No. PA201870368, mailed on Dec. 20, 2018, 5 pages.
Office Action received for Danish Patent Application No. PA201870368, mailed on Oct. 1, 2019, 6 pages.
Office Action received for Danish Patent Application No. PA201870372, mailed on Aug. 20, 2019, 2 pages.
Office Action received for Danish Patent Application No. PA201870372, mailed on Jan. 31, 2019, 4 pages.
Office Action received for Danish Patent Application No. PA201870374, mailed on Feb. 6, 2019, 5 pages.

(56) References Cited

OTHER PUBLICATIONS

Office Action received for Danish Patent Application No. PA201870374, mailed on Jun. 17, 2019, 5 pages.
Office Action received for Danish Patent Application No. PA201870375, mailed on Jan. 31, 2019, 4 pages.
Office Action received for Danish Patent Application No. PA201870377, mailed on Jan. 31, 2019, 4 pages.
Office Action received for Danish Patent Application No. PA202070623, mailed on Aug. 24, 2021, 3 pages.
Office Action received for Danish Patent Application No. PA202070623, mailed on May 23, 2022, 3 pages.
Office Action received for Danish Patent Application No. PA202070624, mailed on Feb. 4, 2022, 4 pages.
Office Action received for Danish Patent Application No. PA202070624, mailed on Jun. 16, 2021, 5 pages.
Office Action received for Danish Patent Application No. PA202070625, mailed on Feb. 8, 2022, 2 pages.
Office Action received for Danish Patent Application No. PA202070625, mailed on Jun. 16, 2021, 3 pages.
Office Action received for Danish Patent Application No. PA202070625, mailed on Sep. 23, 2022, 4 pages.
Office Action received for European Patent Application No. 17853657.9, mailed on Apr. 1, 2021, 6 pages.
Office Action received for European Patent Application No. 19172407.9, mailed on Oct. 18, 2019, 7 pages.
Office Action received for European Patent Application No. 19181242.9, mailed on Dec. 6, 2019, 9 pages.
Office Action received for European Patent Application No. 19204230.7, mailed on Sep. 28, 2020, 6 pages.
Office Action received for European Patent Application No. 19212057.4, mailed on Mar. 9, 2021, 6 pages.
Office Action received for European Patent Application No. 19724959.2, mailed on Apr. 23, 2020, 10 pages.
Office Action received for European Patent Application No. 20168021.2, mailed on Jul. 22, 2020, 8 pages.
Office Action received for European Patent Application No. 20704768.9, mailed on Mar. 24, 2023, 8 pages.
Office Action received for European Patent Application No. 21727979.3, mailed on Sep. 26, 2024, 11 pages.
Office Action received for European Patent Application No. 21728746.5, mailed on Aug. 21, 2023, 4 pages.
Office Action received for European Patent Application No. 21728746.5, mailed on Jan. 11, 2024, 4 pages.
Office Action received for European Patent Application No. 22154034.7, mailed on Feb. 19, 2024, 8 pages.
Office Action received for European Patent Application No. 22154034.7, mailed on May 26, 2023, 10 pages.
Office Action received for European Patent Application No. 22154034.7, mailed on Oct. 11, 2024, 8 pages.
Office Action received for European Patent Application No. 23168077.8, mailed on Apr. 25, 2024, 7 pages.
Office Action received for European Patent Application No. 23168077.8, mailed on Nov. 21, 2024, 8 pages.
Office Action received for Indian Patent Application No. 201814036470, mailed on Feb. 26, 2021, 7 pages.
Office Action received for Indian Patent Application No. 201814036472, mailed on Jul. 8, 2021, 8 pages.
Office Action received for Indian Patent Application No. 202015008746, mailed on Mar. 6, 2023, 7 pages.
Office Action received for Indian Patent Application No. 202015008747, mailed on Mar. 15, 2023, 10 pages.
Office Action received for Indian Patent Application No. 202215026045, mailed on Mar. 31, 2023, 8 pages.
Office Action received for Indian Patent Application No. 202215026505, mailed on Feb. 8, 2023, 9 pages.
Office Action received for Japanese Patent Application No. 2018-182607, mailed on Apr. 6, 2020, 6 pages.
Office Action received for Japanese Patent Application No. 2018-182607, mailed on Jul. 20, 2020, 5 pages.

Office Action received for Japanese Patent Application No. 2018-182607, mailed on Sep. 8, 2021, 7 pages.
Office Action received for Japanese Patent Application No. 2018-184254, mailed on Mar. 2, 2020, 8 pages.
Office Action received for Japanese Patent Application No. 2019-215503, mailed on Feb. 5, 2021, 12 pages.
Office Action received for Japanese Patent Application No. 2019-215503, mailed on Jul. 3, 2020, 12 pages.
Office Action received for Japanese Patent Application No. 2020-120086, mailed on May 21, 2021, 6 pages.
Office Action received for Japanese Patent Application No. 2020-120086, mailed on Nov. 20, 2020, 6 pages.
Office Action received for Japanese Patent Application No. 2020-159823, mailed on Aug. 15, 2022, 6 pages.
Office Action received for Japanese Patent Application No. 2020-159823, mailed on Dec. 23, 2021, 8 pages.
Office Action received for Japanese Patent Application No. 2020-159824, mailed on Dec. 17, 2021, 13 pages.
Office Action received for Japanese Patent Application No. 2020-159825, mailed on Dec. 10, 2021, 4 pages.
Office Action received for Japanese Patent Application No. 2020-193703, mailed on Apr. 19, 2021, 4 pages.
Office Action received for Japanese Patent Application No. 2021-092483, mailed on Apr. 1, 2022, 8 pages.
Office Action received for Japanese Patent Application No. 2021-153573, mailed on Oct. 17, 2022, 4 pages.
Office Action received for Japanese Patent Application No. 2021-166686, mailed on Oct. 3, 2022, 3 pages.
Office Action received for Japanese Patent Application No. 2022-170806, mailed on May 13, 2024, 4 pages.
Office Action received for Japanese Patent Application No. 2022-170806, mailed on Nov. 17, 2023, 14 pages.
Office Action received for Japanese Patent Application No. 2022-194369, mailed on Mar. 15, 2024, 11 pages.
Office Action received for Japanese Patent Application No. 2022-194369, mailed on Sep. 20, 2024, 5 pages.
Office Action received for Japanese Patent Application No. 2023-548256, mailed on Aug. 5, 2024, 8 pages.
Office Action received for Japanese Patent Application No. 2023-548256, mailed on Nov. 11, 2024, 6 pages.
Office Action received for Korean Patent Application No. 10-2019-7005369, mailed on Mar. 13, 2020, 12 pages.
Office Action received for Korean Patent Application No. 10-2020-0123852, mailed on Jun. 9, 2022, 10 pages.
Office Action received for Korean Patent Application No. 10-2020-0123857, mailed on Dec. 16, 2022, 8 pages.
Office Action received for Korean Patent Application No. 10-2020-0123857, mailed on Jun. 9, 2022, 12 pages.
Office Action received for Korean Patent Application No. 10-2020-0123887, mailed on Jun. 9, 2022, 5 pages.
Office Action received for Korean Patent Application No. 10-2020-7031855, mailed on Nov. 24, 2020, 6 pages.
Office Action received for Korean Patent Application No. 10-2020-7032147, mailed on Feb. 16, 2021, 6 pages.
Office Action received for Korean Patent Application No. 10-2021-7002582, mailed on Apr. 16, 2021, 13 pages.
Office Action received for Korean Patent Application No. 10-2021-7002582, mailed on Oct. 29, 2021, 6 pages.
Office Action received for Korean Patent Application No. 10-2022-7003364, mailed on Apr. 22, 2022, 14 pages.
Office Action received for Korean Patent Application No. 10-2022-7003364, mailed on Dec. 26, 2022, 8 pages.
Office Action received for Korean Patent Application No. 10-2022-7009437, mailed on Nov. 30, 2022, 6 pages.
Office Action received for Korean Patent Application No. 10-2023-0064928, mailed on Jun. 9, 2023, 6 pages.
Office Action received for Korean Patent Application No. 10-2023-7032383, mailed on Feb. 5, 2024, 16 pages.
Office Action received for Korean Patent Application No. 10-2023-7037034, mailed on Jul. 22, 2024, 23 pages.
Office Action received for Korean Patent Application No. 10-2024-7004853, mailed on Mar. 4, 2024, 6 pages.

(56) References Cited

OTHER PUBLICATIONS

Office Action received for Taiwanese Patent Application No. 100111887, mailed on Oct. 7, 2013, 23 pages.
Pavlakos et al., "Expressive Body Capture: 3D Hands, Face, and Body from a Single Image", In Proceedings of the IEEE/CVF conference on computer vision and pattern recognition 2019, online available at https://arxiv.org/abs/1904.05866, 2019, pp. 10975-10985.
PC World, "How to make AR Emojis on the Samsung Galaxy S9", You Tube, Available Online: https://www.youtube.com/watch?v=8wQICfulkz0, Feb. 25, 2018, 2 pages.
Pre-Appeal Review Report received for Japanese Patent Application No. 2018-182607, mailed on Jan. 21, 2021, 4 pages.
Pre-Appeal Review Report received for Japanese Patent Application No. 2020-159823, mailed on Jan. 12, 2023, 4 pages.
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Record of Oral Hearing received for U.S. Appl. No. 16/259,771, mailed on Aug. 4, 2021, 15 pages.
Record of Oral Hearing received for U.S. Appl. No. 16/259,771, mailed on Feb. 4, 2024, 15 pages.
Record of Oral Hearing received for U.S. Appl. No. 17/031,671, mailed on Aug. 27, 2024, 17 pages.
Rekimoto et al., "Behind-the-Mask", A Face-Through Head-Mounted Display, 18, May 29-Jun. 1, 2018, 5 pages.
Result of Consultation received for European Patent Application No. 19172407.9, mailed on Nov. 5, 2020, 17 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Result of Consultation received for European Patent Application No. 19181242.9, mailed on Dec. 1, 2020, 12 pages.
Rosa et al., "Stripe Generator—a Free Tool for the Web Design Community", Available online at: http://www.stripegenerator.com/, Mar. 28, 2019, 10 pages.
Rozario Hamlin, "How to Edit Photos on iPhone & iPad", Online Available at:https://osxdaily.com/2020/01/23/how-to-edit-photos-on-iphone-ipad/, Jan. 23, 2020, 10 pages.
Search Report and Opinion received for Danish Patent Application No. PA201870366, mailed on Aug. 27, 2018, 9 pages.
Search Report and Opinion received for Danish Patent Application No. PA201870367, mailed on Aug. 27, 2018, 9 pages.
Search Report and Opinion received for Danish Patent Application No. PA201870368, mailed on Sep. 6, 2018, 7 pages.
Search Report and Opinion received for Danish Patent Application No. PA201870372, mailed on Sep. 14, 2018, 8 pages.
Search Report and Opinion received for Danish Patent Application No. PA201870372, mailed on Sep. 17, 2018, 10 pages.
Search Report and Opinion received for Danish Patent Application No. PA201870374, mailed on Aug. 27, 2018, 9 pages.
Search Report and Opinion received for Danish Patent Application No. PA201870375, mailed on Aug. 23, 2018, 8 pages.
Search Report and Opinion received for Danish Patent Application No. PA201870377, mailed on Sep. 4, 2018, 8 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Singh Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.

Slashgear, "Samsung AR Emoji demo on the Galaxy S9", Available Online at <https://www.youtube.com/watch?v=GQwNKzY4C9Y>, Feb. 25, 2018, 3 pages.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Summons to Attend Oral Proceedings received for European Patent Application No. 17853657.9, mailed on May 2, 2023, 8 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Summons to Attend Oral Proceedings received for European Patent Application No. 19181242.9, mailed on May 19, 2022, 7 pages.
Summons to Attend Oral Proceedings received for European Patent Application No. 19204230.7, mailed on May 25, 2021, 10 pages.
Summons to Attend Oral Proceedings received for European Patent Application No. 19212057.4, mailed on Apr. 19, 2023, 9 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Summons to Oral Proceedings received for European Patent Application No. 19204230.7, mailed on Feb. 19, 2024, 2 pages.
Summons to Oral Proceedings received for European Patent Application No. 19724959.2, mailed on Jul. 14, 2023, 6 pages.
Supplemental Notice of Allowance received for U.S. Appl. No. 15/713,490, mailed on May 30, 2019, 2 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, mailed on Dec. 19, 2018, 2 pages.
Supplemental Notice of Allowance received for U.S. Appl. No. 16/143,201, mailed on Jan. 10, 2019, 2 pages.
Supplemental Notice of Allowance received for U.S. Appl. No. 16/833,436, mailed on Jul. 14, 2022, 2 pages.
Supplemental Notice of Allowance received for U.S. Appl. No. 17/031,765, mailed on Apr. 9, 2024, 2 pages.
Supplemental Notice of Allowance received for U.S. Appl. No. 17/031,765, mailed on Apr. 19, 2024, 3 pages.
Supplemental Notice of Allowance received for U.S. Appl. No. 17/031,765, mailed on May 2, 2024, 3 pages.
Supplemental Notice of Allowance received for U.S. Appl. No. 17/971,456, mailed on Dec. 4, 2023, 2 pages.
Supplemental Notice of Allowance received for U.S. Appl. No. 17/971,456, mailed on Oct. 16, 2023, 5 pages.
Takahashi et al., "Neural network modeling of altered facial expression recognition in autism spectrum disorders based on predictive processing framework", Scientific reports, Online available at:—https://www.nature.com/articles/s41598-021-94067-x, Jul. 26, 2021, 14 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Theunlockr, "Galaxy Watch Complete Walkthrough: The Best Watch They've Made So Far", Available online at: https://www.youtube.com/watch?v=xiEClfe1SN4, Sep. 11, 2018, 27 pages.
Tsuchihashi et al., "Generation of Caricatures by Automatic Selection of Templates for Shapes and Placement of Facial Parts", Technical Report of the Institute of Image Information and Television Engineers, Japan, The Institute of ImageInformation and Television Engineers, vol. 33, No. 11, pp. 77-80., Feb. 8, 2009, 7 pages.
Vidstube, "Bitmoji Clockface on Fitbit Versa Sense/Versa 3/Versa 2", Available online at: <https://www.youtube.com/watch?v=4V_xDnSLeHE>, Retrieved on Dec. 3, 2020, Jun. 30, 2019, 1 page.
Woolsey Amanda, "How To Customize The Clock on the Apple Watch", Available online at: <https://www.youtube.com/watch?v=t-3Bckdd9B4>, Retrieved on Dec. 11, 2020, Apr. 25, 2015, 1 page.
WPShopmart, "Top 20 Creative Animated Login Form In HTML & CSS", https://youtu.be/TDqT-7BnkD8?si =-R69GDvfR_IGrh2H, Dec. 6, 2019, 3 pages.

(56) References Cited

OTHER PUBLICATIONS

Zhang et al., "Facial Expression Retargeting from Human to Avatar Made Easy", IEEE Transactions On Visualization And Computer Graphics, Aug. 2020, 14 pages.

Zhao et al., "An Event-related Potential Comparison of Facial Expression Processing between Cartoon and Real Faces", Online available at: https://www.biorxiv.org/content/10.1101/333898v2, Jun. 18, 2018, 31 pages.

Zollhöfer et al., "State of the Art on Monocular 3D Face Reconstruction, Tracking, and Applications", In Computer graphics forum May 2018 (vol. 37, No. 2), online available at https://studios.disneyresearch.com/wp-content/uploads/2019/03/State-of-the-Art-on-Monocular-3D-Face-Reconstruction-Tracking-and-Applications-1.pdf., 2018, 28 pages.

ZY News, "Generate Cartoon Face within Three Seconds, You are the New-generation Expression Emperor", Online available at: <http://inews.ifeng.com/48551936/news.shtml>, Apr. 22, 2016, 3 pages.

Examiner-Initiated Interview Summary received for U.S. Appl. No. 17/031,671, mailed on Jan. 6, 2025, 2 pages.

Notice of Allowance received for Japanese Patent Application No. 2024-144411, mailed on Jan. 6, 2025, 4 pages (1 page of English Translation and 3 pages of Official Copy).

Notice of Allowance received for U.S. Appl. No. 18/378,470, mailed on Jan. 15, 2025, 40 pages.

Invitation to Pay Search Fees received for European Patent Application No. 22706486.2, mailed on Jun. 11, 2025, 3 pages.

Notice of Allowance received for Korean Patent Application No. 10-2023-7037034, mailed on May 28, 2025, 7 pages (2 pages of English Translation and 5 pages of Official Copy).

Corrected Notice of Allowance received for U.S. Appl. No. 17/031,671, mailed on Aug. 18, 2025, 3 pages.

Notice of Allowance received for U.S. Appl. No. 17/031,671, mailed on Aug. 6, 2025, 7 pages.

Notice of Allowance received for U.S. Appl. No. 17/461,014, mailed on Aug. 12, 2025, 8 pages.

Applicant-Initiated Interview Summary received for U.S. Appl. No. 18/623,712, mailed on Oct. 23, 2025, 2 pages.

Extended European Search Report received for European Patent Application No. 25194400.5, mailed on Oct. 20, 2025, 10 pages.

Office Action received for European Patent Application No. 22706486.2, mailed on Oct. 15, 2025, 8 pages.

Applicant-Initiated Interview Summary received for U.S. Appl. No. 18/893,427, mailed on Oct. 1, 2025, 2 pages.

Brief Communication Regarding Oral Proceedings received for European Patent Application No. 20704768.9, mailed on Oct. 9, 2025, 9 pages.

Non-Final Office Action received for U.S. Appl. No. 18/623,712, mailed on Oct. 1, 2025, 9 pages.

* cited by examiner 6-100

1-338    6-102

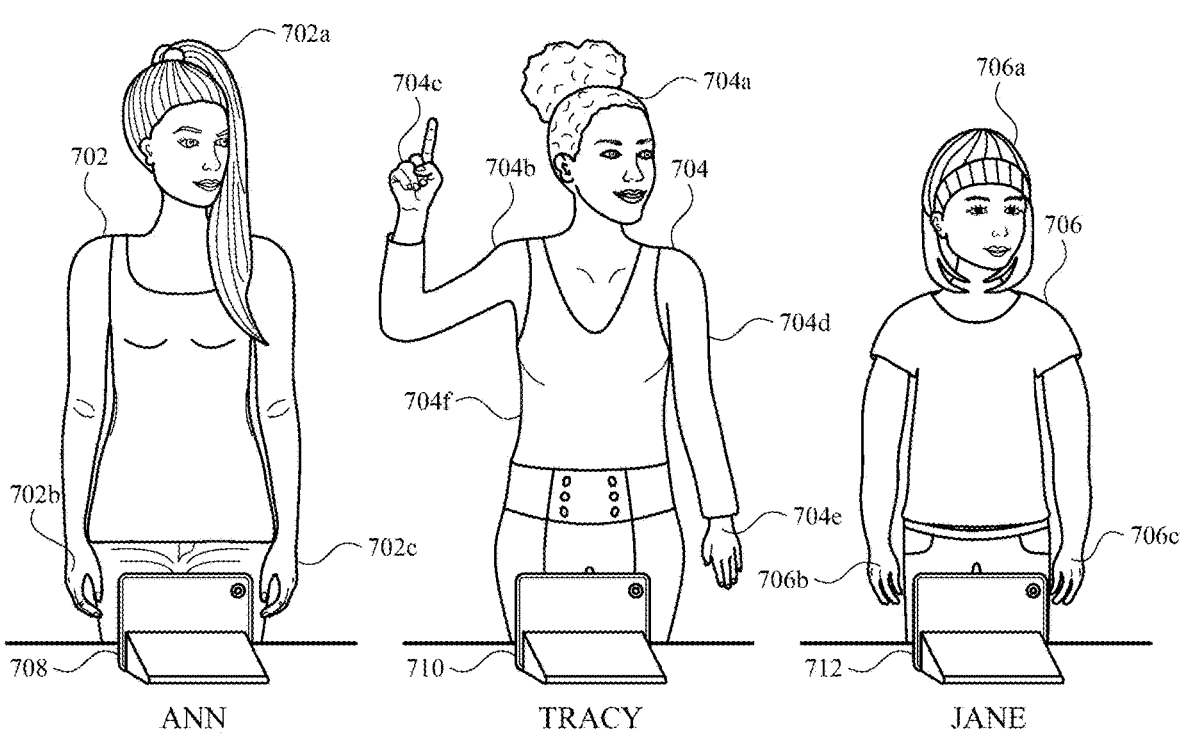
ANN     TRACY     JANE
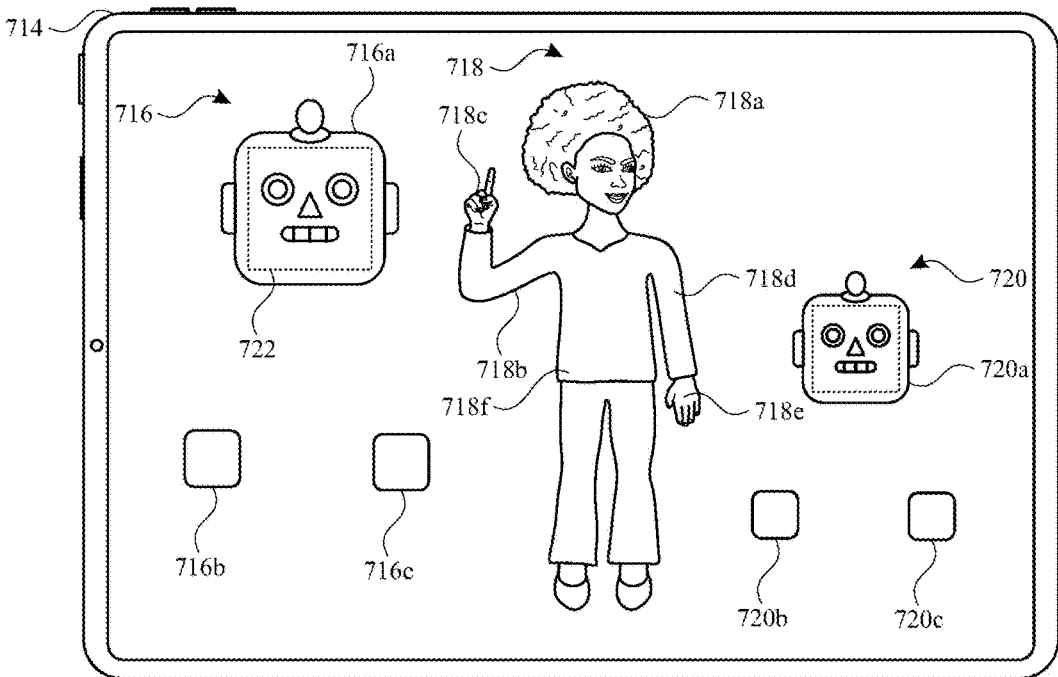
FIG. 7A1

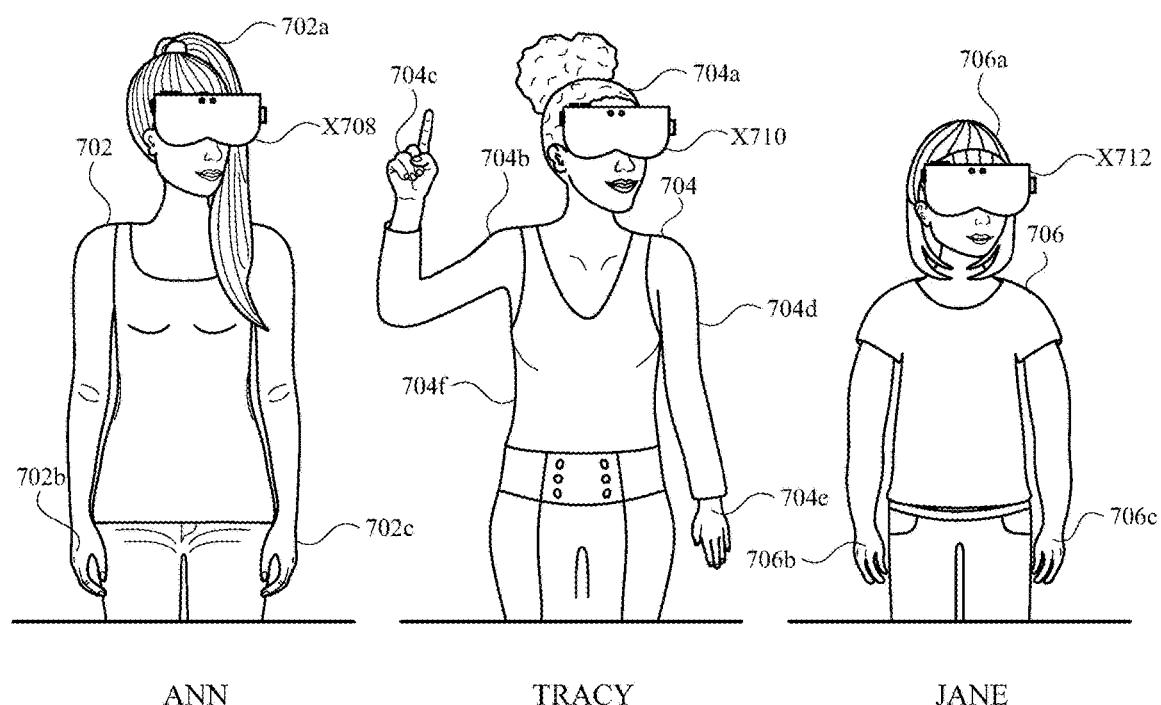
ANN          TRACY          JANE
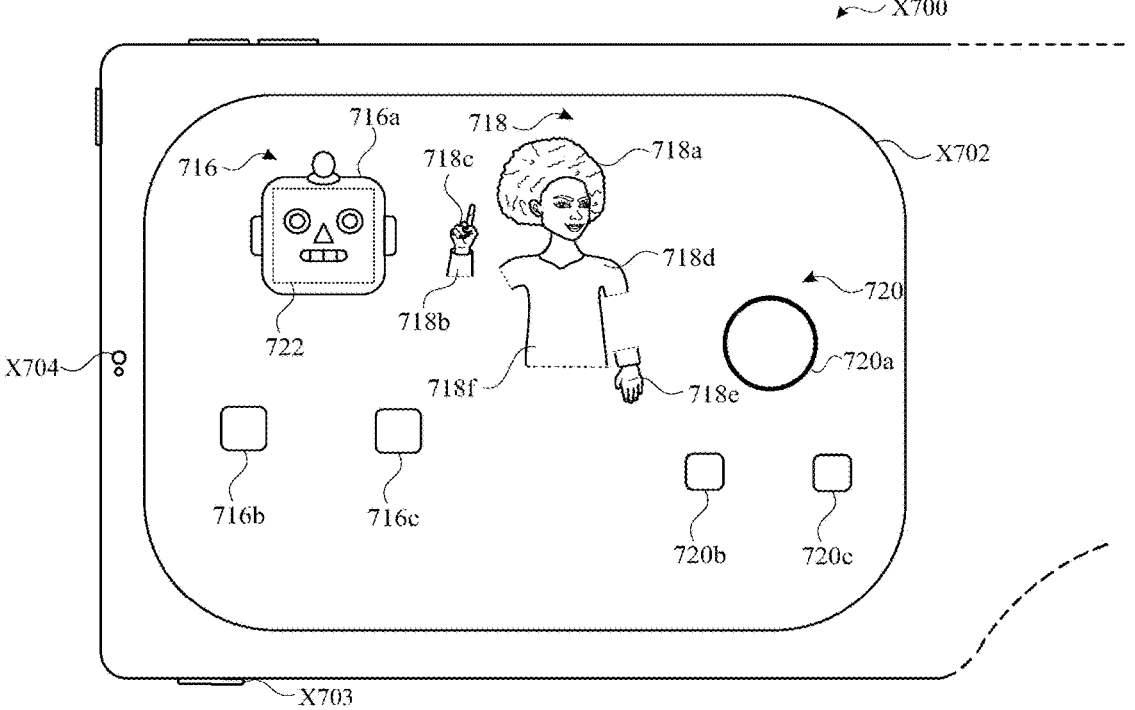
*FIG. 7A2*

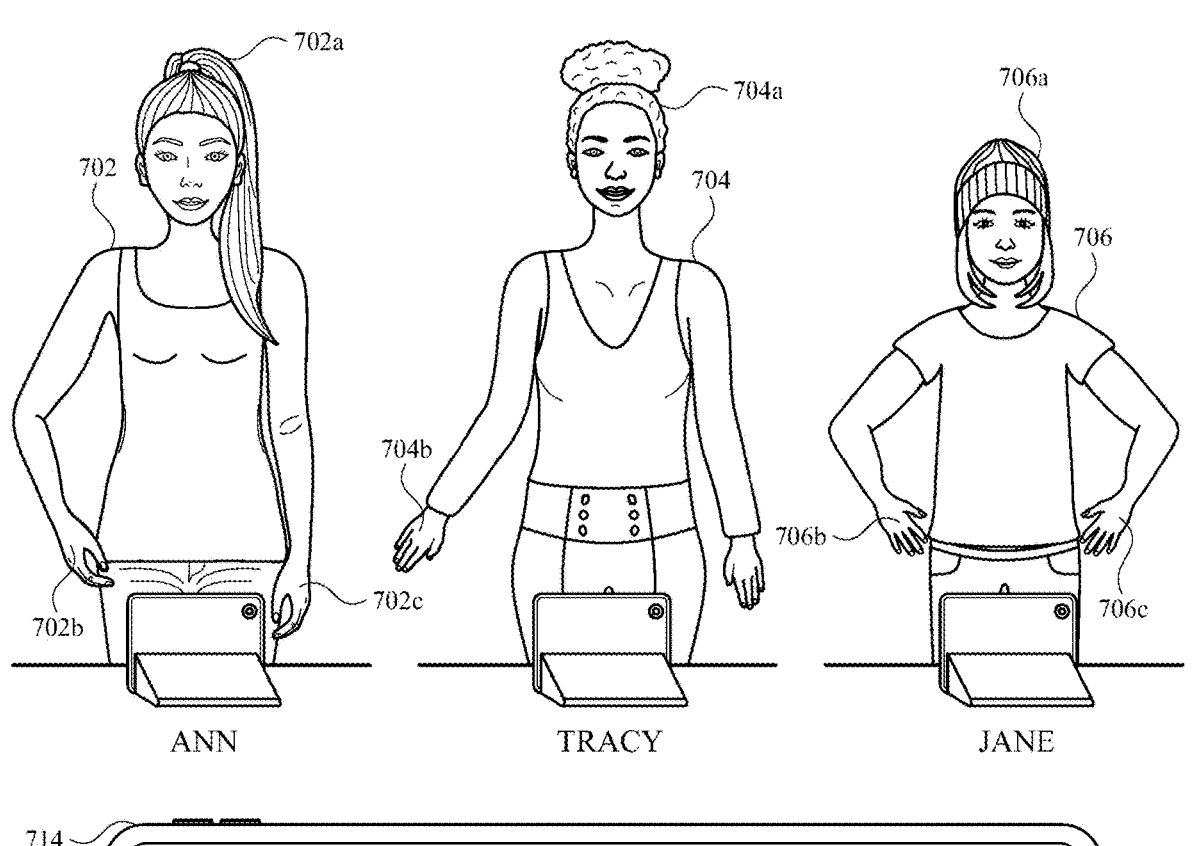
ANN                    TRACY                    JANE
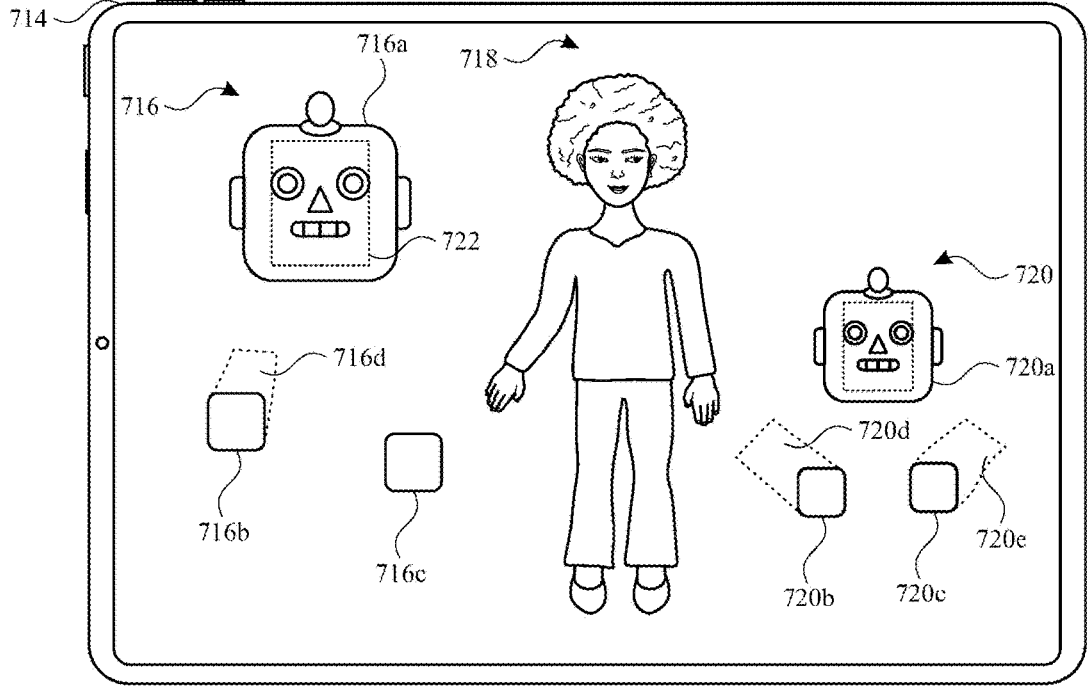
FIG. 7B1

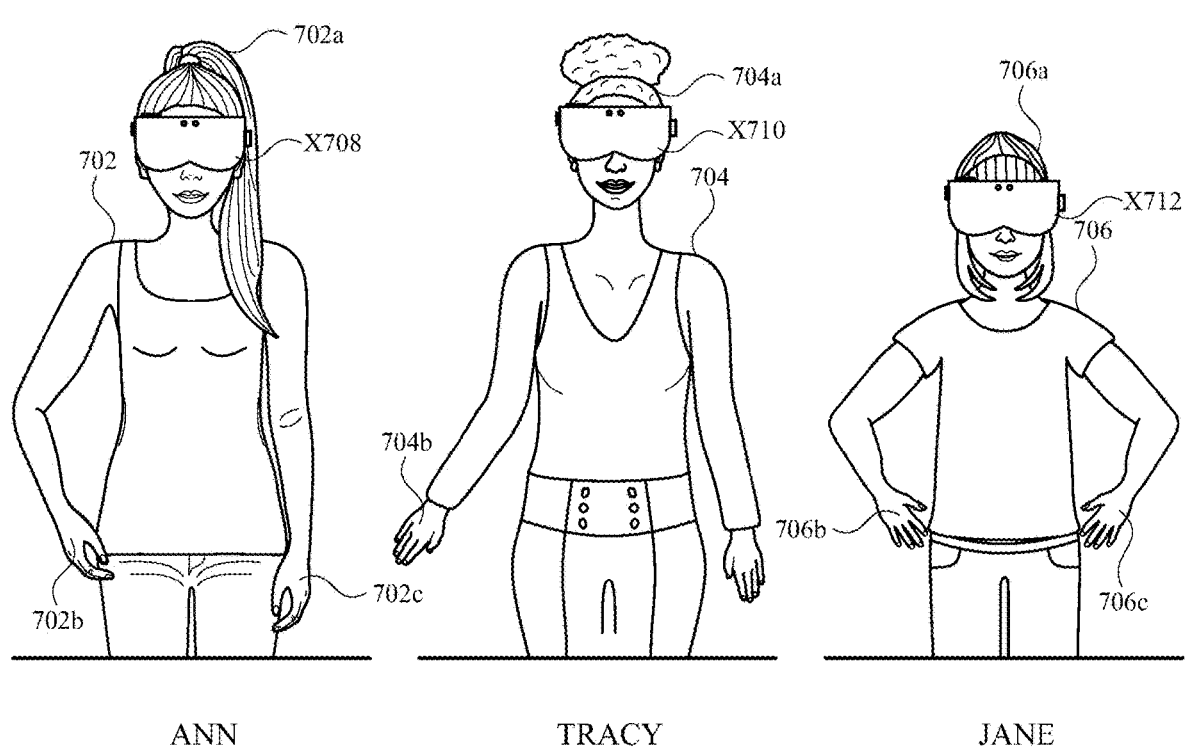
ANN TRACY JANE
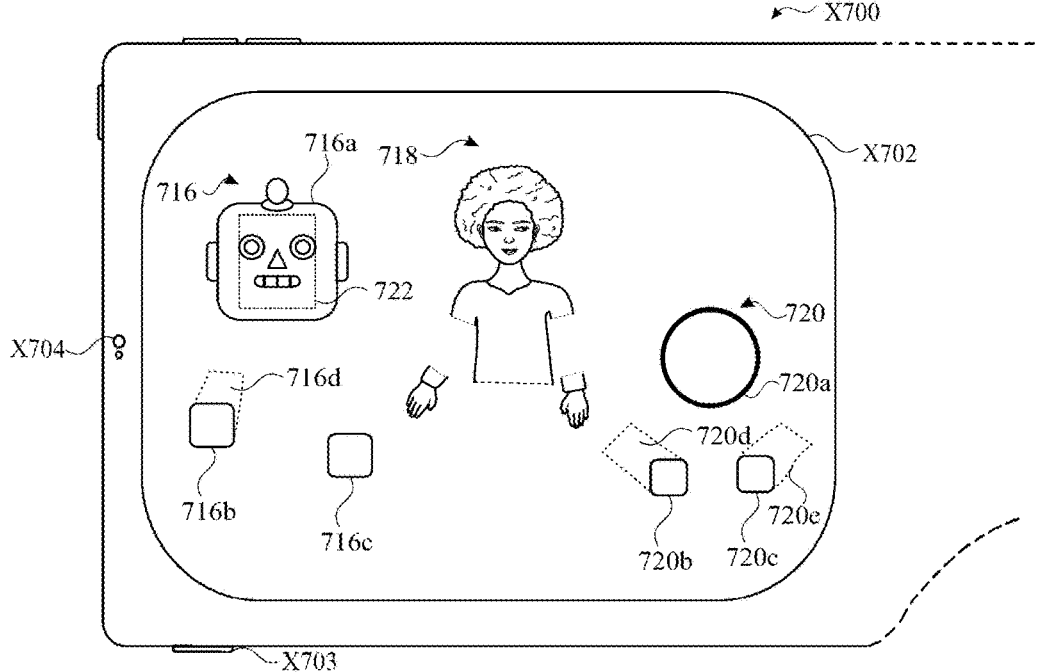
*FIG. 7B2*

Figure 8:
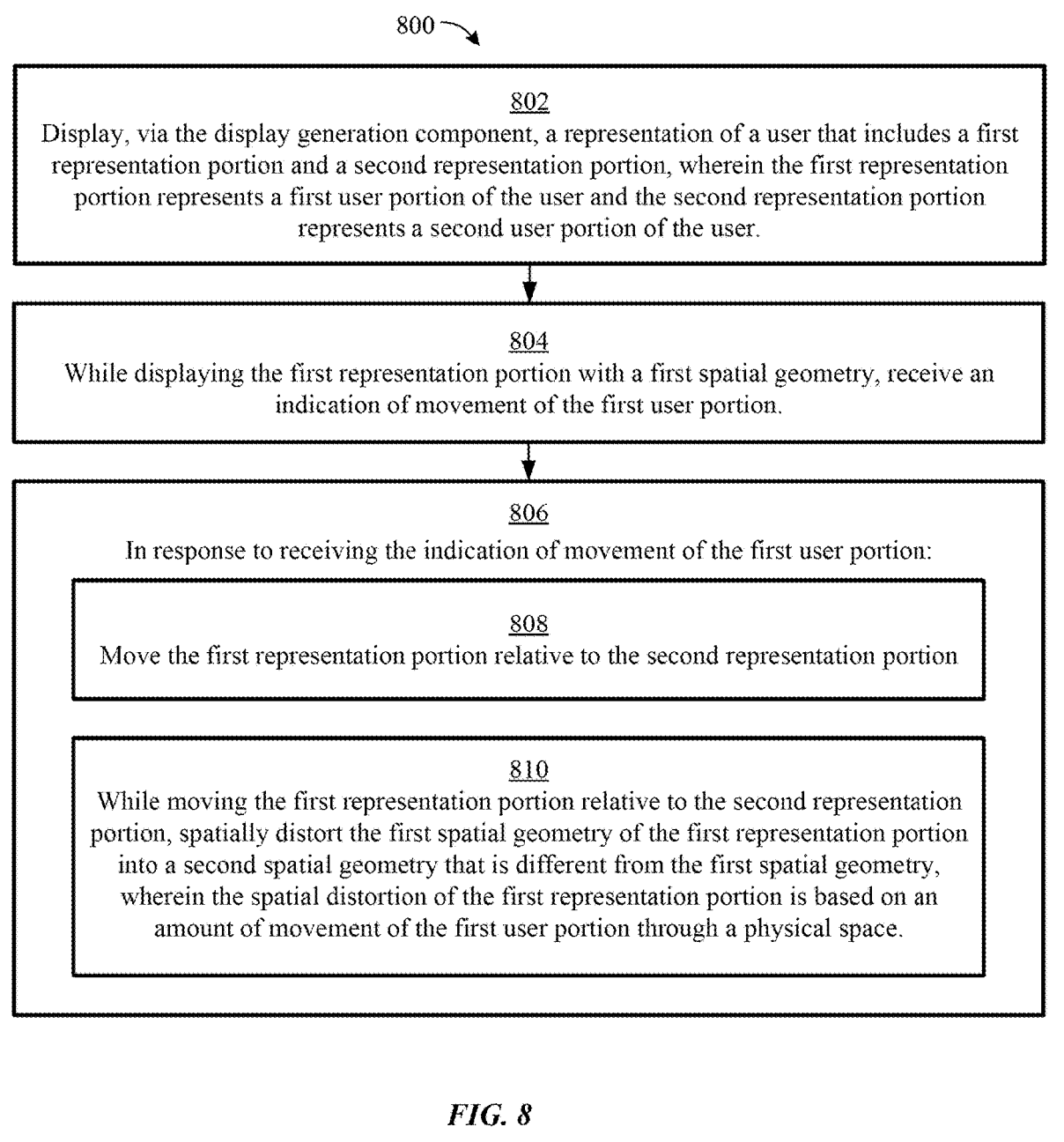

800 ↘

802
Display, via the display generation component, a representation of a user that includes a first representation portion and a second representation portion, wherein the first representation portion represents a first user portion of the user and the second representation portion represents a second user portion of the user.

↓

804
While displaying the first representation portion with a first spatial geometry, receive an indication of movement of the first user portion.

↓

806
In response to receiving the indication of movement of the first user portion:

808
Move the first representation portion relative to the second representation portion

810
While moving the first representation portion relative to the second representation portion, spatially distort the first spatial geometry of the first representation portion into a second spatial geometry that is different from the first spatial geometry, wherein the spatial distortion of the first representation portion is based on an amount of movement of the first user portion through a physical space.

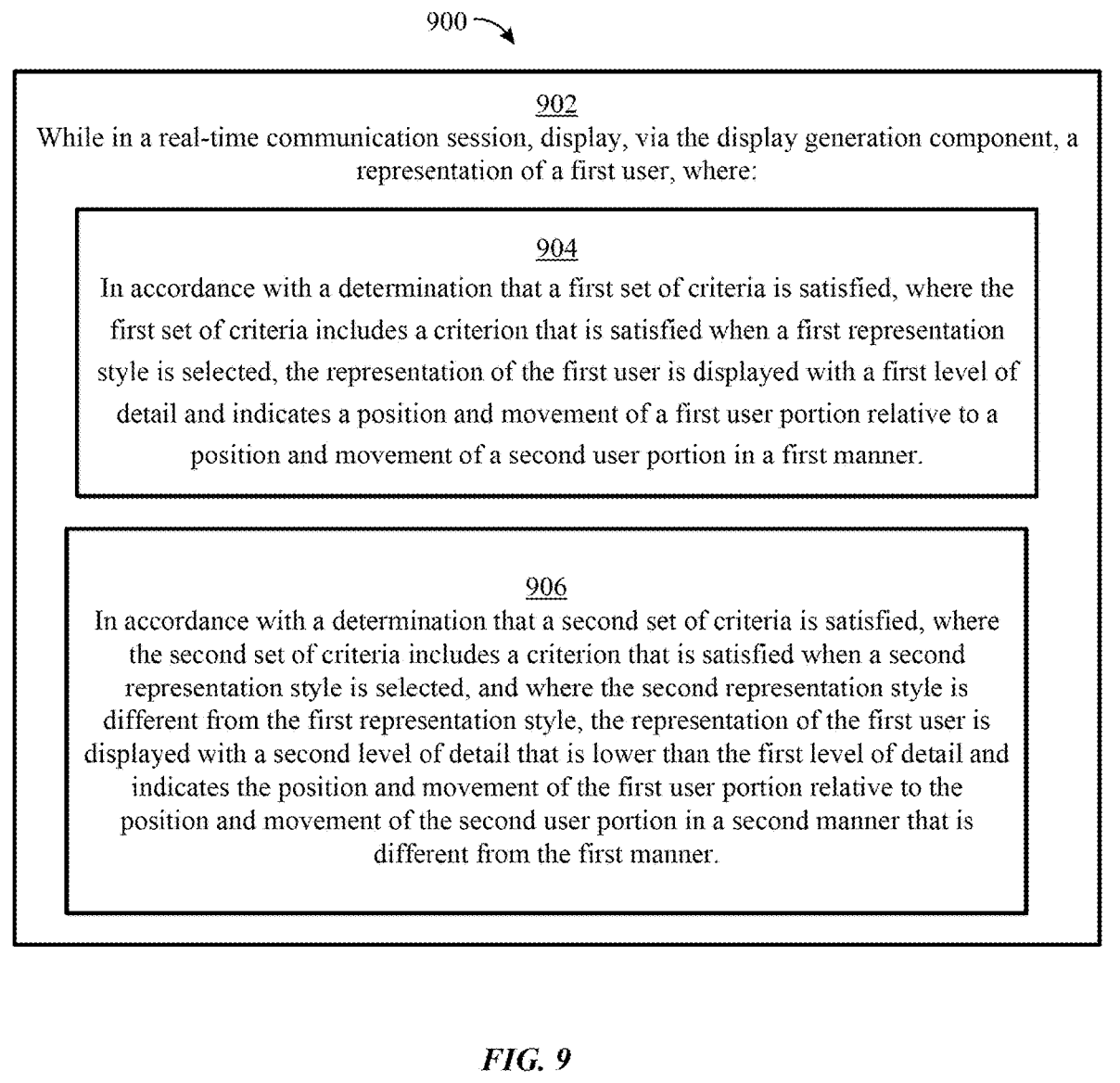

902
While in a real-time communication session, display, via the display generation component, a representation of a first user, where:

904
In accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner.

906
In accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

*FIG. 9*

DEVICES, METHODS, AND GRAPHICAL USER INTERFACES FOR CONTROLLING AVATARS WITHIN THREE-DIMENSIONAL ENVIRONMENTS

CROSS-REFERENCE TO RELATED APPLICATIONS

This application is a continuation of U.S. patent application Ser. No. 18/241,802, entitled "DEVICES, METHODS, AND GRAPHICAL USER INTERFACES FOR CONTROLLING AVATARS WITHIN THREE-DIMENSIONAL ENVIRONMENTS," and filed Sep. 1, 2023, which claims priority to U.S. Provisional Patent Application No. 63/470,879, entitled "DEVICES, METHODS, AND GRAPHICAL USER INTERFACES FOR CONTROLLING AVATARS WITHIN THREE-DIMENSIONAL ENVIRONMENTS," filed Jun. 3, 2023, and claims priority to U.S. Provisional Patent Application No. 63/404,022, entitled "DEVICES, METHODS, AND GRAPHICAL USER INTERFACES FOR CONTROLLING AVATARS WITHIN THREE-DIMENSIONAL ENVIRONMENTS," filed Sep. 6, 2022, the contents of which are hereby incorporated by reference in their entirety.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing displaying virtual objects, such as avatars, and systems that provide insufficient methods for limiting the display of virtual objects and/or displaying alternative virtual objects that limit information are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated avatars of users that make interaction with the computer systems more efficient and intuitive for a user. Such methods and interfaces optionally complement or replace conventional methods for providing extended reality experiences to users that are in communication sessions. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for displaying virtual objects that represent users in a three-dimensional environment. Such methods and interfaces may complement or replace conventional methods for displaying virtual objects that represent users in a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges and/or preserving resources, such as memory, network bandwidth, and/or user interface real estate.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method is described. The method is performed at a computer system having a display generation component. The method includes displaying, via the display generation component, a representation of a user that includes a first representation portion and a second representation portion, wherein the first representation portion represents a first user portion of the user and the second representation portion represents a second user portion of the user; while displaying the first representation portion with a first spatial geometry, receiving an indication of movement of the first user portion; and in response to receiving the indication of movement of the first user portion: moving the first representation portion relative to the second representation portion; and while moving the first representation portion relative to the second representation portion, spatially distorting the first spatial geometry of the first representation portion into a second spatial geometry that is different from the first spatial geometry, wherein the spatial distortion of the first representation portion is based on an amount of movement of the first user portion through a physical space.

In accordance with some embodiments, a non-transitory computer-readable storage medium is described. The non-transitory computer-readable storage medium stores one or more programs configured to be executed by one or more processors of a computer system having a display generation component. The one or more programs including instructions for: displaying, via the display generation component, a representation of a user that includes a first representation portion and a second representation portion, wherein the first representation portion represents a first user portion of the user and the second representation portion represents a second user portion of the user; while displaying the first representation portion with a first spatial geometry, receiving an indication of movement of the first user portion; and in response to receiving the indication of movement of the first user portion: moving the first representation portion relative to the second representation portion; and while moving the first representation portion relative to the second representation portion, spatially distorting the first spatial geometry of the first representation portion into a second spatial geometry that is different from the first spatial geometry, wherein the spatial distortion of the first representation portion is based on an amount of movement of the first user portion through a physical space.

In accordance with some embodiments, a transitory computer-readable storage medium is described. The transitory computer-readable storage medium stores one or more programs configured to be executed by one or more processors of a computer system having a display generation component. The one or more programs include instructions for: displaying, via the display generation component, a representation of a user that includes a first representation portion and a second representation portion, wherein the first representation portion represents a first user portion of the user and the second representation portion represents a second user portion of the user; while displaying the first representation portion with a first spatial geometry, receiving an indication of movement of the first user portion; and in response to receiving the indication of movement of the first user portion: moving the first representation portion relative to the second representation portion; and while moving the first representation portion relative to the second representation portion, spatially distorting the first spatial geometry of the first representation portion into a second spatial geometry that is different from the first spatial geometry, wherein the spatial distortion of the first representation portion is based on an amount of movement of the first user portion through a physical space.

In accordance with some embodiments, a computer system having a display generation component, comprising: one or more processors; and memory storing one or more programs configured to be executed by the one or more processors is described. The one or more programs include instructions for: displaying, via the display generation component, a representation of a user that includes a first representation portion and a second representation portion, wherein the first representation portion represents a first user portion of the user and the second representation portion represents a second user portion of the user; while displaying the first representation portion with a first spatial geometry, receiving an indication of movement of the first user portion; and in response to receiving the indication of movement of the first user portion: moving the first representation portion relative to the second representation portion; and while moving the first representation portion relative to the second representation portion, spatially distorting the first spatial geometry of the first representation portion into a second spatial geometry that is different from the first spatial geometry, wherein the spatial distortion of the first representation portion is based on an amount of movement of the first user portion through a physical space.

In accordance with some embodiments, a computer system having a display generation component is described. The computer system comprises: means for, displaying, via the display generation component, a representation of a user that includes a first representation portion and a second representation portion, wherein the first representation portion represents a first user portion of the user and the second representation portion represents a second user portion of the user; means for, while displaying the first representation portion with a first spatial geometry, receiving an indication of movement of the first user portion; and means for, in response to receiving the indication of movement of the first user portion: moving the first representation portion relative to the second representation portion; and while moving the first representation portion relative to the second representation portion, spatially distorting the first spatial geometry of the first representation portion into a second spatial geometry that is different from the first spatial geometry, wherein the spatial distortion of the first representation portion is based on an amount of movement of the first user portion through a physical space.

In accordance with some embodiments, a computer program product, comprising one or more programs configured to be executed by one or more processors of a computer system having a display generation component is described. The one or more programs include instructions for: displaying, via the display generation component, a representation of a user that includes a first representation portion and a second representation portion, wherein the first representation portion represents a first user portion of the user and the second representation portion represents a second user portion of the user; while displaying the first representation portion with a first spatial geometry, receiving an indication of movement of the first user portion; and in response to receiving the indication of movement of the first user portion: moving the first representation portion relative to the second representation portion; and while moving the first representation portion relative to the second representation portion, spatially distorting the first spatial geometry of the first representation portion into a second spatial geometry that is different from the first spatial geometry, wherein the spatial distortion of the first representation portion is based on an amount of movement of the first user portion through a physical space.

In accordance with some embodiments, a method is described. The method is performed at a computer system having a display generation component. The method includes: while in a real-time communication session, displaying, via the display generation component, a representation of a first user wherein: in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

In accordance with some embodiments, a non-transitory computer-readable storage medium is described. The non-transitory computer-readable storage medium stores one or more programs configured to be executed by one or more processors of a computer system having a display generation component. The one or more programs include instructions for: while in a real-time communication session, displaying, via the display generation component, a representation of a first user wherein: in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

In accordance with some embodiments, a transitory computer-readable storage medium is described. The transitory computer-readable storage medium stores one or more programs configured to be executed by one or more processors of a computer system having a display generation component. The one or more programs include instructions for: while in a real-time communication session, displaying, via the display generation component, a representation of a first user wherein: in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

In accordance with some embodiments, a computer system having a display generation component, comprising: one or more processors; and memory storing one or more programs configured to be executed by the one or more processors is described. The one or more programs include instructions for: while in a real-time communication session, displaying, via the display generation component, a representation of a first user wherein: in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

In accordance with some embodiments, a computer system having a display generation component is described. The computer system comprises: means for, while in a real-time communication session, displaying, via the display generation component, a representation of a first user wherein: in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

In accordance with some embodiments, a computer program product, comprising one or more programs configured to be executed by one or more processors of a computer system having a display generation component is described. The one or more programs include instructions for: while in a real-time communication session, displaying, via the display generation component, a representation of a first user wherein: in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A1-7F illustrate example techniques for displaying one or more representations of one or more users in accordance with some embodiments.

FIG. 8 is a flow diagram of methods of displaying one or more representations of one or more users in accordance with some embodiments.

FIG. 9 is a flow diagram of methods of displaying one or more representations of one or more users in accordance with some embodiments.

DESCRIPTION OF EMBODIMENTS

Figure 1A:
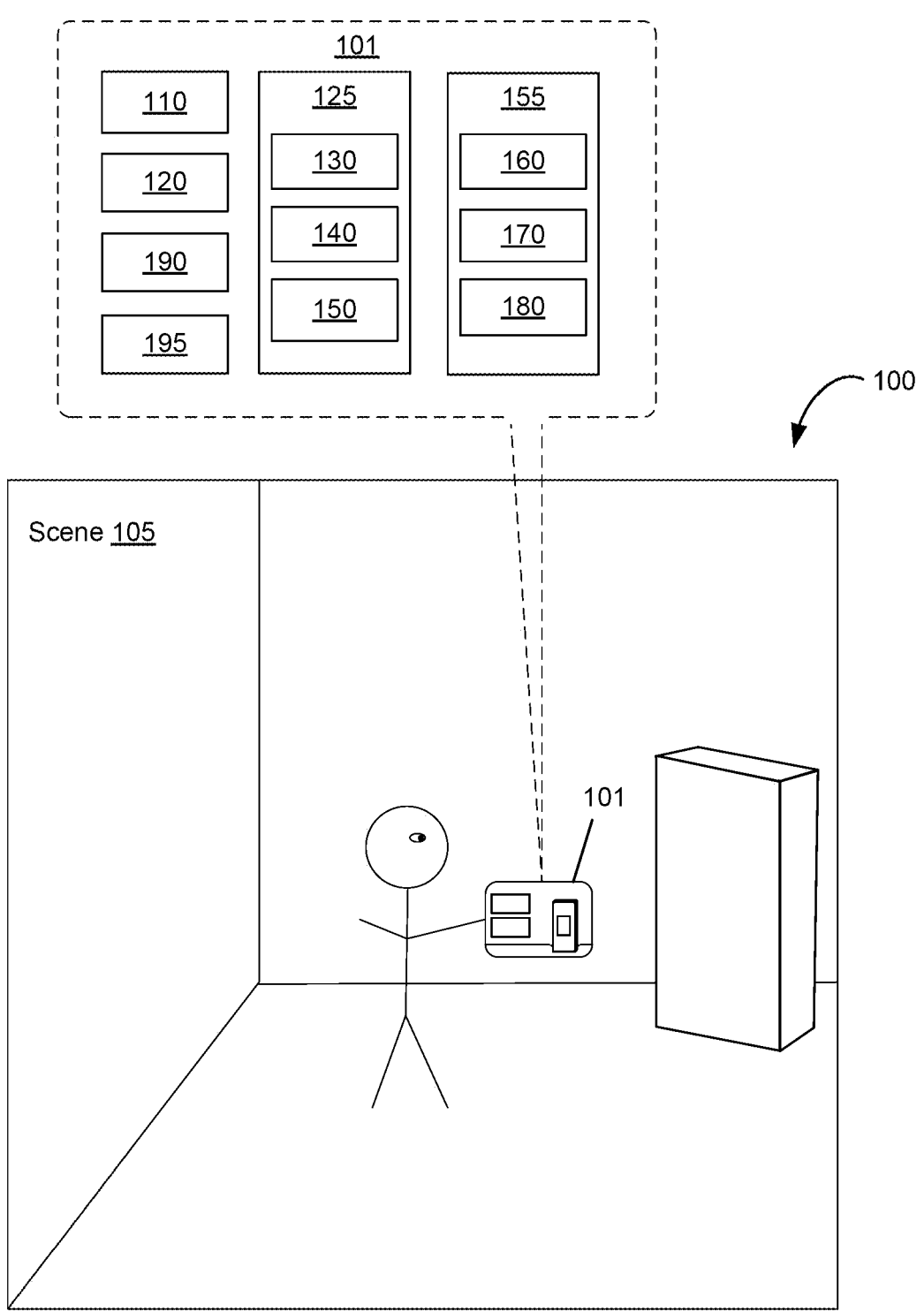
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments. The systems, methods, and GUIs described herein improve user interface interactions with virtual/augmented reality environments in multiple ways.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

FIGS. 1A-6 provide a description of example computer systems for providing XR experiences to users. FIGS. 7A1-7F illustrate example techniques for displaying one or more representations of one or more users in accordance with some embodiments. FIG. 8 is a flow diagram of methods of displaying one or more representations of one or more users in accordance with some embodiments. FIG. 9 is a flow diagram of methods of displaying one or more representations of one or more users in accordance with some embodiments. The user interfaces in FIGS. 7A1-7F are used to illustrate the processes in FIGS. 8 and 9.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment).

In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
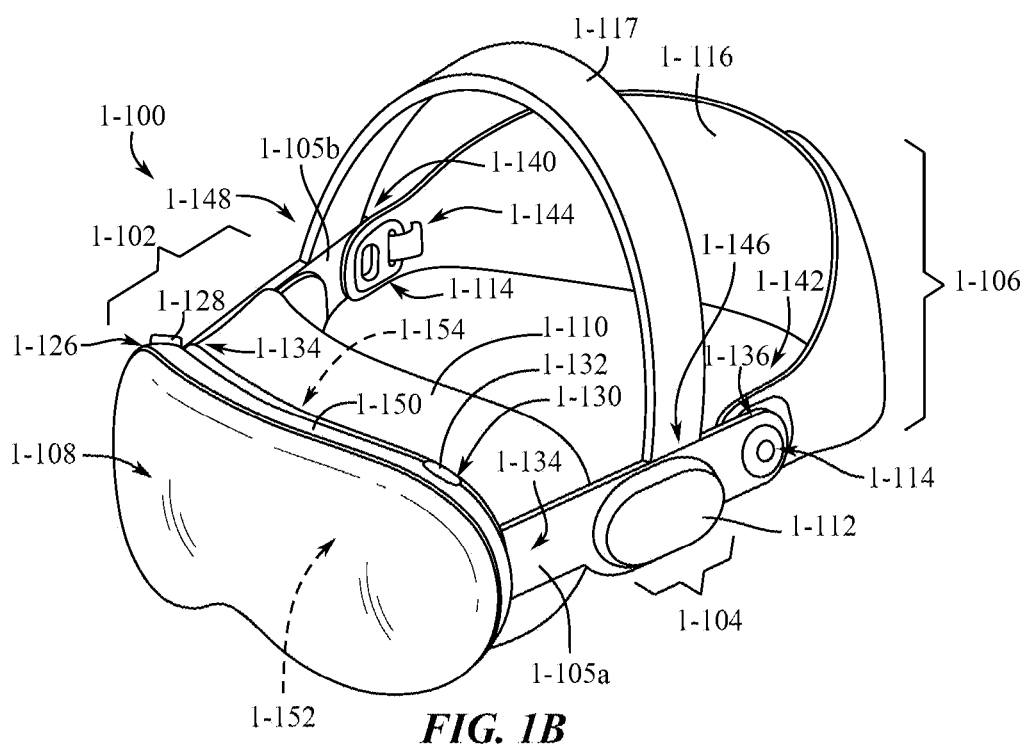
FIGS. 1B-1P are examples of a computer system for providing XR experiences in the operating environment of FIG. 1A.
Figure 1C:
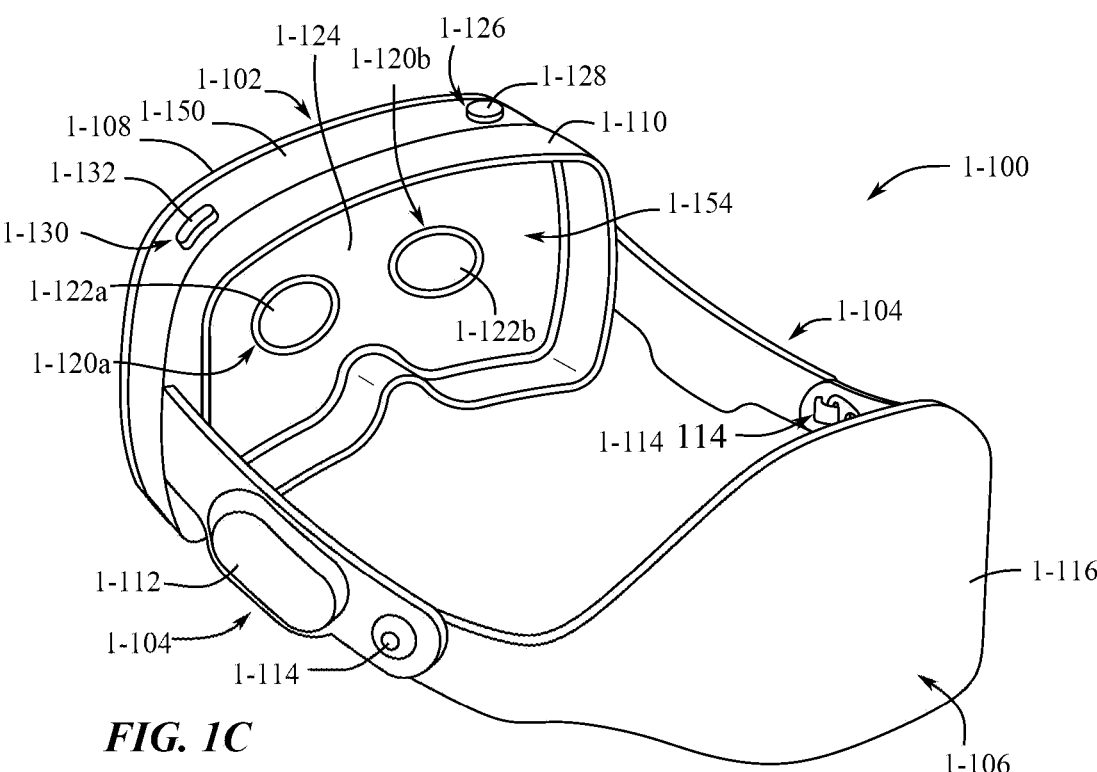
Figure 1D:
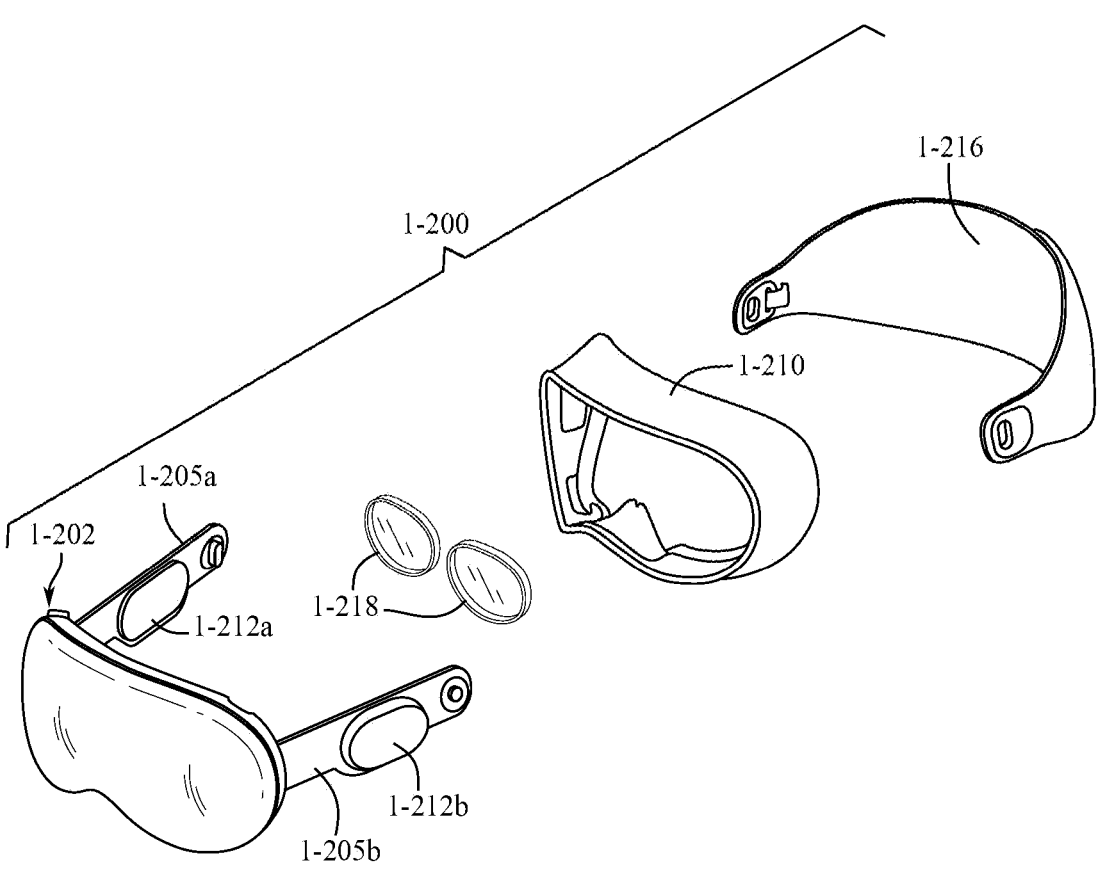
Figure 1E:
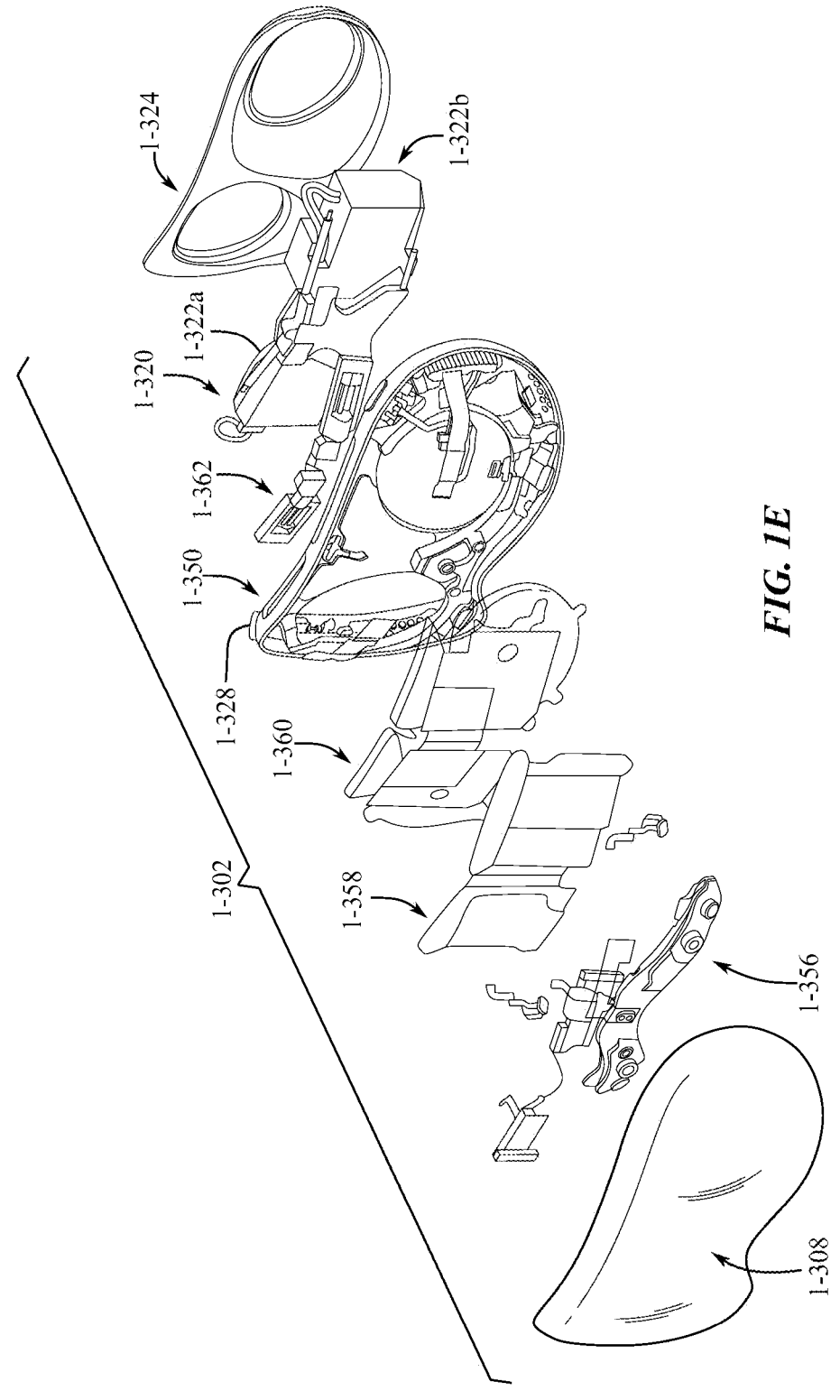
Figure 1F:
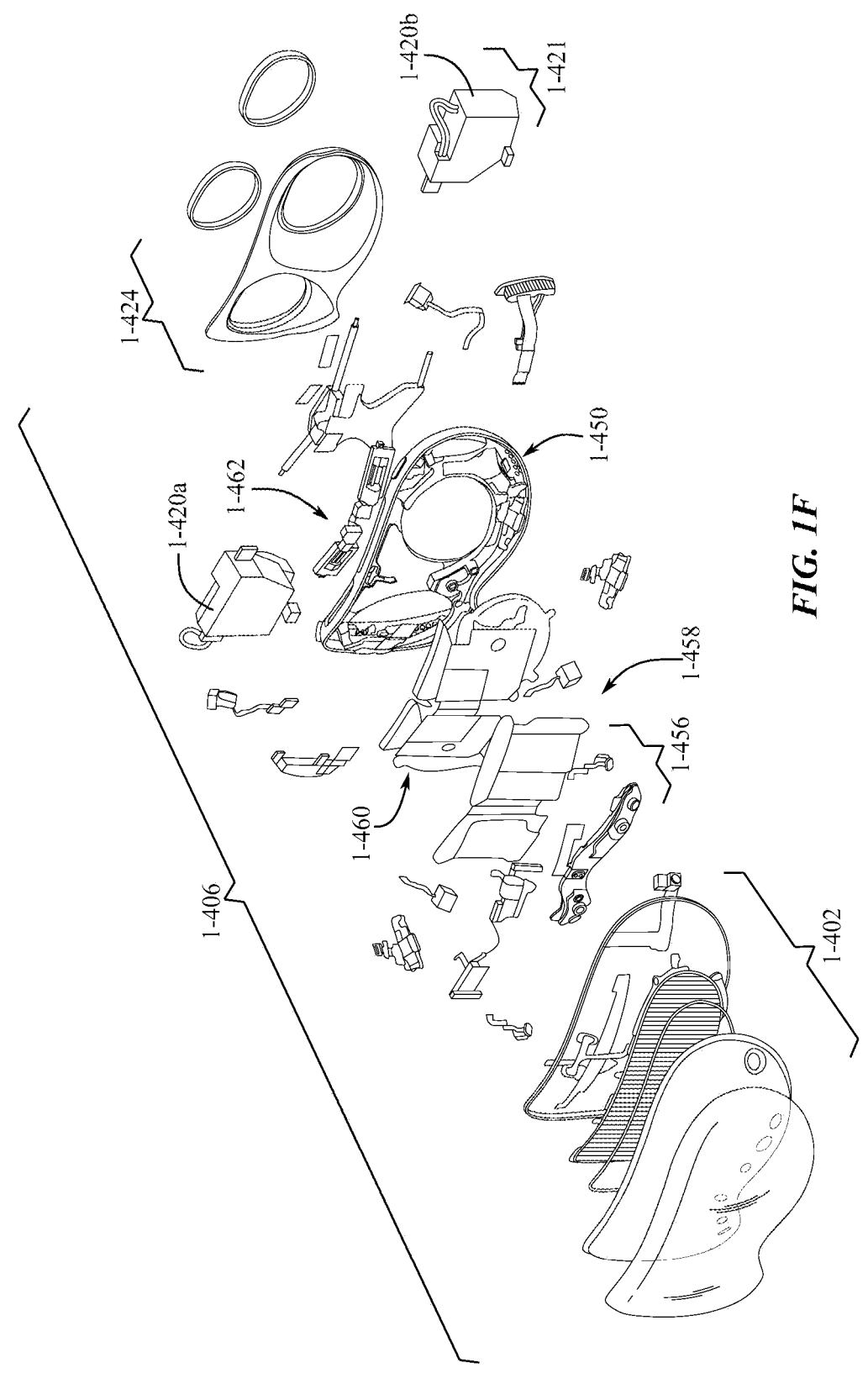
Figure 1G:
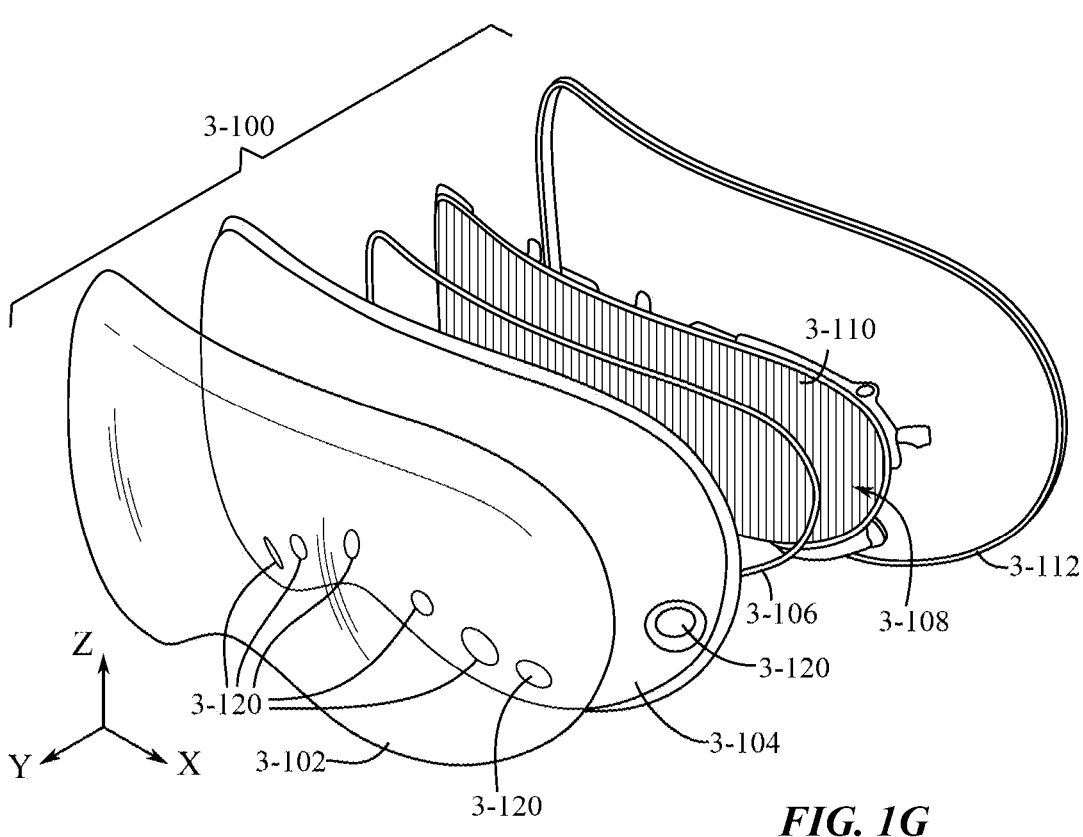
Figure 1H:
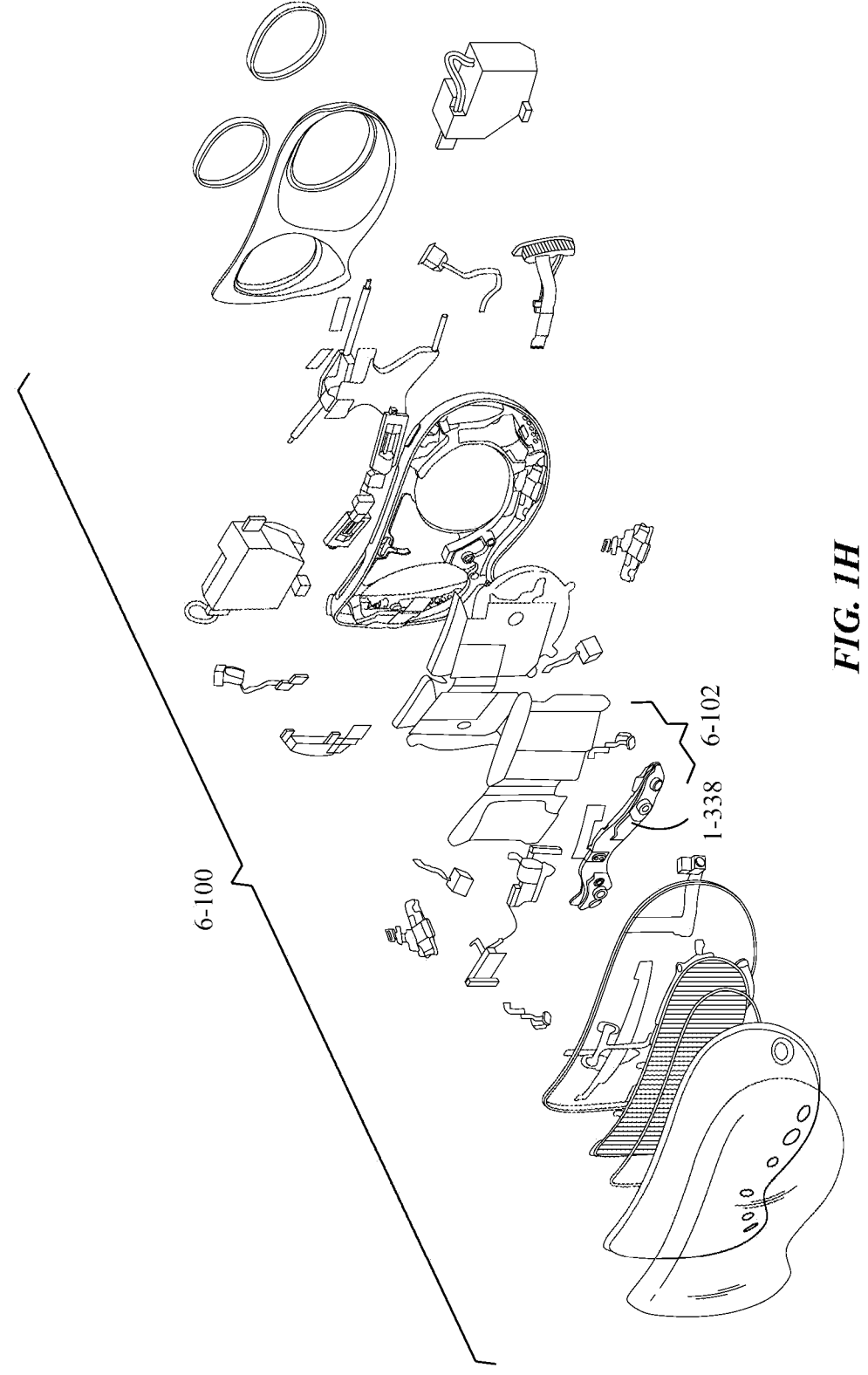
Figure 1I:
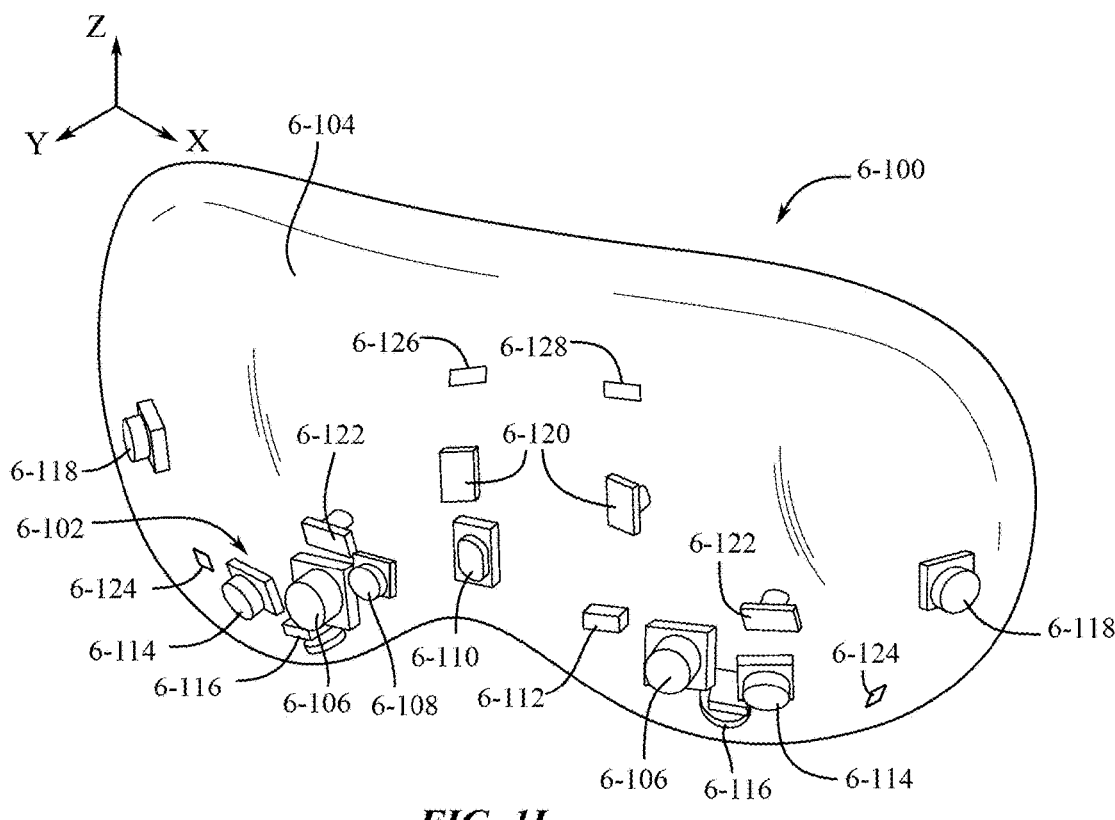
Figure 1J:
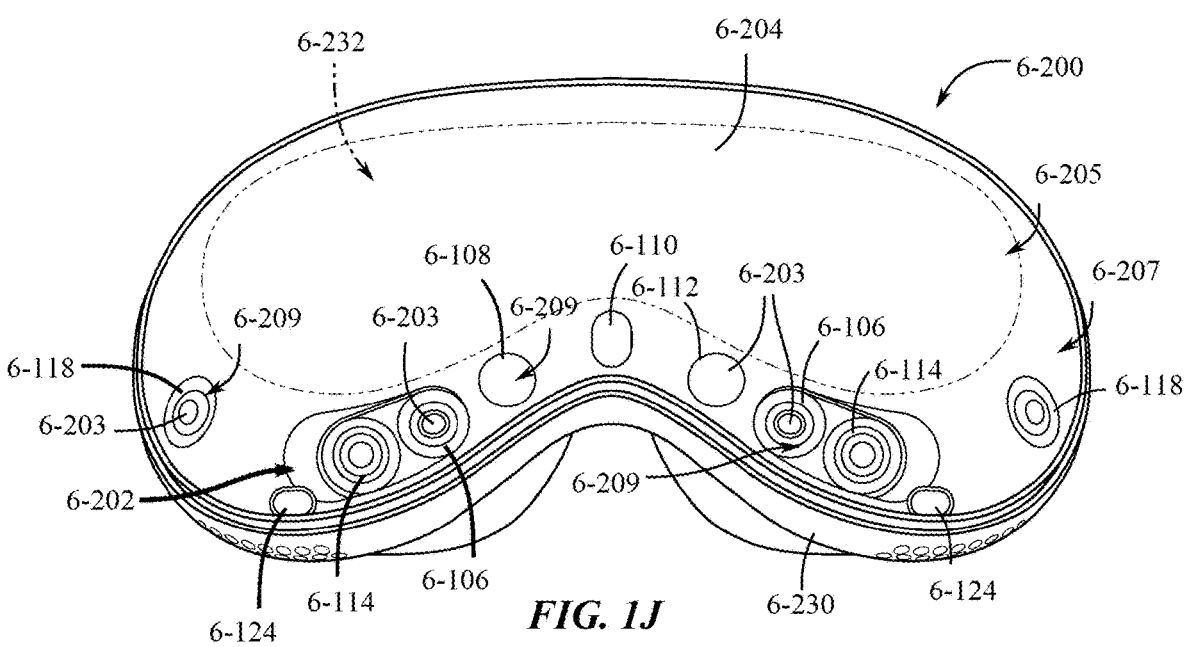
Figures 1K, 1L:
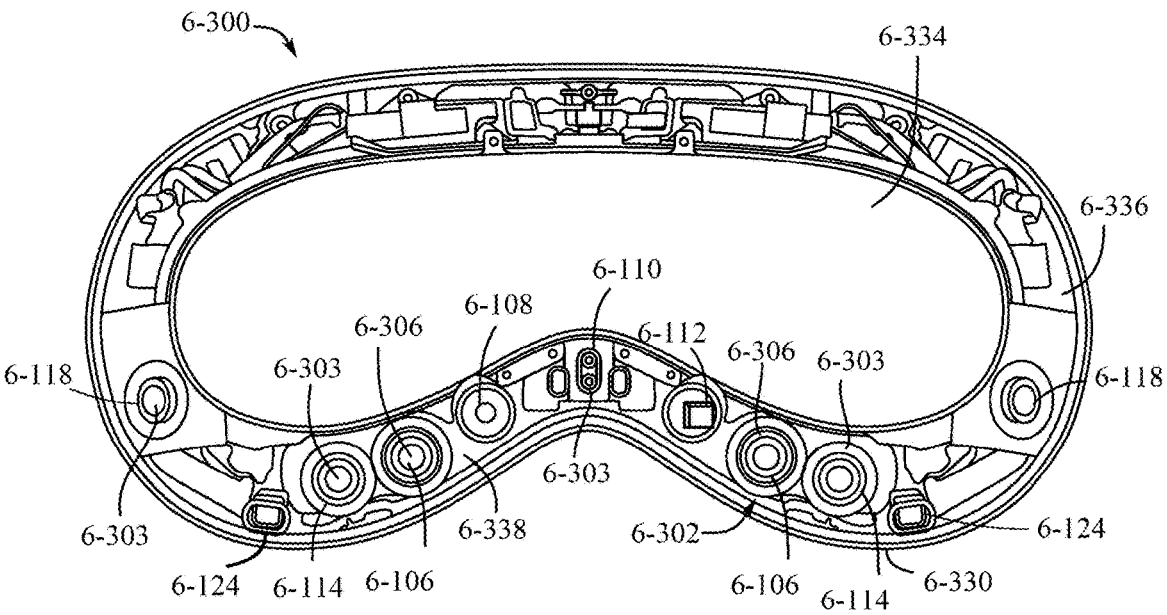
Figure 1M:
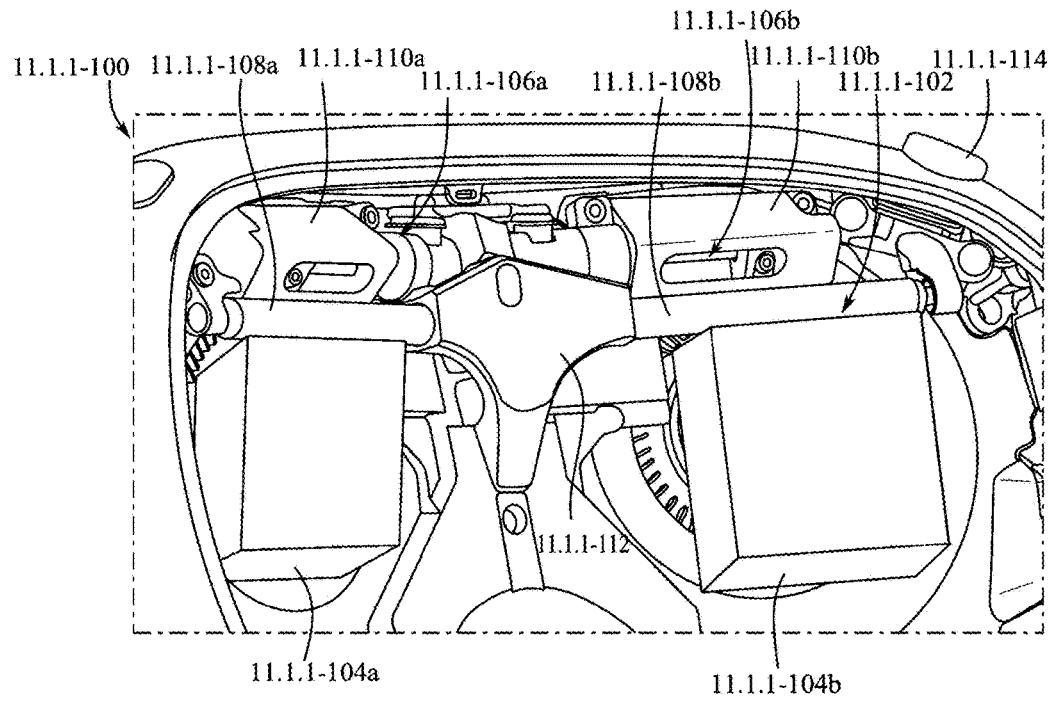
Figure 1N:
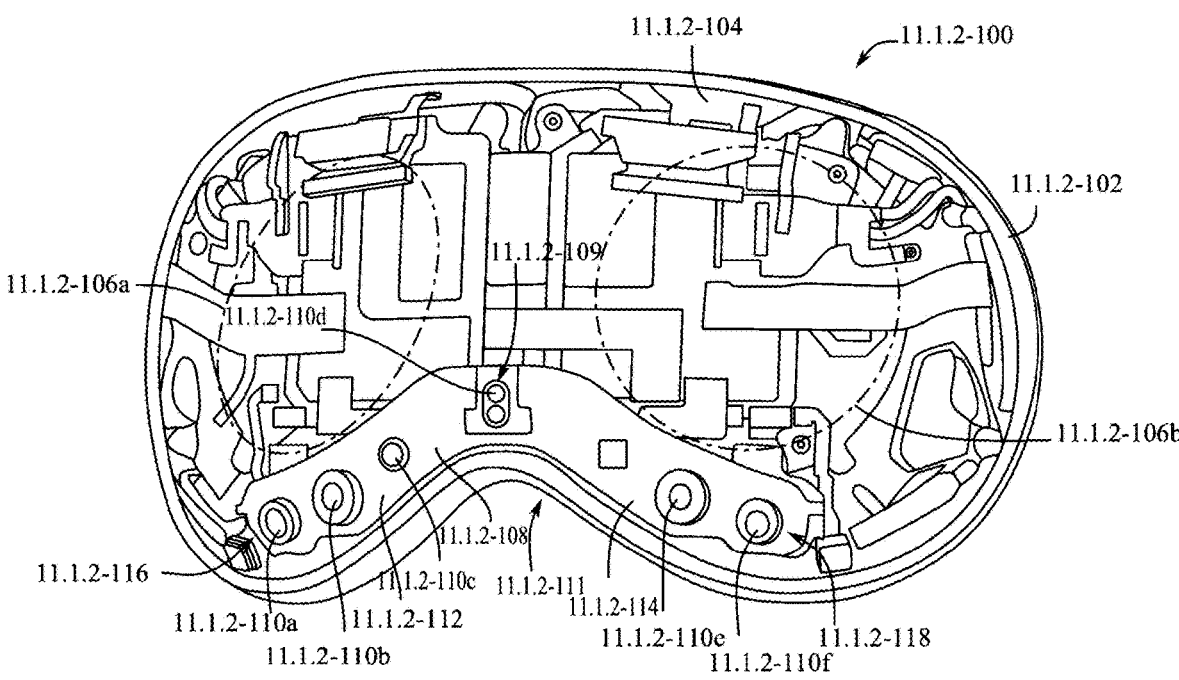
Figure 1O:
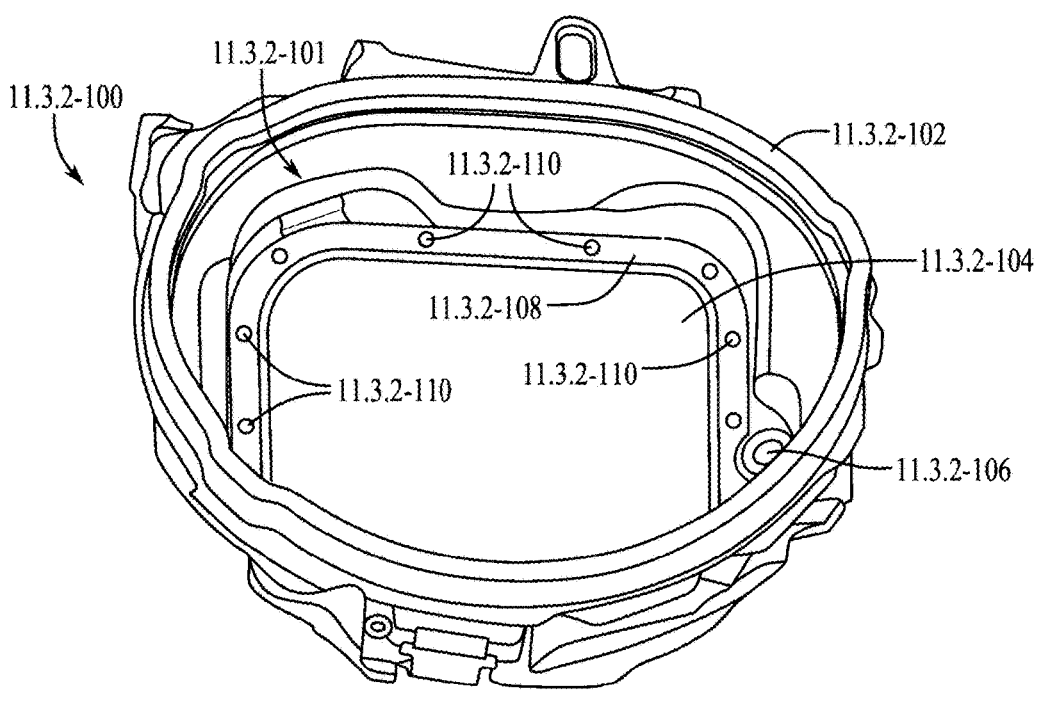
Figure 1P:
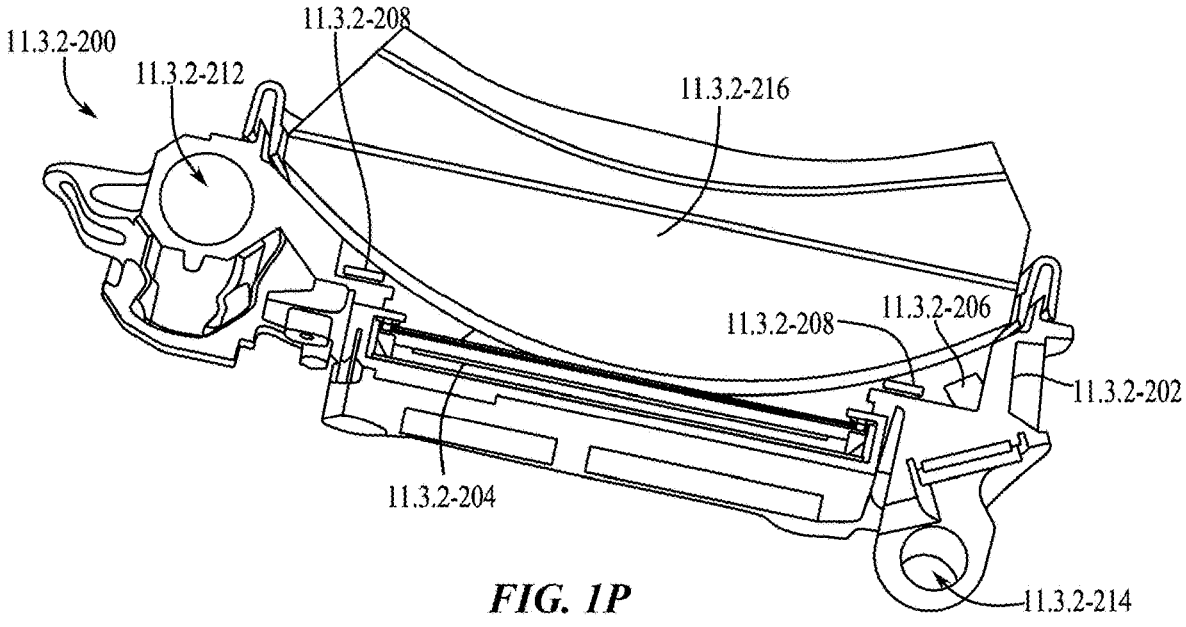

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures)

disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame

11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
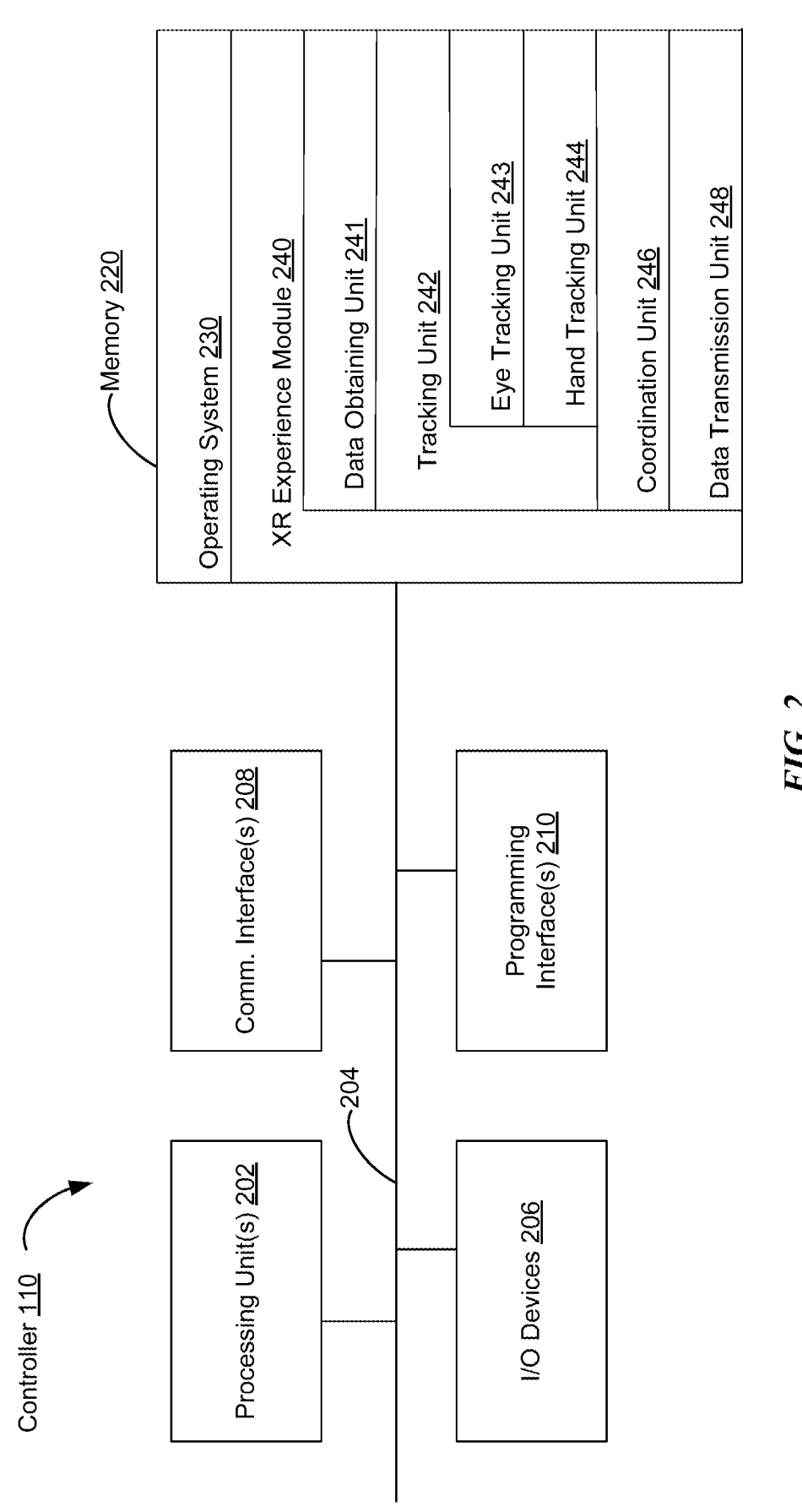
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
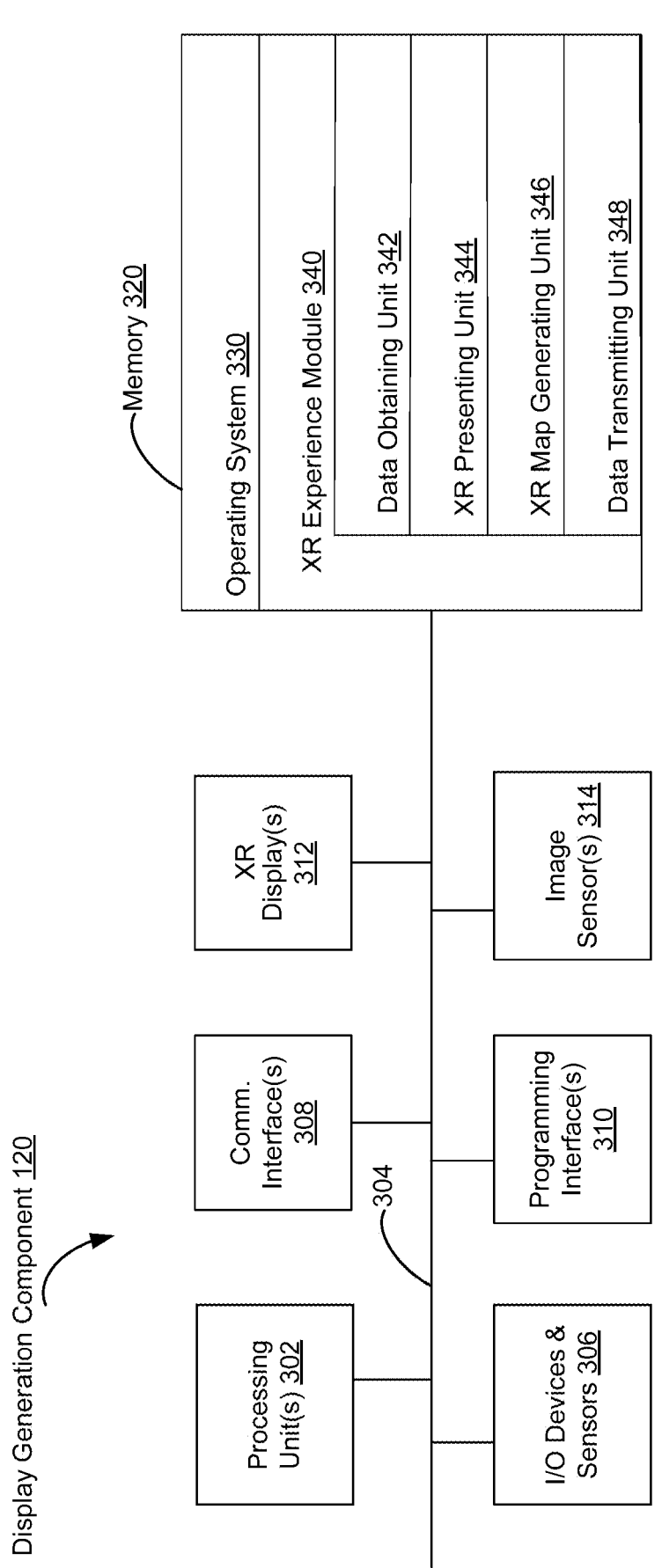
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
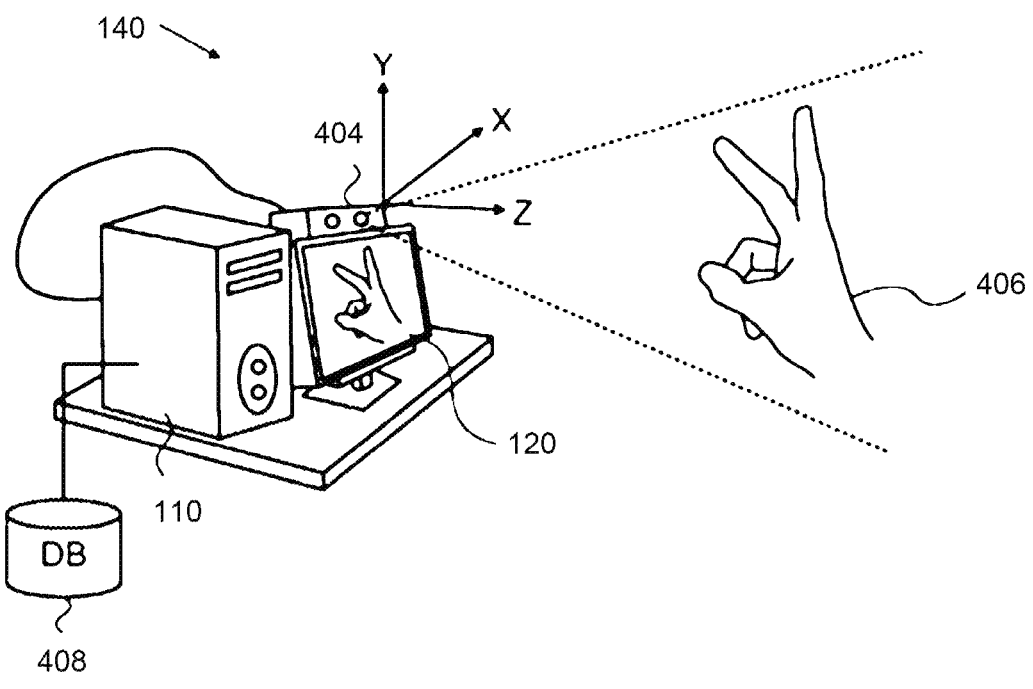
FIG. 4 is a block diagram illustrating a hand tracking unit of a computer system that is configured to capture gesture inputs of the user in accordance with some embodiments.
Figure 4:
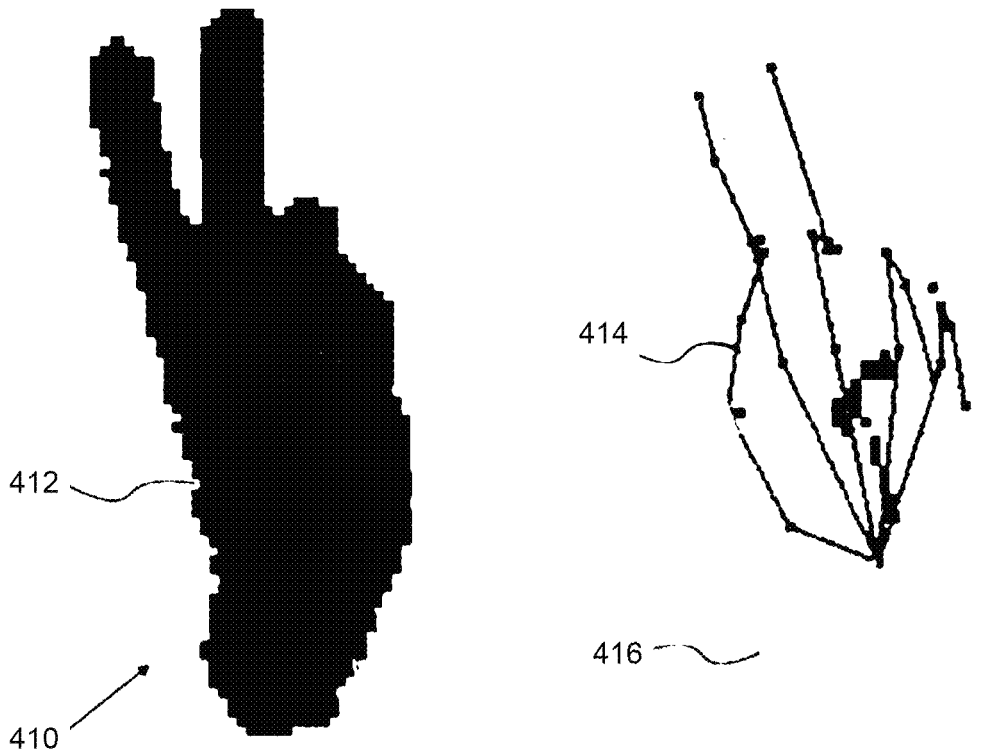

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
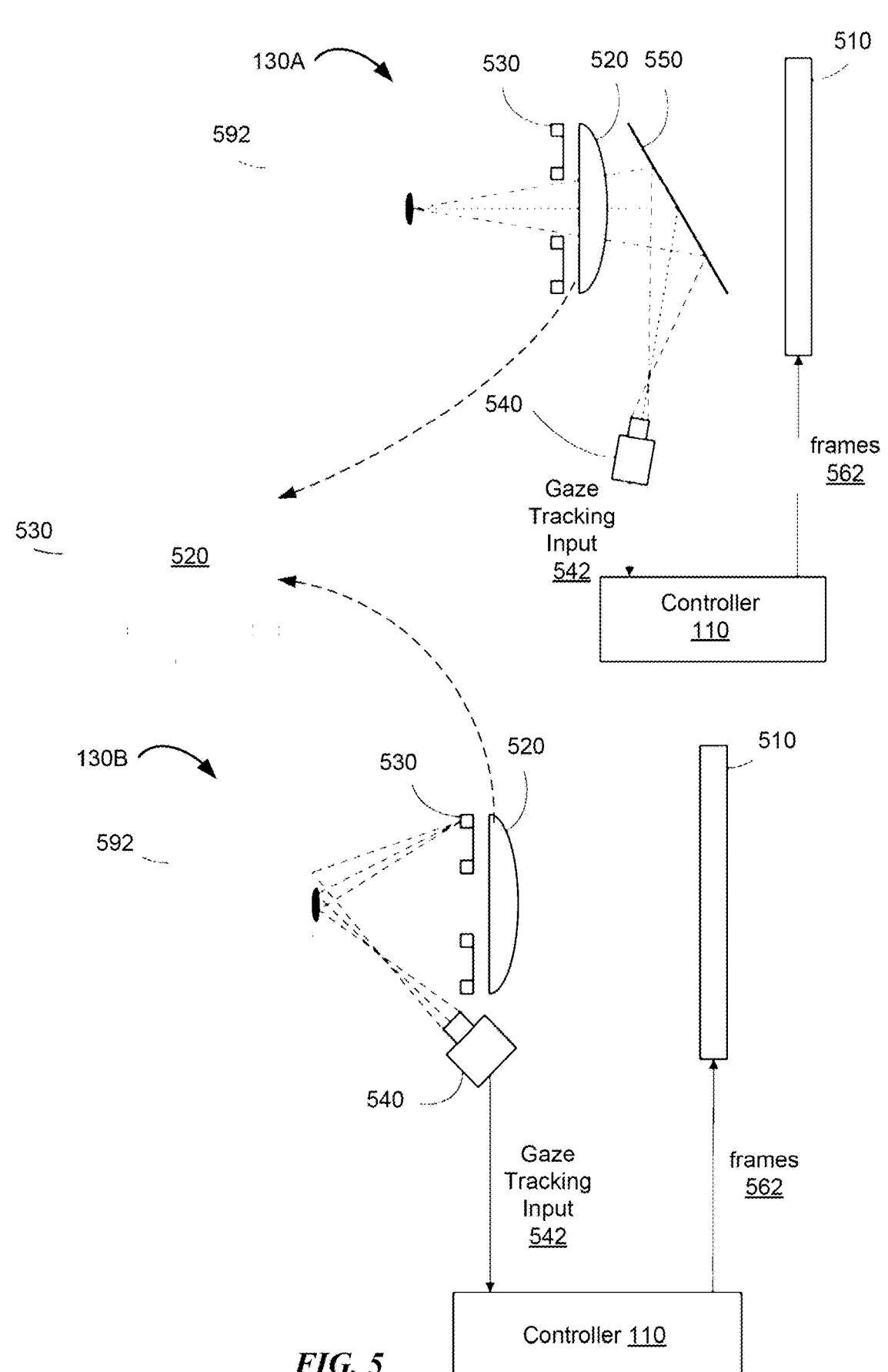
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a hologram, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
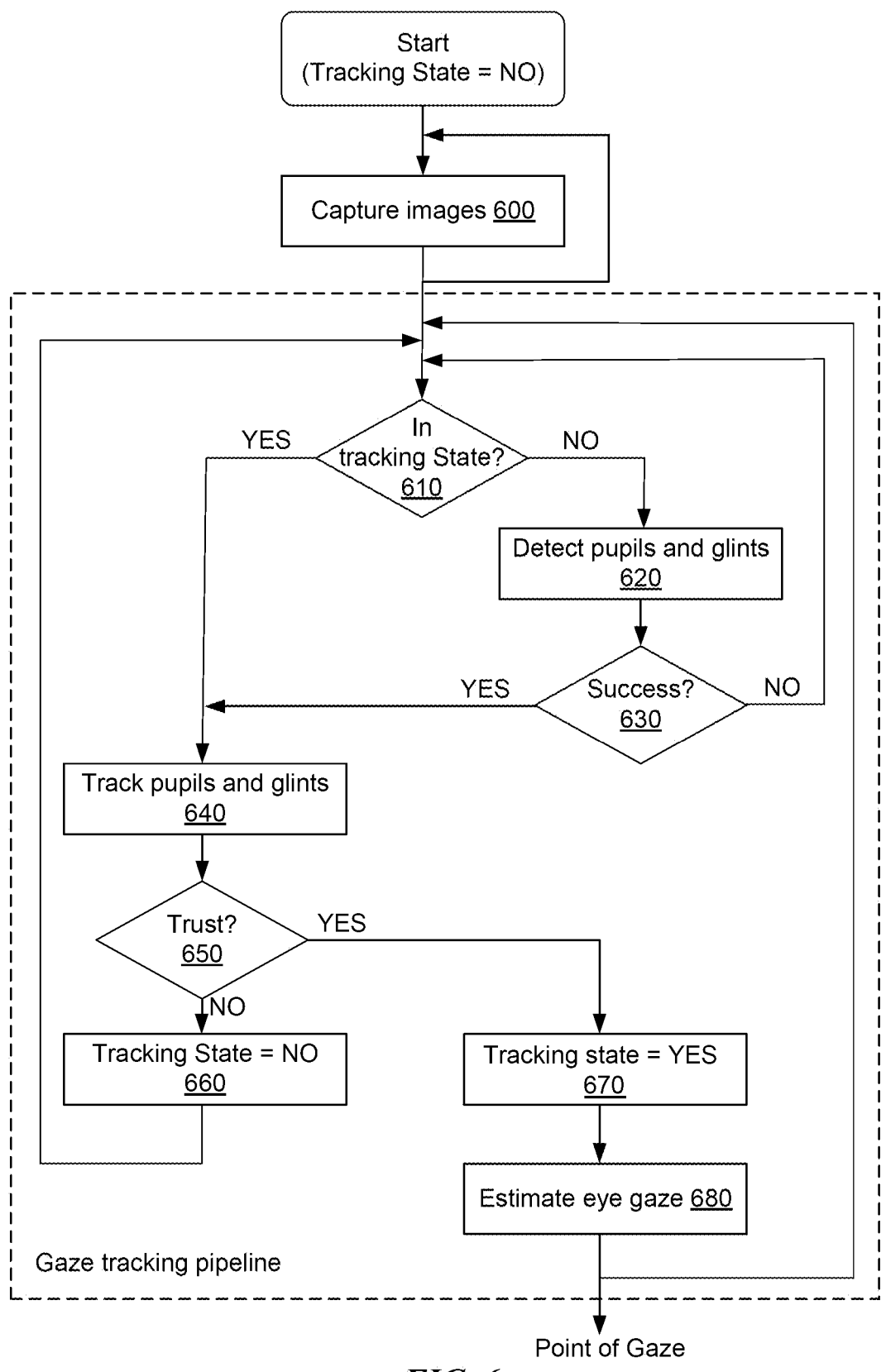
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO." When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, (optionally) one or more input devices, and (optionally) one or cameras.

FIGS. 7A1-7F illustrate exemplary techniques for displaying one or more representations of one or more users in accordance with some embodiments. The user interfaces in these figures are used to illustrate the processes described below, including the processes described in relation to FIGS. 8 and 9.

Figure 7C:
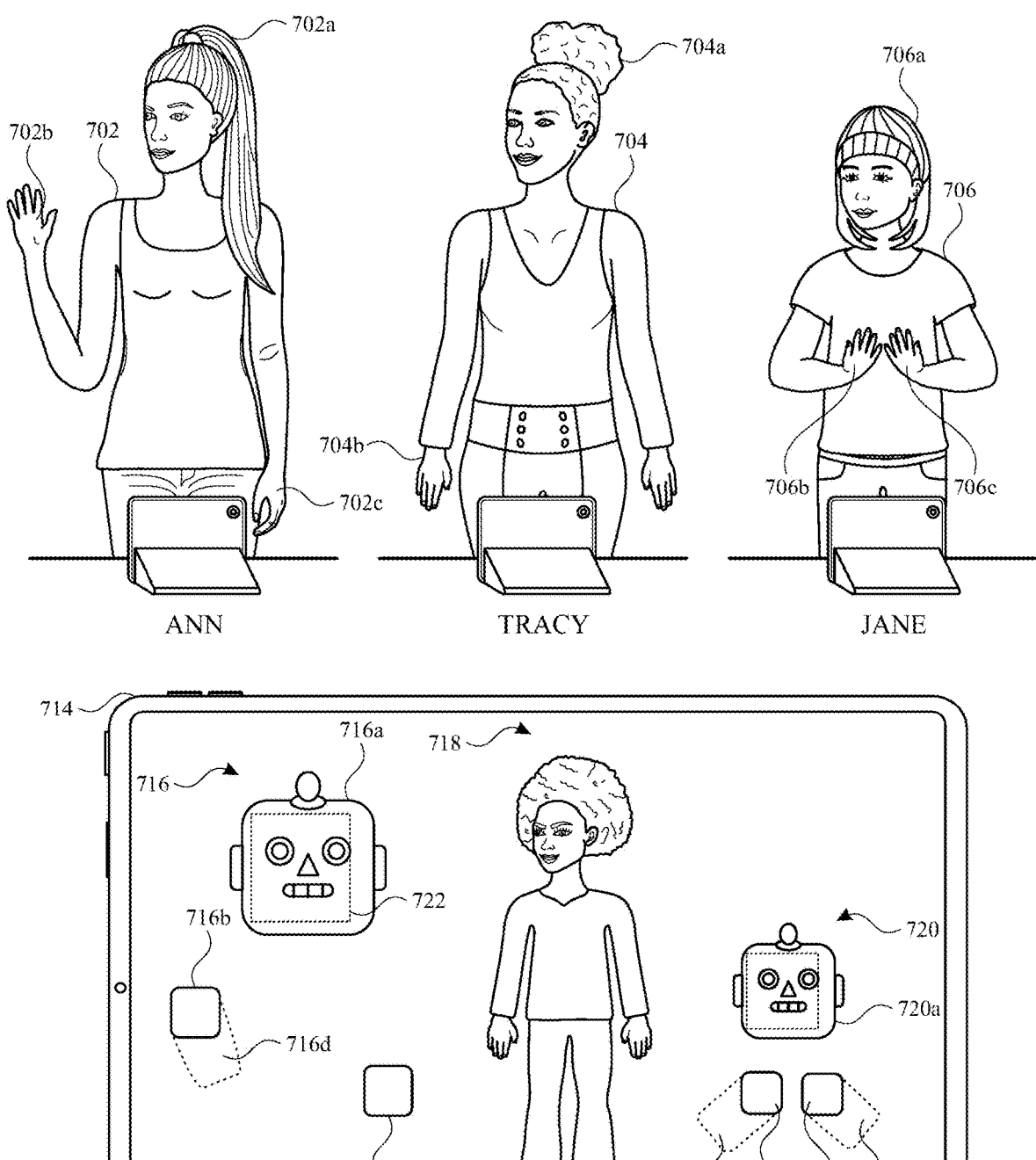

FIG. 7A1 illustrates Ann 702 (e.g., "Ann"), Tracy 704 (e.g., "Tracy"), and Jane 706 (e.g., "Jane") participating in a live communication session using Ann's computer system 708, Tracy's computer system 710, and Jane's computer system 712. In some embodiments, the live communication session is a game session, a video conference session, a collaboration session, and/or an event session. In some embodiments, the live communication session is controlled and/or directed by a server that is in communication with Ann's computer system 708, Tracy's computer system 710, Jane's computer system 712, and/or computer system 714. In some embodiments, the live communication session includes one or more participants other than Ann 702, Tracy 704, and Jane 706. In some embodiments, display of the live communication session is controlled by one or more settings that are configurable from one or more of Ann's computer system 708, Tracy's computer system 710, Jane's computer system 712, and/or computer system 714.

At FIG. 7A1, Ann 702 is being captured by one or more cameras of Ann's computer system 708, Tracy 704 is being captured by one or more cameras of Tracy's computer system 710, and Jane 706 is being captured by one or more cameras of Jane's computer system 712. While FIG. 7A1 illustrates Ann 702, Tracy 704, and Jane 706 standing together in the same space in the physical environment, it should be understood that Ann 702, Tracy 704, and Jane 706 could be remote from each other in different and/or distant spaces (e.g., located in different countries, states, and/or continents) in the physical environment. FIG. 7A1 also illustrates computer system 714 displaying Ann's virtual object 716, Tracy's virtual object 718, and Jane's virtual object 720. In some embodiments, computer system 714 is Ann's computer system 708, Tracy's computer system 710, or Jane's computer system 712. In some embodiments, computer system 714 does not belong to Ann 702, Tracy 704, or Jane 706. In some embodiments, computer system 714 is a different computer system than Ann's computer system 708, Tracy's computer system 710, and Jane's computer system 712. In some embodiments, one or more cameras of computer system 714 captures one or more users that are not Ann 702, Tracy 704, and Jane 706. In some embodiments, one or more of Ann's computer system 708, Tracy's computer system 710, Jane's computer system 712, and computer system 714 are in communication with one or more external devices, one or more gaze tracking sensors, one or more physical input mechanisms (e.g., one or more rotatable input mechanisms and/or buttons), one or more cameras, one or more display projectors, one or more audio output devices, and/or one or more touch-sensitive surfaces. In some embodiments, one or more of Ann's computer system 708, Tracy's computer system 710, Jane's computer system 712, and computer system 714 includes one or more components of computer system 101, such as controller 110, display generation component 120, and eye tracking device 130. In some embodiments, one or more of Ann's computer system 708, Tracy's computer system 710, Jane's computer system 712, and computer system 714 is a computer system and/or device, such as a smartphone, tablet, head-mounted display device, and/or laptop. In some embodiments, one or more of Ann's computer system 708, Tracy's computer system 710, Jane's computer system 712, and computer system 714 presents a representation of a physical environment via one or more cameras that are in communication with one or more of Ann's computer system 708, Tracy's computer system 710, Jane's computer system 712, and computer system 714 (e.g., using "pass-through video"). In some embodiments, one or more of Ann's computer system 708, Tracy's computer system 710, Jane's computer system 712, and computer system 714 presents an XR environment through a display (e.g., the particular display that is in communication with a particular computer system), such as display generation component 120. In some embodiments, one or more of Ann's computer system 708, Tracy's computer system 710, Jane's computer system 712, and computer system 714 presents a representation of the physical environment, a virtual environment, and/or the XR environment by displaying a representation of visual content (e.g., data and/or information) that is captured in the field-of-view of one or more cameras that are in communication with one or more of Ann's computer system 708, Tracy's computer system 710, Jane's computer system 712, and computer system 714. In some embodiments, one or more of Ann's computer system 708, Tracy's computer system 710, Jane's computer system 712, and computer system 714 includes a display that is a transparent or semi-transparent. In some embodiments, a user can view the physical environment directly through the transparent or semi-transparent display, and one or more of Ann's computer system 708, Tracy's computer system 710, Jane's computer system 712, and computer system 714 can present virtual objects on the transparent or semi-transparent display. In some embodiments, one or more of Ann's computer system 708, Tracy's computer system 710, Jane's computer system 712, and computer system 714 overlays the virtual objects over the representation of the physical environment that is visible through the transparent or semi-transparent display. In some embodiments, one or more of Ann's computer system 708, Tracy's computer system 710, Jane's computer system 712, and computer system 714 projects (e.g., via one or more display projectors and/or display generation component 120) virtual objects (e.g., Ann's virtual object 716, Tracy's virtual object 718, and/or Jane's virtual object 720) into and/or onto the representation of the physical environment. In some embodiments, the virtual objects are projected on a physical surface or as a hologram. In some embodiments, a user using one or more of Ann's computer system 708, Tracy's computer system 710, Jane's computer system 712, and computer system 714 can observe the virtual objects as being superimposed over the physical environment. In some embodiments, one or more of Ann's computer system 708, Tracy's computer system 710, Jane's computer system 712, and computer system 714 presents a representation of a virtual environment (e.g., without presenting a representation of a physical environment) and presents a representation of Ann 702, Tracy 704, and/or Jane 706 in the virtual environment. In some embodiments, one or more of Ann's computer system 708, Tracy's computer system 710, Jane's computer system 712, and computer system 714 includes a set of projectors that can be controlled (e.g., turned on, turned off, and/or adjusted) individually and/or independently of each other.

As discussed above, FIG. 7A1 illustrates computer system 714 displaying Ann's virtual object 716, Tracy's virtual object 718, and Jane's virtual object 720. Ann's virtual object 716 is a representation of Ann 702, who is being captured in the field-of-view of the one or more cameras of Ann's computer system 708; Tracy's virtual object 718 is a representation of Tracy 704, who is being captured in the field-of-view of the one or more cameras of Tracy's computer system 710; and Jane's virtual object 720 is a representation of Jane 706, who is being captured in the field-of-view of the one or more cameras of Jane's computer system 712. Ann's virtual object 716 includes Ann's head representation 716a, Ann's right hand representation 716b, and Ann's left hand representation 716c. Ann's head representation 716a corresponds to Ann's head 702a, Ann's right hand representation 716b corresponds to Ann's right hand 702b, and Ann's left hand representation 716c corresponds to Ann's left hand 702c. Ann's head representation 716a, Ann's right hand representation 716b, and Ann's left hand representation 716c indicate the position of the body part of Ann 702 to which each of the respective portions correspond. Tracy's virtual object 718 includes Tracy's head representation 718a, Tracy's right arm representation 718b, Tracy's right hand representation 718c, Tracy's left arm representation 718d, Tracy's left hand representation 718e, and Tracy's torso representation 718f. Tracy's head representation 718a corresponds to Tracy's head 704a, Tracy's right arm representation 718b corresponds to Tracy's right arm 704b, Tracy's right hand representation 718c corresponds to Tracy's right hand 704c, Tracy's left arm representation 718d corresponds to Tracy's left arm 704d, Tracy's left hand representation 718e corresponds to Tracy's left hand 704e, and Tracy's torso representation 718f corresponds to Tracy's torso 704f. In some embodiments, computer system 714 displays one or more of Ann's virtual object 716 and Tracy's virtual object 718 as a three-dimensional virtual object. In some embodiments, computer system 714 displays one or more of Ann's virtual object 716 and Tracy's virtual object 718 as a two-dimensional virtual object. In some embodiments, computer system 714 moves the two-dimensional virtual object in three-dimensional space (e.g., in the x, y, and z directions). In some embodiments, computer system 714 displays one or more of Ann's virtual object 716 and Tracy's virtual object 718 by using simulated emitted light, such that one or more of Ann's virtual object 716 and Tracy's virtual object 718 appears as though light is being emitted onto the one or more respective virtual objects in three-dimensional space.

Notably, at FIG. 7A1, Tracy's virtual object 718 is different from Ann's virtual object 716. For example, Ann's virtual object 716 does not include any torso and/or arm portions that Tracy's virtual object 718 includes. In addition, Ann's head representation 716a, Ann's right hand representation 716b, and Ann's left hand representation 716c are not connected via one or more other portions of Ann's virtual object 716 while Tracy's head representation 718a, Tracy's right hand representation 718c, and Tracy's left hand representation 718e are connected via one or more other portions of Tracy's virtual object 718 (e.g., Tracy's right arm representation 718b, Tracy's left arm representation 718d, and Tracy's torso representation 718f). At FIG. 7A1, computer system 714 displays Ann's virtual object 716 based on a lower fidelity avatar style being selected to display an avatar for Ann 702, and computer system 714 displays Tracy's virtual object 718 based on a higher fidelity avatar style being selected to display an avatar for Tracy 704. Computer system 714 displays a virtual object based on the lower fidelity avatar style being selected by excluding certain details that correspond to a respective user, where the certain details are included when computer system 714 displays the virtual object based on the higher fidelity being selected. When the higher fidelity avatar style is selected, computer system 714 displays a virtual object that matches the user's appearance more than the virtual object that is displayed when the lower fidelity avatar style is selected. Because computer system 714 is displaying Ann's virtual object 716 based on the lower fidelity avatar style being selected, Ann's virtual object 716 does not include a representation of the fingers, the torso, and the arms of Ann 702. However, because computer system 714 is displaying Tracy's virtual object 718 based on the higher fidelity avatar style being selected, Tracy's virtual object 718 includes a representation of the fingers, the torso, and the arms of Tracy 704. In some embodiments, Ann's virtual object 716 does not include one or more features (e.g., eyes, nose, and/or mouth) that are within region indicator 722. In some embodiments, Ann's virtual object 716 does not include a representation of facial expressions, facial features, and/or other features (e.g., hair style, hair color, skin color, and/or clothes) that correspond to (e.g., in the field-of-view of the one or more cameras or selected by a user) Ann 702, and Tracy's virtual object 718 includes one or more representations of the facial expressions, facial features, and/or other features that correspond to Tracy 704. In some embodiments, one or more of computer system 714, Ann's computer system 708, and Tracy's computer system 710 uses fewer computing resources (e.g., less network resources, bandwidth, energy, memory, user interface real estate, and/or processing power) to display a virtual object based on the lower fidelity avatar style being selected (e.g., to display Ann's virtual object 716 at FIG. 7A1) than to display a virtual object based on the higher fidelity style being selected (e.g., to display Tracy's virtual object 718 at FIG. 7A1) (e.g., because a representation displayed based on the lower fidelity avatar style includes less details of the user than a representation displayed based on the higher fidelity avatar style). In some embodiments, computer system 714 displays Ann's virtual object 716 based on the lower fidelity avatar style because a determination has been made that the lower fidelity avatar style has been selected by a user (e.g., based on a user-configurable setting that is accessible from Ann's computer system 708 and/or computer system 714 and/or based on a configurable setting that is associated with a profile that belongs to Ann 702). In some embodiments, computer system 714 displays Tracy's virtual object 718 based on the higher fidelity avatar style because a determination has been made that the higher fidelity avatar style has been selected by a user (e.g., based on a user-configurable setting that is accessible from Tracy's computer system 710 and/or computer system 714 and/or based on a configurable setting that is associated with a profile that belongs to Tracy 704). In some embodiments, computer system 714 displays Ann's virtual object 716 based on the lower fidelity avatar style because a determination has been made that Ann 702 is a guest user and displays Tracy's virtual object 718 based on the higher fidelity avatar style because a determination has been made that Tracy 704 is a register user (e.g., not a guest user and/or a fully registered user). In some embodiments, computer system 714 displays Ann's virtual object 716 based on the lower fidelity avatar style because a determination has been made that Ann 702 is a user who has not completed an avatar enrollment process and displays Tracy's virtual object 718 based on the higher fidelity style because a determination has been made that Tracy 704 is a user who has completed the avatar enrollment process. In some embodiments, a determination is made that a user has completed the avatar enrollment process when a determination is made that a profile and/or account that corresponds to the user is associated with an avatar enrollment process that has been completed.

At FIG. 7A1, similar to Ann's virtual object 716, computer system 714 displays Jane's virtual object 720 based on the lower fidelity avatar style being selected to display the avatar for Jane 706. At FIG. 7A1, computer system 714 displays Ann's virtual object 716 and Jane's virtual object 720 based on the same type of avatar style being selected and displays Tracy's virtual object 718 based on a different type of avatar style being selected. Jane's virtual object 720 includes Jane's head representation 720a, Jane's right hand representation 720b, and Jane's left hand representation 720c. Jane's head representation 720a corresponds to Jane's head 706a, Jane's right hand representation 720b corresponds to Jane's right hand 706b, and Jane's left hand representation 720c corresponds to Jane's left hand 706c, which are not connected to each other (e.g., via one or more arms and/or torso portions). As illustrated in FIG. 7A1, Ann's virtual object 716 is larger than Jane's virtual object 720 because Ann 702 is larger Jane 706. Moreover, a particular portion of Ann 702 (e.g., Ann's right hand representation 716b) is larger than the corresponding portion of Jane 706 (e.g., Jane's right hand representation 720b) because the portion of Ann 702 is larger than the corresponding portion of Jane 706 (e.g., Ann's right hand 702b is larger than Jane's right hand 706b). In some embodiments, computer system 714 displays virtual objects (and/or portions of the virtual objects) based on the size of the respective user (and/or body parts of the respective user) to which the virtual object (and/or the portions of the virtual object) corresponds.

As illustrated in FIG. 7A1, computer system 714 displays Ann's virtual object 716 with a first color and Jane's virtual object 720 with a second color that is different from the first color. In some embodiments, Ann's virtual object 716 has the first color and Jane's virtual object 720 has the second color because a determination is made that virtual objects for multiple users in the live communication session (e.g., Ann 702 and Jane 706 at FIG. 7A1) are configured to be displayed with the same avatar style (and, in some embodiments, the lower fidelity avatar style). In some embodiments, when computer system 714 displays virtual objects for multiple users in the live communication session that are configured to be displayed with the higher fidelity style, computer system 714 differentiates the virtual objects based on the features of the user (e.g., facial features, hand features, hairstyle, and/or body appearance) (and, in some of these embodiments, instead of color). In some embodiments, computer system 714 displays a virtual object based on the lower fidelity style being selected for a respective user with the same color (e.g., a color, shade, brightness, and/or tint that corresponds to light and/or simulated light) that computer system 714 uses to display the virtual object based on the higher fidelity style being selected for the respective user. In some embodiments, computer system 714 selects the color for displaying the virtual object based on a determination that the color corresponds to and/or is the color of one or more annotations that were added by the user that is represented by the virtual object (e.g., a pencil mark in a three-dimensional environment, a pencil mark in coloration document, and/or the most recent annotation that is associated with the user). In some embodiments, computer system 714 displays Ann's head representation 716a, Ann's right hand representation 716b, Ann's left hand representation 716c, Jane's head representation 720a, Jane's right hand representation 720b, and Jane's left hand representation 720c in a different manner than the one illustrated in FIG. 7A1. In some embodiments, one or more of Ann's head representation 716a, Ann's right hand representation 716b, Ann's left hand representation 716c, Jane's head representation 720a, Jane's right hand representation 720b, and Jane's left hand representation 720c are a different shape than the shapes illustrated in FIG. 7A 1. In some embodiments, computer system 714 displays Ann's head representation 716a, Ann's right hand representation 716b, and Ann's left hand representation 716c as each being a circle and/or oval. In some embodiments, one or more of the circles and/or ovals are translucent. In some embodiments, computer system 714 distorts and/or changes the shape, size, color, and/or translucence of the one or more of the circles and/or ovals while moving the one or more circles or ovals (e.g., to show movement, direction, and/or speed of the user). At FIG. 7A1, computer system 714 (and/or one or more of Ann's computer system 708, Tracy's computer system 710, and Jane's computer system 712) detects movement of Ann 702, Tracy 704, and/or Jane 706 as Ann 702, Tracy 704, and Jane 706 begin moving to perform a routine in the physical environment.

In some embodiments, the techniques and user interface(s) described in FIGS. 7A1-7F are provided by one or more of the devices described in FIGS. 1A-1P. For example, FIG. 7A2 illustrates an embodiment in which virtual objects 716-720 (e.g., as described in FIG. 7A1) are displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

FIG. 7A2 illustrates Ann 702 (e.g., "Ann"), Tracy 704 (e.g., "Tracy"), and Jane 706 (e.g., "Jane") participating in a live communication session using Ann's HMD X708, Tracy's HMD X710, and Jane's HMD X712. In some embodiments, the live communication session is a game session, a video conference session, a collaboration session, and/or an event session. In some embodiments, the live communication session is controlled and/or directed by a server that is in communication with Ann's HMD X708, Tracy's HMD X710, Jane's HMD X712, and/or HMD 700X. In some embodiments, the live communication session includes one or more participants other than Ann 702, Tracy 704, and Jane 706. In some embodiments, display of the live communication session is controlled by one or more settings that are configurable from one or more of Ann's HMD X708, Tracy's HMD X710, Jane's HMD X712, and/or HMD X700.

At FIG. 7A2, Ann 702 is being captured by one or more cameras of Ann's HMD X708, Tracy 704 is being captured by one or more cameras of Tracy's HMD X710, and Jane 706 is being captured by one or more cameras of Jane's HMD X712. While FIG. 7A2 illustrates Ann 702, Tracy 704, and Jane 706 standing together in the same space in the physical environment, it should be understood that Ann 702, Tracy 704, and Jane 706 could be remote from each other in different and/or distant spaces (e.g., located in different countries, states, and/or continents) in the physical environment. FIG. 7A2 also illustrates HMD X700 displaying Ann's virtual object 716, Tracy's virtual object 718, and Jane's virtual object 720. In some embodiments, HMD X700 is Ann's HMD X708, Tracy's HMD X710, or Jane's HMD X712. In some embodiments, HMD X700 does not belong to Ann 702, Tracy 704, or Jane 706. In some embodiments, HMD X700 is a different computer system than Ann's HMD X708, Tracy's HMD X710, and Jane's HMD X712.

In some embodiments, one or more cameras of HMD X700 captures one or more users that are not Ann 702, Tracy 704, and Jane 706. In some embodiments, one or more of Ann's HMD X708, Tracy's HMD X710, Jane's HMD X712, and HMD X700 are in communication with one or more external devices, one or more gaze tracking sensors, one or more physical input mechanisms (e.g., one or more rotatable input mechanisms and/or buttons), one or more cameras, one or more display projectors, one or more audio output devices, and/or one or more touch-sensitive surfaces. In some embodiments, one or more of Ann's HMD X708, Tracy's HMD X710, Jane's HMD X712, and HMD X700 includes one or more components of computer system 101, such as controller 110, display generation component 120, display X702, and eye tracking device 130.

In some embodiments, one or more of Ann's HMD X708, Tracy's HMD X710, Jane's HMD X712, and HMD X700 presents a representation of a physical environment via one or more cameras that are in communication with one or more of Ann's HMD X708, Tracy's HMD X710, Jane's HMD X712, and HMD X700 (e.g., using "pass-through video"). In some embodiments, one or more of Ann's HMD X708, Tracy's HMD X710, Jane's HMD X712, and HMD X700 presents an XR environment through a display (e.g., the particular display that is in communication with a particular computer system), such as display X702 and/or display generation component 120. In some embodiments, one or more of Ann's HMD X708, Tracy's HMD X710, Jane's HMD X712, and HMD X700 presents a representation of the physical environment, a virtual environment, and/or the XR environment by displaying a representation of visual content (e.g., data and/or information) that is captured in the field-of-view of one or more cameras that are in communication with one or more of Ann's HMD X708, Tracy's HMD X710, Jane's HMD X712, and HMD X700. In some embodiments, one or more of Ann's HMD X708, Tracy's HMD X710, Jane's HMD X712, and HMD X700 includes a display, such as display X702, that is a transparent or semi-transparent. In some embodiments, a user can view the physical environment directly through the transparent or semi-transparent display, and one or more of Ann's HMD X708, Tracy's HMD X710, Jane's HMD X712, and HMD X700 can present virtual objects on the transparent or semi-transparent display. In some embodiments, one or more of Ann's HMD X708, Tracy's HMD X710, Jane's HMD X712, and HMD X700 overlays the virtual objects over the representation of the physical environment that is visible through the transparent or semi-transparent display. In some embodiments, one or more of Ann's HMD X708, Tracy's HMD X710, Jane's HMD X712, and HMD X700 projects (e.g., via one or more display projectors, display X702, and/or display generation component 120) virtual objects (e.g., Ann's virtual object 716, Tracy's virtual object 718, and/or Jane's virtual object 720) into and/or onto the representation of the physical environment. In some embodiments, the virtual objects are projected on a physical surface or as a holograph. In some embodiments, a user using one or more of Ann's HMD X708, Tracy's HMD X710, Jane's HMD X712, and HMD X700 can observe the virtual objects as being superimposed over the physical environment. In some embodiments, one or more of Ann's HMD X708, Tracy's HMD X710, Jane's HMD X712, and HMD X700 presents a representation of a virtual environment (e.g., without presenting a representation of a physical environment) and presents a representation of Ann 702, Tracy 704, and/or Jane 706 in the virtual environment. In some embodiments, one or more of Ann's HMD X708, Tracy's HMD X710, Jane's HMD X712, and HMD X700 includes a set of projectors that can be controlled (e.g., turned on, turned off, and/or adjusted) individually and/or independently of each other.

As discussed above, FIG. 7A2 illustrates HMD X700 displaying Ann's virtual object 716, Tracy's virtual object 718, and Jane's virtual object 720. Ann's virtual object 716 is a representation of Ann 702, who is being captured in the field-of-view of the one or more cameras of Ann's HMD X708; Tracy's virtual object 718 is a representation of Tracy

704, who is being captured in the field-of-view of the one or more cameras of Tracy's HMD X710; and Jane's virtual object 720 is a representation of Jane 706, who is being captured in the field-of-view of the one or more cameras of Jane's HMD X712. Ann's virtual object 716 includes Ann's head representation 716a, Ann's right hand representation 716b, and Ann's left hand representation 716c. Ann's head representation 716a corresponds to Ann's head 702a, Ann's right hand representation 716b corresponds to Ann's right hand 702b, and Ann's left hand representation 716c corresponds to Ann's left hand 702c. Ann's head representation 716a, Ann's right hand representation 716b, and Ann's left hand representation 716c indicate the position of the body part of Ann 702 to which each of the respective portions correspond.

Tracy's virtual object 718 includes Tracy's head representation 718a, Tracy's right arm representation 718b (e.g., a partial right arm representation), Tracy's right hand representation 718c, Tracy's left arm representation 718d (e.g., a partial left arm representation), Tracy's left hand representation 718e, and Tracy's torso representation 718f (e.g., a partial torso representation). Tracy's head representation 718a corresponds to Tracy's head 704a, Tracy's right arm representation 718b corresponds to Tracy's right arm 704b and/or a portion of Tracy's right arm 704b, Tracy's right hand representation 718c corresponds to Tracy's right hand 704c, Tracy's left arm representation 718d corresponds to Tracy's left arm 704d and/or a portion of Tracy's left arm 704d, Tracy's left hand representation 718e corresponds to Tracy's left hand 704e, and Tracy's torso representation 718f corresponds to Tracy's torso 704f and/or a portion of Tracy's torso 704f.

In some embodiments, HMD X700 displays one or more of Ann's virtual object 716 and Tracy's virtual object 718 as a three-dimensional virtual object. In some embodiments, HMD X700 displays one or more of Ann's virtual object 716 and Tracy's virtual object 718 as a two-dimensional virtual object. In some embodiments, HMD X700 moves the two-dimensional virtual object in three-dimensional space (e.g., in the x, y, and z directions). In some embodiments, HMD X700 displays one or more of Ann's virtual object 716 and Tracy's virtual object 718 by using simulated emitted light, such that one or more of Ann's virtual object 716 and Tracy's virtual object 718 appears as though light is being emitted onto the one or more respective virtual objects in three-dimensional space.

Notably, at FIG. 7A2, Tracy's virtual object 718 is different from Ann's virtual object 716. For example, Ann's virtual object 716 does not include any torso and/or arm portions that Tracy's virtual object 718 includes.

At FIG. 7A2, HMD X700 displays Ann's virtual object 716 based on a lower fidelity avatar style being selected to display an avatar for Ann 702, and HMD X700 displays Tracy's virtual object 718 based on a higher fidelity avatar style being selected to display an avatar for Tracy 704. HMD X700 displays a virtual object based on the lower fidelity avatar style being selected by excluding certain details that correspond to a respective user, where the certain details are included when HMD X700 displays the virtual object based on the higher fidelity being selected. When the higher fidelity avatar style is selected, HMD X700 displays a virtual object that matches the user's appearance more than the virtual object that is displayed when the lower fidelity avatar style is selected.

Because HMD X700 is displaying Ann's virtual object 716 based on the lower fidelity avatar style being selected, Ann's virtual object 716 does not include a representation of the fingers, the torso, and the arms of Ann 702. However, because HMD X700 is displaying Tracy's virtual object 718 based on the higher fidelity avatar style being selected, Tracy's virtual object 718 includes a representation of the fingers, the torso (e.g., a representation of a portion of the torso), and the arms of Tracy 704 (e.g., representations of portions of the arms of Tracy 704). In some embodiments, Ann's virtual object 716 does not include one or more features (e.g., eyes, nose, and/or mouth) that are within region indicator 722. In some embodiments, Ann's virtual object 716 does not include a representation of facial expressions, facial features, and/or other features (e.g., hair style, hair color, skin color, and/or clothes) that correspond to (e.g., in the field-of-view of the one or more cameras or selected by a user) Ann 702, and Tracy's virtual object 718 includes one or more representations of the facial expressions, facial features, and/or other features that correspond to Tracy 704.

In some embodiments, one or more of HMD X700, Ann's HMD X708, and Tracy's HMD X710 uses fewer computing resources (e.g., less network resources, bandwidth, energy, memory, user interface real estate, and/or processing power) to display a virtual object based on the lower fidelity avatar style being selected (e.g., to display Ann's virtual object 716 at FIG. 7A2) than to display a virtual object based on the higher fidelity style being selected (e.g., to display Tracy's virtual object 718 at FIG. 7A2) (e.g., because a representation displayed based on the lower fidelity avatar style includes less details of the user than a representation displayed based on the higher fidelity avatar style).

In some embodiments, HMD X700 displays Ann's virtual object 716 based on the lower fidelity avatar style because a determination has been made that the lower fidelity avatar style has been selected by a user (e.g., based on a user-configurable setting that is accessible from Ann's HMD X708 and/or HMD X700 and/or based on a configurable setting that is associated with a profile that belongs to Ann 702). In some embodiments, HMD X700 displays Tracy's virtual object 718 based on the higher fidelity avatar style because a determination has been made that the higher fidelity avatar style has been selected by a user (e.g., based on a user-configurable setting that is accessible from Tracy's HMD X710 and/or HMD X700 and/or based on a configurable setting that is associated with a profile that belongs to Tracy 704). In some embodiments, HMD X700 displays Ann's virtual object 716 based on the lower fidelity avatar style because a determination has been made that Ann 702 is a guest user and displays Tracy's virtual object 718 based on the higher fidelity avatar style because a determination has been made that Tracy 704 is a registered user (e.g., not a guest user and/or a fully registered user). In some embodiments, HMD X700 displays Ann's virtual object 716 based on the lower fidelity avatar style because a determination has been made that Ann 702 is a user who has not completed an avatar enrollment process and displays Tracy's virtual object 718 based on the higher fidelity style because a determination has been made that Tracy 704 is a user who has completed the avatar enrollment process. In some embodiments, a determination is made that a user has completed the avatar enrollment process when a determination is made that a profile and/or account that corresponds to the user is associated with an avatar enrollment process that has been completed.

At FIG. 7A2, similar to Ann's virtual object 716, HMD X700 displays Jane's virtual object 720 based on the lower fidelity avatar style being selected to display the avatar for Jane 706. Jane's virtual object 720 includes Jane's head representation 720a, Jane's right hand representation 720b, and Jane's left hand representation 720c. Jane's head representation 720a corresponds to Jane's head 706a, Jane's right hand representation 720b corresponds to Jane's right hand 706b, and Jane's left hand representation 720c corresponds to Jane's left hand 706c, which are not connected to each other (e.g., via one or more arms and/or torso portions). At FIG. 7A2, Jane's head representation 720a does not include one or more facial features (e.g., eyes, nose, and/or mouth). In some embodiments, Jane's virtual object 720 does not include a representation of facial expressions, facial features, and/or other features (e.g., hair style, hair color, skin color, and/or clothes) that correspond to (e.g., in the field-of-view of the one or more cameras or selected by a user) Jane 706.

As illustrated in FIG. 7A2, Ann's virtual object 716 is larger than Jane's virtual object 720 because Ann 702 is larger Jane 706. Moreover, a particular portion of Ann 702 (e.g., Ann's right hand representation 716b) is larger than the corresponding portion of Jane 706 (e.g., Jane's right hand representation 720b) because the portion of Ann 702 is larger than the corresponding portion of Jane 706 (e.g., Ann's right hand 702b is larger than Jane's right hand 706b). In some embodiments, HMD X700 displays virtual objects (and/or portions of the virtual objects) based on the size of the respective user (and/or body parts of the respective user) to which the virtual object (and/or the portions of the virtual object) corresponds.

As illustrated in FIG. 7A2, HMD X700 displays Ann's virtual object 716 with a first color and Jane's virtual object 720 with a second color that is different from the first color. In some embodiments, Ann's virtual object 716 has the first color and Jane's virtual object 720 has the second color because a determination is made that virtual objects for multiple users in the live communication session (e.g., Ann 702 and Jane 706 at FIG. 7A2) are configured to be displayed with the same avatar style (and, in some embodiments, the lower fidelity avatar style). In some embodiments, when HMD X700 displays virtual objects for multiple users in the live communication session that are configured to be displayed with the higher fidelity style, HMD X700 differentiates the virtual objects based on the features of the user (e.g., facial features, hand features, hairstyle, and/or body appearance) (and, in some of these embodiments, instead of color). In some embodiments, HMD X700 displays a virtual object based on the lower fidelity style being selected for a respective user with the same color (e.g., a color, shade, brightness, and/or tint that corresponds to light and/or simulated light) that HMD X700 uses to display the virtual object based on the higher fidelity style being selected for the respective user. In some embodiments, HMD X700 selects the color for displaying the virtual object based on a determination that the color corresponds to and/or is the color of one or more annotations that were added by the user that is represented by the virtual object (e.g., a pencil mark in a three-dimensional environment, a pencil mark in coloration document, and/or the most recent annotation that is associated with the user).

In some embodiments, HMD X700 displays Ann's head representation 716a, Ann's right hand representation 716b, Ann's left hand representation 716c, Jane's head representation 720a, Jane's right hand representation 720b, and Jane's left hand representation 720c in a different manner than the one illustrated in FIG. 7A2. In some embodiments, one or more of Ann's head representation 716a, Ann's right hand representation 716b, Ann's left hand representation 716c, Jane's head representation 720a, Jane's right hand representation 720b, and Jane's left hand representation 720c are a different shape than the shapes illustrated in FIG. 7A2. In some embodiments, HMD X700 displays Ann's head representation 716a, Ann's right hand representation 716b, and Ann's left hand representation 716c as each being a circle and/or oval. In some embodiments, one or more of the circles and/or ovals are translucent. In some embodiments, HMD X700 distorts and/or changes the shape, size, color, and/or translucence of the one or more of the circles and/or ovals while moving the one or more circles or ovals (e.g., to show movement, direction, and/or speed of the user). At FIG. 7A2, HMD X700 (and/or one or more of Ann's HMD X708, Tracy's HMD X710, and Jane's HMD X712) detects movement of Ann 702, Tracy 704, and/or Jane 706 as Ann 702, Tracy 704, and Jane 706 begin moving to perform a routine in the physical environment.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

FIGS. 7B1-7E illustrate computer system 714 updating the display of Ann's virtual object 716, Tracy's virtual object 718, and Jane's virtual object 720 to reflect the movement (and/or position) of Ann 702, Tracy 704, and Jane 706 as each participant moves in the physical environment. As illustrated in FIGS. 7B1-7E, Ann 702 moves Ann's right hand 702b upward while Ann's left hand 702c remains stationary. As illustrated in FIGS. 7B1-7E, computer system 714 distorts Ann's right hand representation 716b to indicate that Ann's right hand 702b is moving. As illustrated in FIGS. 7B1-7E, computer system 714 distorts Ann's right hand representation 716b by elongating Ann's right hand representation 716b in a direction (e.g., upward direction in FIG. 7B1 and downward direction in FIGS. 7D-7E), which is indicated by right hand trail 716*d* being illustrated in FIGS. 7B1-7E. Notably, at FIGS. 7B1-7E, computer system 714 does not distort Ann's left hand representation 716*c* because Ann's left hand 702*c* is not moving in FIGS. 7B1-7E, which is indicated by no trail portion being illustrated in FIGS. 7B1-7E next to Ann's left hand representation 716*c*. At FIGS. 7B1-7E, computer system 714 distorts Ann's right hand representation 716*b* based on the direction and speed of Ann's right hand 702*b*. In some embodiments, computer system 714 increases the amount of distortion (e.g., elongates and/or stretches right hand trail 716*d* and/or right hand representation 716*b*) of Ann's right hand representation 716*b* as the speed of Ann's right hand 702*b* increases and decreases (e.g., compresses and/or shortens right hand trail 716*d* and/or right hand representation 716*b*) the amount of distortion of Ann's right hand representation 716*b* as the speed of Ann's right hand 702*b* decreases. In some embodiments, computer system 714 distorts (e.g., elongates and/or spreads) Ann's right hand representation 716*b* in the direction that Ann's right hand representation 716*b* is moving during a particular instance in time. In some embodiments, computer system 714 distorts Ann's right hand representation 716*b* in the x direction, y direction, and/or z direction in relation to computer system 714. In some embodiments, computer system 714 distorts one or more portions of a virtual object differently based on the speed and the direction of movement of one or more body parts of a user that corresponds to the one or more portions of the virtual object that is distorted. In some embodiments, computer system 714 distorts one or more portions of a virtual object based on the size of the user, where computer system 714 displays one or more portions of a virtual object with less distortion when a user is smaller or more distortion when a user is bigger, or vice-versa. In some embodiments, computer system 714 changes the shape of Ann's right hand representation 716*b* in response to Ann's right hand 702*b* being rotated in a direction (e.g., in a direction of pitch, yaw, and/or roll). In some embodiments, computer system 714 changes the shape of Ann's right hand representation 716*b* differently in response to Ann's right hand 702*b* being rotated in a first direction than in response to Ann's right hand 702*b* being rotated in a second direction that is different from the first direction. In some embodiments, in response to detecting that Ann's right hand 702*b* is moving, computer system 714 changes a visual characteristic (e.g., color, brightness, and/or blur) of Ann's right hand representation 716*b*.

As illustrated in FIGS. 7B1-7E, computer system 714 also distorts Ann's head representation 716*a* to indicate that Ann's head 702*a* is moving to her right. At FIGS. 7B1-7E, computer system 714 distorts Ann's head representation 716*a* differently (e.g., different from the distortion applies to Ann's right hand representation 716*b*) by moving a region (e.g., the portion inside of region indicator 722) inside of Ann's head representation 716*a* to Ann's right. In some embodiments, computer system 714 moves the region inside of Ann's head representation 716*a* to Ann's right by changing the level of brightness and/or color of different regions of Ann's head representation 716*a*. In some embodiments, computer system 714 moves the region inside of Ann's head representation 716*a* to indicate that Ann's head 702*a* is being rotated. In some embodiments, computer system 714 updates Ann's virtual object 716 to indicate that Ann's head 702*a* is being rotated by changing the position of a set of eyes that is represented in Ann's virtual object 716. In some embodiments, computer system 714 changes an outline of Ann's head representation 716*a* and/or the region of Ann's head representation 716*a* to indicate that Ann's head 702*a* is moving. In some embodiments, computer system 714 shifts the region inside of Ann's head representation 716*a* in a direction that is based on (e.g., in the direction of or opposite of) the direction that Ann's head 702*a* is moving. In some embodiments, computer system 714 display the region inside of Ann's head representation 716*a* as an orb that is moved to indicate rotation and/or lateral movement of Ann's head 702*a* without moving other portions of Ann's head representation 716*a*.

In some embodiments, the techniques and user interface(s) described in FIGS. 7A1-7F are provided by one or more of the devices described in FIGS. 1A-1P. For example, FIG. 7B2 illustrates an embodiment in which virtual objects X716-X720 (e.g., as described in FIGS. 7A1 and 7A2) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

FIG. 7B2 illustrates HMD X700 updating the display of Ann's virtual object 716, Tracy's virtual object 718, and Jane's virtual object 720 to reflect the movement (and/or position) of Ann 702, Tracy 704, and Jane 706 as each participant moves in the physical environment. As illustrated in FIG. 7B2, Ann 702 begins moving Ann's right hand 702*b* upward while Ann's left hand 702*c* remains stationary. As illustrated in FIG. 7B2, HMD X700 distorts Ann's right hand representation 716*b* to indicate that Ann's right hand 702*b* is moving. As illustrated in FIG. 7B2, HMD X700 distorts Ann's right hand representation 716*b* by elongating Ann's right hand representation 716*b* in a direction (e.g., upward direction), which is indicated by right hand trail 716*d*. Notably, at FIG. 7B2, HMD X700 does not distort Ann's left hand representation 716*c* because Ann's left hand 702*c* is not moving, which is indicated by no trail portion being illustrated next to Ann's left hand representation 716*c*.

At FIG. 7B2, HMD X700 distorts Ann's right hand representation 716*b* based on the direction and speed of Ann's right hand 702*b*. In some embodiments, HMD X700 increases the amount of distortion (e.g., elongates and/or stretches right hand trail 716*d* and/or right hand representation 716*b*) of Ann's right hand representation 716*b* as the speed of Ann's right hand 702*b* increases and decreases (e.g., compresses and/or shortens right hand trail 716*d* and/or right hand representation 716*b*) the amount of distortion of Ann's right hand representation 716*b* as the speed of Ann's right hand 702*b* decreases. In some embodiments, HMD X700 distorts (e.g., elongates and/or spreads) Ann's right hand representation 716*b* in the direction that Ann's right hand representation 716*b* is moving during a particular instance in time. In some embodiments, HMD X700 distorts Ann's right hand representation 716*b* in the x direction, y direction, and/or z direction in relation to HMD X700. In some embodiments, HMD X700 distorts one or more portions of a virtual object differently based on the speed and the direction of movement of one or more body parts of a user that corresponds to the one or more portions of the virtual object that is distorted. In some embodiments, HMD X700 distorts one or more portions of a virtual object based on the size of the user, where HMD X700 displays one or more portions of a virtual object with less distortion when a user is smaller or more distortion when a user is bigger, or vice-versa. In some embodiments, HMD X700 changes the shape of Ann's right hand representation 716*b* in response to Ann's right hand 702*b* being rotated in a direction (e.g., in a direction of pitch, yaw, and/or roll). In some embodiments, HMD X700 changes the shape of Ann's right hand representation 716*b* differently in response to Ann's right hand 702*b* being rotated in a first direction than in response to Ann's right hand 702*b* being rotated in a second direction that is different from the first direction. In some embodiments, in response to detecting that Ann's right hand 702*b* is moving, HMD X700 changes a visual characteristic (e.g., color, brightness, and/or blur) of Ann's right hand representation 716*b*.

As illustrated in FIG. 7B2, HMD 700X also distorts Ann's head representation 716*a* to indicate that Ann's head 702*a* is moving to her right. At FIG. 7B2, HMD X700 distorts Ann's head representation 716*a* differently (e.g., different from the distortion applies to Ann's right hand representation 716*b*) by moving a region (e.g., the portion inside of region indicator 722) inside of Ann's head representation 716*a* to Ann's right. In some embodiments, HMD X700 moves the region inside of Ann's head representation 716*a* to Ann's right by changing the level of brightness and/or color of different regions of Ann's head representation 716*a*. In some embodiments, HMD X700 moves the region inside of Ann's head representation 716*a* to indicate that Ann's head 702*a* is being rotated. In some embodiments, HMD X700 updates Ann's virtual object 716 to indicate that Ann's head 702*a* is being rotated by changing the position of a set of eyes that is represented in Ann's virtual object 716. In some embodiments, HMD X700 changes an outline of Ann's head representation 716*a* and/or the region of Ann's head representation 716*a* to indicate that Ann's head 702*a* is moving. In some embodiments, HMD X700 shifts the region inside of Ann's head representation 716*a* in a direction that is based on (e.g., in the direction of or opposite of) the direction that Ann's head 702*a* is moving. In some embodiments, HMD X700 displays the region inside of Ann's head representation 716*a* as an orb that is moved to indicate rotation and/or lateral movement of Ann's head 702*a* without moving other portions of Ann's head representation 716*a*.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7D:
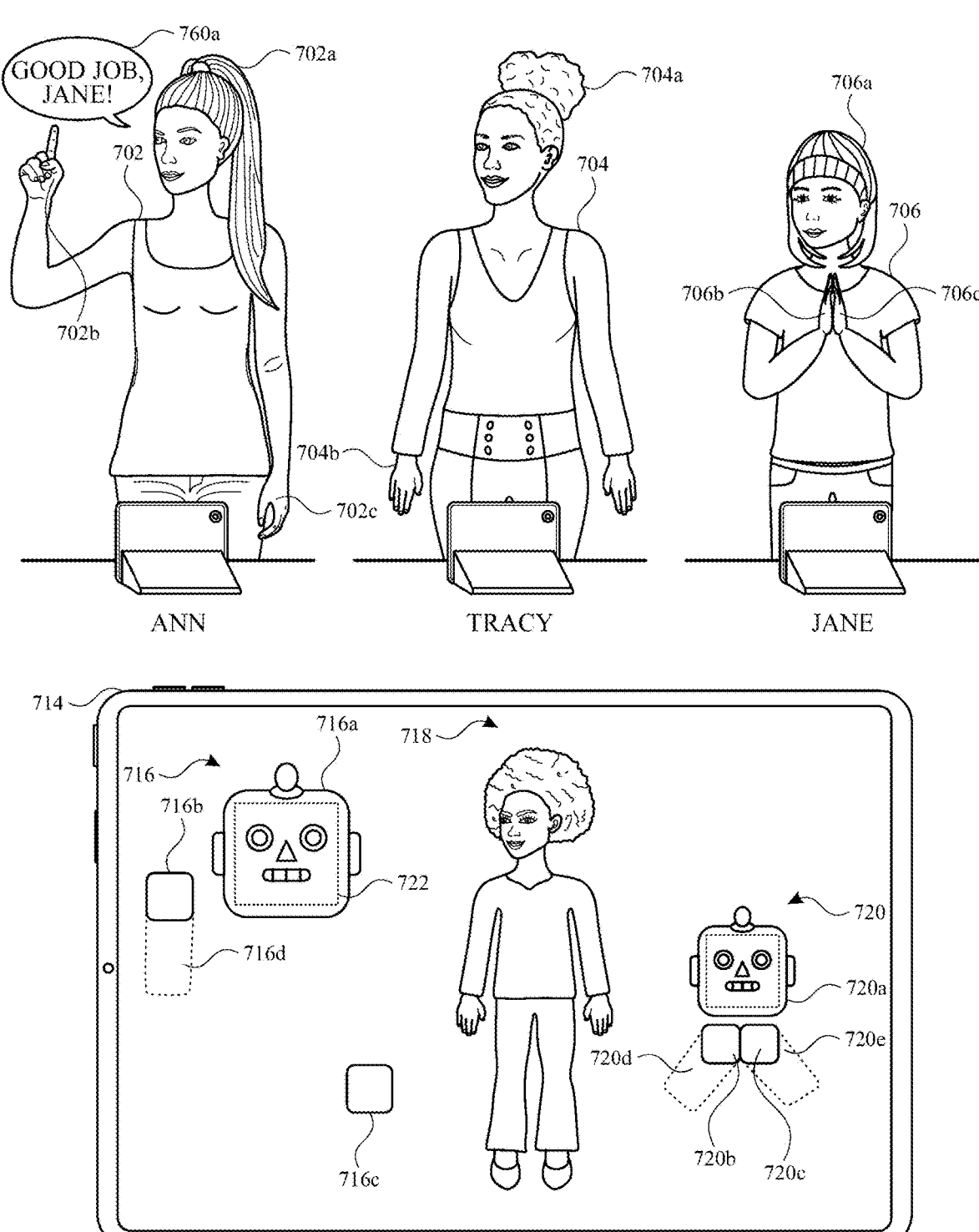
Figure 7E:
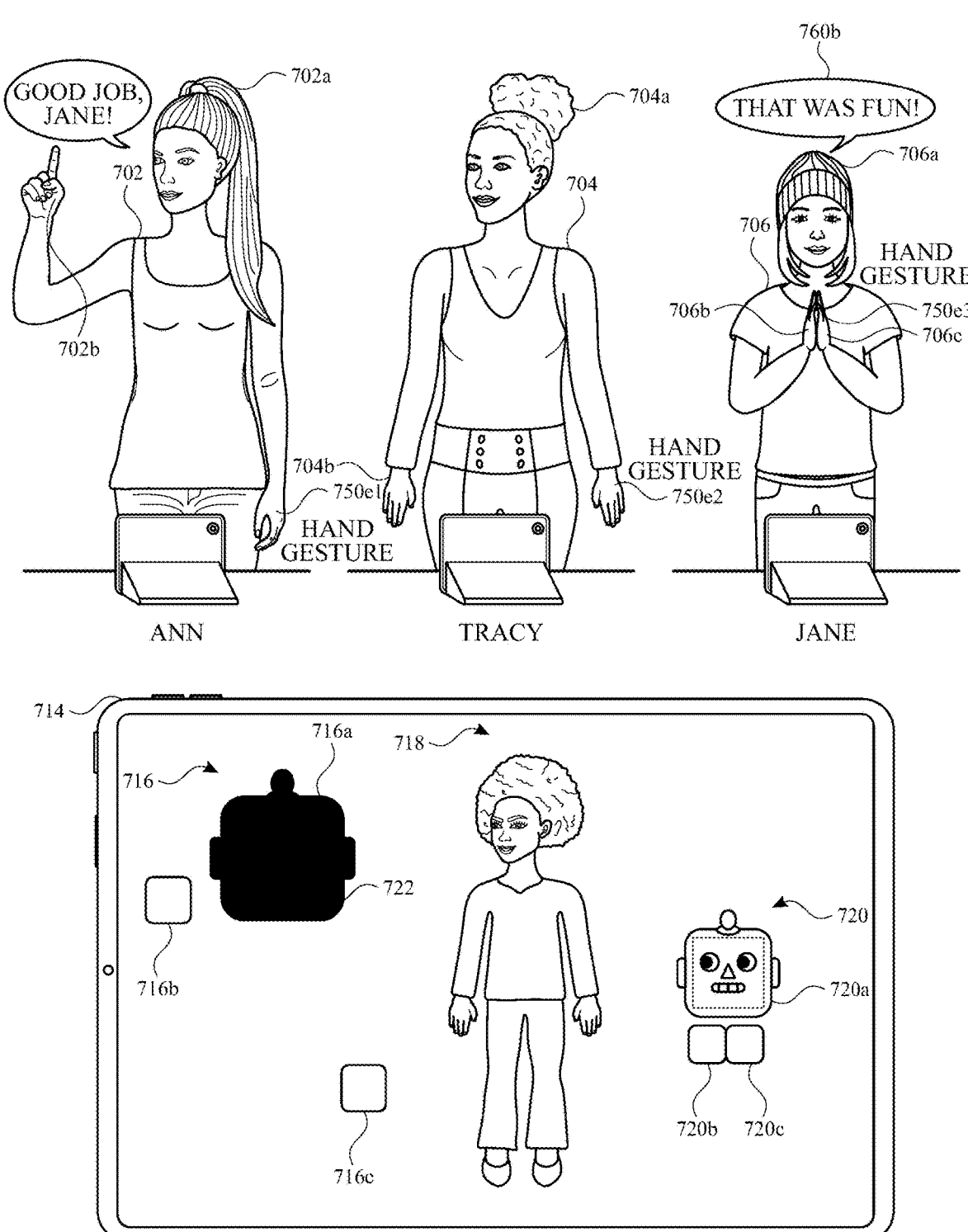

As illustrated in FIGS. 7D-7E, computer system 714 ceases to display right hand trail 716*d* at FIG. 7E in response to a detection that movement of Ann's right hand has stopped. In some embodiments, computer system 714 ceases to display right hand trail 716*d*, Ann's right hand representation 716*b*, and/or Ann's left hand representation 716*c* after a predetermined period of time (e.g., 1-5 seconds) has passed since Ann 702 has been detected to have stopped moving. Looking back at FIGS. 7A1-7B2, in some embodiments, computer system 714 does not display Ann's right hand representation 716*b* and/or Ann's left hand representation 716*c* until a determination has been made that Ann 702 has begun to move. In some embodiments, computer system 714 does not display or ceases to display Ann's left hand representation 716*c* in FIGS. 7D-7E because Ann 702 left hand remains stationary and/or does not move (e.g., more than a predetermined distance (e.g., 0.1-0.5 meters)) in FIGS. 7A1-7E.

Similar to Ann's virtual object 716, computer system 714 updates Jane's virtual object 720 to indicate that Jane 706 is moving in FIGS. 7B1-7E. Because Jane's right hand 706*b* and Jane's left hand 706*c* is moving together (e.g., to form a clapping motion and/or clasping gesture), computer system 714 individually distorts Jane's left hand representation 720*c* and Jane's right hand representation 720*b* based on the movement of each of Jane's hands (e.g., Jane's left hand representation 720*c* is distorted, as indicated by left hand trail 720*e*) based on the movement of Jane's left hand 706*c* and Jane's right hand representation 720*b* is distorted (e.g., indicated by right hand trail 720*d*) based on the movement of Jane's right hand 706*b*), using similar techniques as those described above in relation to the distortion of Ann's right hand representation 716*b*. Moreover, computer system 714 also distorts Jane's head representation 720*a* based on the movement of Jane's head 706*a*, using one or more similar techniques to those described above in relation to the distortion of Ann's head representation 716*a*. As illustrated in FIGS. 7B1-7E, computer system 714 updates Tracy's virtual object 718 to indicate that Tracy 704 is moving in FIGS. 7B1-7E. In FIGS. 7B1-7E, Tracy 704 is moving Tracy's right hand 704*c* downward and Tracy's head 704*a* to Tracy's right. As illustrated in FIGS. 7B1-7E, computer system 714 updates Tracy's virtual object 718 without distorting portions of Tracy's virtual object 718 because Tracy's virtual object 718 is being displayed based on the higher fidelity avatar being selected for Tracy 704. At FIGS. 7B1-7E, Tracy's virtual object 718 is moved to mimic the movement, facial expressions, and/or change in features of Tracy 704 while Tracy 704 is moving. Thus, in some embodiments, computer system 714 updates portions of a virtual object in different ways when a higher fidelity avatar is selected than when a lower fidelity avatar style is selected. In some embodiments, computer system 714 hides (and/or does not display) and displays portions of a virtual object based on whether the higher fidelity avatar or the lower fidelity avatar is selected for a particular user. In some embodiments, and without a change in a first set of determinations with respect to a body part of a user (e.g., whether the user's head and/or hands are moving, stationary, and/or visible for a predetermined period of time, whether the user is inactive and/or active, whether user is talking, and/or whether the user is looking at another user), computer system 714 displays a portion of the virtual object that represents a user's hand (e.g., or a user's eyes and/or a user's facial expression) when the higher fidelity avatar style is selected and does not display the portion of the virtual object that represents a user's hand (e.g., or a user's eyes and/or a user's facial expression) when the lower fidelity avatar style is selected, or vice versa. In some embodiments and without a change in a second set of determinations (e.g., different from the first set of determinations) with respect to a body part of a user (e.g., whether the user's head and/or hands are moving, stationary, and/or visible for a predetermined period of time, whether the user is inactive and/or active, whether user is talking, and/or whether the user is looking at another user), computer system 714 does not display a portion of the virtual object that represents a user's hand (e.g., or a user's eyes and/or a user's facial expression) when the higher fidelity avatar style is selected and displays the portion of the virtual object that represents a user's hand (e.g., or a user's eyes and/or a user's facial expression) when the lower fidelity avatar style is selected, or vice versa. In some embodiments, computer system 714 displays a representation of the eyes of a respective user when a determination is made that the respective user is looking at another user and/or is talking. In some embodiments, computer system 714 ceases display of the representation of the eyes of the respective user when a determination is made that the respective user is not looking at another user and/or is not talking. At FIG. 7D, Ann 702 begins to talk (e.g., as indicated by speech bubble 760a ("GOOD JOB, JANE!")).

As illustrated in FIG. 7E, in response to detecting that Jane 706 is talking, computer system 714 changes the color of Ann's virtual object 716 to indicate that Ann 702 is talking (or has talked). In some embodiments, in response to detecting that Ann 702 is talking, computer system 714 updates Ann's virtual object 716 to include a representation of a set of eyes. In some embodiments, in response to detecting that Ann 702 is talking and/or in response to detecting that Jane 706 is not talking, computer system 714 updates Jane's virtual object 720, such that Jane's virtual object 720 does not include a representation of a set of eyes (or the representation of the set of eyes are deemphasized (e.g., greyed-out, not bolded, and/or decreased in size)). In some embodiments, in response to detecting that Ann 702 is talking and/or in response to detecting that Tracy 704 is not talking, computer system 714 continues to display Tracy's virtual object 718 with a representation of a set of eyes (e.g., because Tracy's virtual object 718 is being displayed based on the higher fidelity avatar style being selected). At FIG. 7E, Ann 702 makes hand gesture 750e1 (e.g., one or more air gestures as described above), Tracy 704 makes hand gesture 750e2 (e.g., one or more air gestures as described above), and Jane 706 makes hand gesture 750e3 (e.g., one or more air gestures as described above).

Figure 7F:
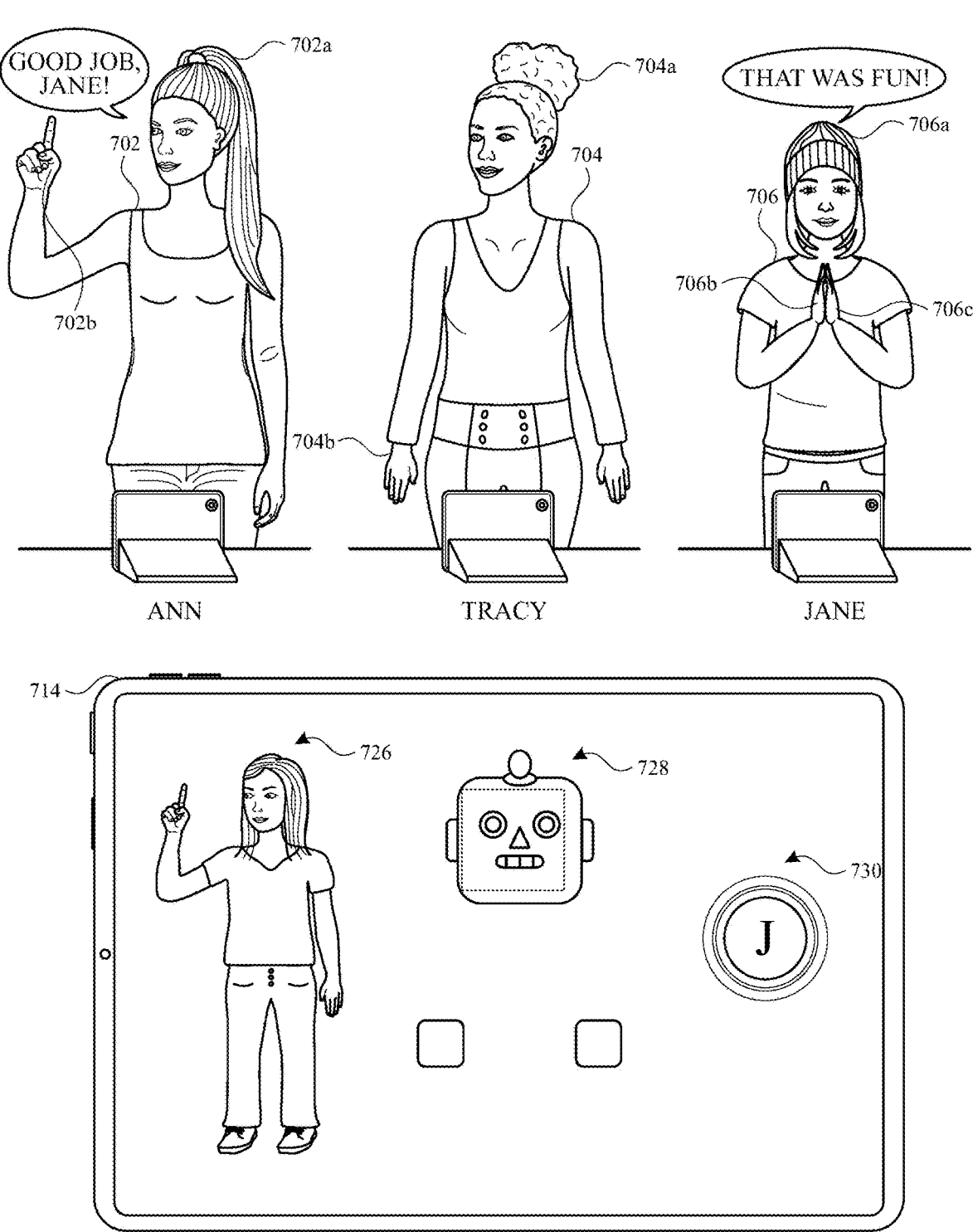

As illustrated in FIG. 7F, in response to detecting that Ann 702 made hand gesture 750e1 and/or in response to detecting a request (e.g., via changing a user-configurable setting through other means than providing a hand gesture, such as via a mouse click and/or a physical touch on a computer system) to display a representation of Ann 702 using the higher fidelity avatar style, computer system 714 replaces Ann's virtual object 716 with Ann's virtual object 726.

Ann's virtual object 726 is displayed based on the higher fidelity avatar style. As illustrated in FIG. 7F, in response to detecting that Tracy 704 made hand gesture 750e2 and/or in response to detecting a request to display a representation of Tracy 704 using the lower fidelity avatar style, computer system 714 replaces Tracy's virtual object 718 with Tracy's virtual object 728. Tracy's virtual object 728 is displayed based on the lower fidelity avatar style. As illustrated in FIG. 7F, in response to detecting that Jane 706 made hand gesture 750e3 and/or in response to detecting a request to display a representation of Jane 706 using an audio avatar style, computer system 714 replaces Jane's virtual object 720 with Jane's virtual object 730. Jane's virtual object 730 is displayed using the audio avatar style. As illustrated in FIG. 7F, Jane's virtual object 730 does not include a portion that represents a particular body part of Jane 706 because the audio avatar style has been selected for Jane 706. In some embodiments, the position of Jane's virtual object 730 represents the position of the body and/or torso of Jane 706 without indicating the physical features of Jane 706. Looking back at FIG. 7E, Jane 706 begins to talk (e.g., as indicated by speech bubble 760b ("THAT WAS FUN!")). As illustrated in FIG. 7F, Jane's virtual object 730 includes an audio indicator, which changes (e.g., changes size, changes color, and/or adds or removes one or more of rings to the audio indicator) to reflect the variations the voice of Jane 706 (e.g., variations in volume level, intensity, softness, loudness, and/or tone) while Jane 706 is talking.

FIG. 8 is a flow diagram of an exemplary method 800 for displaying one or more representations of one or more users in accordance with some embodiments. In some embodiments, method 800 is performed at a computer system (e.g., 101, X700, 708, X708, 710, X710, 712, X712, and/or 714) (e.g., a smartphone, a desktop computer, a laptop, a tablet, a smart watch, a heads-up display unit, a head-mounted display unit, an optical head-mounted display unit, a head mounted augmented reality and/or extended reality device, and/or a wearable device) that is in communication with a display generation component (e.g., 120 and/or X702) (e.g., a display controller, a touch-sensitive display system, and/or a head mounted display system). In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system displays (802), via the display generation component, a representation (e.g., 716, 718, and/or 720) (e.g., an avatar or a stylized avatar) of a user (e.g., 702, 704, and/or 706) (e.g., a user of the computer system; a user of an external computer system who is in a communication session (e.g., a video conference and/or a virtual conference) with the user of the computer system) that includes a first representation portion (e.g., 716a-716c, 718a, 718c, 718d, and/or 720a-720c) (e.g., a shape and/or a representation of an appendage, a head, and/or a body of the user) (e.g., a first portion of the representation and/or a first one or more portions of the representation) and a second representation portion (e.g., 716a-716c, 718a, 718c, 718d, and/or 720a-720c) (e.g., a shape and/or a representation of an appendage, a head, and/or a body of the user) (e.g., a second portion of the representation and/or a second one or more portions of the representation). The first representation portion (e.g., 716a-716c, 718a, 718c, 718d, and/or 720a-720c) represents a first user portion (e.g., 702a-702c, 704a-

704*f*, and/or 706*a*-706*c*) (e.g., an appendage (e.g., a hand), a head, and/or a body) of the user (e.g., represents a position, location, orientation, and/or spatial geometry of the first user portion (e.g., a first user portion and/or a first one or more portions of the user)) and the second representation portion (e.g., 716*a*-716*c*, 718*a*, 718*c*, 718*d*, and/or 720*a*-720*c*) represents a second user portion (e.g., 702*a*-702*c*, 704*a*-704*f*, and/or 706*a*-706*c*) (e.g., an appendage, a head, and/or a body) of the user (e.g., represents a position, location, orientation, and/or spatial geometry of position and/or location of the second user portion (e.g., a second user portion and/or a second one or more portions of the user)) (e.g., where the first user portion is different from the second user portion). In some embodiments, the representation indicates and/or represents a relative position of different portions of the user to each other and movement of the different portions relative to each other. In some embodiments, the first representation portion is separate from the second representation portion. In some embodiments, the first representation portion is not connected to (e.g., indirectly via one or more other representation portion and/or directly) each other. In some embodiments, the first representation portion is different from the second representation portion.

While displaying the first representation portion (e.g., 716*a*-716*c*, 718*a*, 718*c*, 718*d*, and/or 720*a*-720*c*) with a first spatial geometry (e.g., with a first visual geometry and/or first shape/appearance), the computer system receives (804) (e.g., detecting, obtaining, and/or acquiring) an indication (e.g., data received from an external computer system associated with the user and/or data detected by one or more sensors (e.g., cameras) in communication with the computer system) of movement (e.g., lateral movement) of the first user portion (e.g., 702*a*-702*c*, 704*a*-704*f*, and/or 706*a*-706*c*) (e.g., via one or more cameras that are in communication with the computer system and/or obtaining (e.g., receiving and/or acquiring) information concerning the user (e.g., from another computer system)).

In response to (806) receiving the indication of movement of the first user portion (e.g., 702*a*-702*c*, 704*a*-704*f*, and/or 706*a*-706*c*) (e.g., relative to the second user portion) (and, in some embodiments, without receiving an indication of movement of the second user portion), the computer system moves (808) the first representation portion (e.g., 716*a*-716*c*, 718*a*, 718*c*, 718*d*, and/or 720*a*-720*c*) relative to the second representation portion (e.g., 716*a*-716*c*, 718*a*, 718*c*, 718*d*, and/or 720*a*-720*c*) (and, in some embodiments, while moving the second representation portion; and in other embodiments, without moving the second representation portion).

In response to (806) receiving the indication of movement of the first user portion (e.g., 702*a*-702*c*, 704*a*-704*f*, and/or 706*a*-706*c*) (e.g., relative to the second user portion) (and, in some embodiments, without receiving an indication of movement of the second user portion), the computer system, while moving the first representation portion relative to the second representation portion, spatially distorts (810) (e.g., stretching and/or visually distorting) the first spatial geometry of the first representation portion into a second spatial geometry (e.g., with a second visual geometry and/or first shape/appearance) (and, in some embodiments, the second spatial geometry is an elongated version of the first spatial geometry) that is different from the first spatial geometry. The spatial distortion of the first representation portion is based on an amount (e.g., distance and/or speed) of movement (e.g., and/or direction of movement) of the first user portion (e.g., 702*a*-702*c*, 704*a*-704*f*, and/or 706*a*-706*c*) through a physical space (e.g., a physical environment and/or the physical world) (e.g., instead of or in addition to being based on movement of different portions of the first user portion relative to each other) (e.g., relative to the first portion of the representation before moving the first portion of the representation). In some embodiments, while displaying the representation of the user, the computer system detects movement of the second user portion (e.g., relative to the first user portion). In some embodiments, in response to detecting movement of the second user portion, the computer system moves the second representation portion relative to the first representation portion (e.g., with or without moving the first representation portion), and while moving the second portion of the representation relative to the second portion of the representation, spatially distorts the second representation portion. Spatially distorting the first spatial geometry of the first representation portion into the second spatial geometry, where the spatial distortion of the first representation is based on the amount of movement of the first user portion through the physical space, in response to receiving the indication of movement of the first user portion provides visual feedback to participants in the communication session that a user is moving, provides an indication of movement and/or the body language of a user without incurring additional processing and/or network bandwidth costs of generating/transmitting a realistic (e.g., photo realistic and/or a representation that looks like the first participant) or near realistic avatar between devices, and reduces the number of inputs needed for a user to manually cause the computer system to update the first spatial geometry of the first representation portion into the second spatial geometry, which provides improved visual feedback to the user and reduces the number of inputs needed to perform an operation.

In some embodiments, spatially distorting the first spatial geometry of the first representation portion (e.g., 716*a*-716*c* and/or 720*a*-720*c*) into the second spatial geometry includes: in accordance with a determination that the indication of movement of the first user portion (e.g., 702*a*-702*c*, 704*a*-704*f*, and/or 706*a*-706*c*) indicates that the first user portion has moved a first amount (e.g., in one or more directions (e.g., x, y, and/or z direction) and/or with one or more speeds, velocities, and/or accelerations), displaying, via the display generation component, the first representation portion (e.g., 716*a*-716*c* and/or 720*a*-720*c*) with a first spatial distortion (e.g., a first amount of spatial distortion) (e.g., after and/or while moving the first representation portion and/or without displaying the first representation portion with the second spatial distortion); and in accordance with a determination that the indication of movement of the first user portion indicates that the first user portion has moved a second amount (e.g., in one or more directions (e.g., x, y, and/or z direction) and/or with one or more speeds, velocities, and/or accelerations) that is different from the first amount, displaying, via the display generation component, the first representation portion (e.g., 716*a*-716*c* and/or 720*a*-720*c*) with a second spatial distortion (e.g., a second amount of spatial distortion that is different from the first amount of spatial distortion) that is different from the first spatial distortion (e.g., after and/or while moving the first representation portion and/or without displaying the first representation portion with the first spatial distortion). In some embodiments, displaying the first representation portion with the first spatial distortion includes stretching, elongating, expanding, shrinking, and/or compressing the first representation portion by the respective amount (e.g., that is based on the amount and/or detected amount that the first user portion is moved). In some embodiments, displaying the first representation portion with the second spatial distortion includes stretching, elongating, expanding, shrinking, and/or compressing the first representation portion in by an amount that is more or less than the respective amount (e.g., that is based on the amount and/or detected amount that the first user portion is moved). In some embodiments, the first representation portion is stretched, elongated, expanded, shrunk, and/or compressed in the x, y, and/or z direction (e.g., horizontally, virtually, and/or inward/outward with respect to the display generation component) by an amount. Spatially distorting the first spatial geometry of the first representation portion into the second spatial geometry differently based on the amount that the first user portion moves provides visual feedback to participants in the communication session that a user is moving by a particular amount and reduces the number of inputs needed for a user to manually cause the computer system to update the first spatial geometry of the first representation portion into the second spatial geometry, which provides improved visual feedback to the user, provides an updated indication of movement and/or the body language of a user without incurring additional processing and/or network bandwidth costs of generating/transmitting an updated realistic (e.g., photo realistic and/or a representation that looks like the first participant) or near realistic avatar between devices, and reduces the number of inputs needed to perform an operation.

In some embodiments, spatially distorting the first spatial geometry of the first representation portion into the second spatial geometry includes: in accordance with a determination that the indication of movement of the first user portion (e.g., 702a-702c, 704a-704f, and/or 706a-706c) indicates that the first user portion has moved in a first direction (e.g., in the x, y, and/or z directions and/or in the North, South, East, West, or any combination thereof directions), displaying, via the display generation component, the first representation portion (e.g., 716a-716c and/or 720a-720c) with a third spatial distortion (e.g., a first amount of spatial distortion and/or a spatial distortion that is in a first direction of spatial distortion and/or without displaying the first representation portion with the fourth spatial distortion); and in accordance with a determination that the indication of movement of the first user portion indicates that the first user portion has moved in a second direction (e.g., in the x, y, and/or z directions and/or in the North, South, East, West, or any combination thereof directions) that is different from the first direction, displaying, via the display generation component, the first representation portion with a fourth spatial distortion (e.g., a second amount of spatial distortion that is different from the first amount of spatial distortion and/or a spatial distortion that is in a second direction of spatial distortion that is different from the first direction of spatial distortion) that is different from the third spatial distortion (e.g., without displaying the first representation portion with the third spatial distortion). In some embodiments, the first representation portion with the fourth spatial distortion distorts in the same direction as (or, in some embodiments, the opposite of) the second direction. In some embodiments, the second direction is opposite of the first direction. In some embodiments, displaying the first representation portion with the first spatial distortion includes stretching, elongating, expanding, shrinking, and/or compressing the first representation portion in a respective direction (e.g., that is based on the direction and/or detected direction that the first user portion is moved). In some embodiments, displaying the first representation portion with the second spatial distortion includes stretching, elongating, expanding, shrinking, and/or compressing the first representation portion in a direction (e.g., that is based on the direction and/or detected direction that the first user portion is moved) that is different from the first direction. In some embodiments, the first representation portion is stretched, elongated, expanded, shrunk, and/or compressed in the x, y, and/or z direction (e.g., horizontally, virtually, and/or inward/outward with respect to the display generation component). In some embodiments, the first representation portion with the third spatial distortion distorts in the same direction as (or, in some embodiments, the opposite of) the first direction. Spatially distorting the first spatial geometry of the first representation portion into the second spatial geometry differently based on the direction that the first user portion moves provides visual feedback to participants in the communication session that a user is moving in a particular direction and reduces the number of inputs needed for a user to manually cause the computer system to update the first spatial geometry of the first representation portion into the second spatial geometry, which provides improved visual feedback to the user, provides an updated indication of movement and/or the body language of a user without incurring additional processing and/or network bandwidth costs of generating/transmitting an updated realistic (e.g., photo realistic and/or a representation that looks like the first participant) or near realistic avatar between devices, and reduces the number of inputs needed to perform an operation.

In some embodiments, while displaying the second representation portion with a third spatial geometry, the computer system receives an indication of movement of the second user portion (e.g., 702a-702c, 704a-704f, and/or 706a-706c). In some embodiments, the third spatial geometry is different from the first spatial geometry and/or the second spatial geometry. In some embodiments, in response to receiving the indication of movement of the second user portion: the computer system moves the second representation portion relative to the first representation portion (e.g., 716a-716c and/or 720a-720c) (e.g., with or without moving the first representation portion); and while moving the second representation portion relative to the first representation portion (e.g., 716a-716c and/or 720a-720c), the computer system spatially distorts the third spatial geometry of the second representation portion into a fourth spatial geometry that is different from the third spatial geometry. In some embodiments, the spatial distortion of the second representation portion is based on an amount of movement of the second user portion through the physical space. In some embodiments, in response to receiving an indication of movement of the first user portion and the second user portion, the computer system spatially distorts and moves the first user portion and the second user portion (e.g., concurrently or at different times). In some embodiments, in response to receiving an indication of movement of the first user portion and the second user portion, the computer system applies different spatial distortions to the first user portion and the second user portion (in other words, the first user portion and the second user portion are spatially distorted concurrently and differently, in some embodiments). Spatially distorting the third spatial geometry of the second representation portion into a fourth spatial geometry that is different from the third spatial geometry, where the spatial distortion of the first representation is based on the amount of movement of the second user portion through the physical space, in response to receiving the indication of movement of the second user portion provides visual feedback to participants in the communication session that a user is moving and reduces the number of inputs needed for a user to manually cause the computer system to update the representation of the user, which provides improved visual feedback to the user, provides an indication of movement and/or the body language of a user without incurring additional processing and/or network bandwidth costs of generating/transmitting an realistic (e.g., photo realistic and/or a representation that looks like the first participant) or near realistic avatar between devices, and reduces the number of inputs needed to perform an operation.

In some embodiments, the spatial distortion of the second representation portion (e.g., 716a-716c and/or 720a-720c) is different from (e.g., in a different direction and/or by a different amount and/or distance) the spatial distortion of the first representation portion. Spatially distorting the second representation portion different from spatially distorting the first representation portion provides visual feedback to participants in the communication session that a user is moving different body parts differently and reduces the number of inputs needed for a user to manually cause the computer system to update the representation of the user, which provides improved visual feedback to the user, provides indications of movement and/or the body language of multiple users without incurring additional processing and/or network bandwidth costs of generating/transmitting realistic or near realistic avatars between devices, and reduces the number of inputs needed to perform an operation.

In some embodiments, in response to receiving the indication of movement of the first user portion (e.g., 702a-702c, 704a-704f, and/or 706a-706c) (and and/or after receiving an indication of movement of the second user portion) and while moving the first representation portion (e.g., 716a-716c and/or 720a-720c) relative to the second representation portion, the computer system continues, via the display generation component, to display the second representation portion with a spatial geometry that has the same spatial distortion that the second representation portion (e.g., 716a-716c and/or 720a-720c) had before the indication of movement of the first user portion was received (and, in some embodiments, without moving the second representation portion). Continuing to display the second representation portion with a spatial geometry that has the same spatial distortion that the second representation portion had before the indication of movement of the first user portion was received in response to receiving the indication of movement of the first user portion and while moving the first representation portion relative to the second representation portion provides visual feedback to participants about which body parts of a user are moving versus which body parts of the user are not moving and reduces the number of inputs needed for the user to manually cause the computer system to update the representation of the user, which provides improved visual feedback to the user, provides an indication of movement and/or the body language of a user without incurring additional processing and/or network bandwidth costs of generating/transmitting an realistic (e.g., photo realistic and/or a representation that looks like the first participant) or near realistic avatar between devices, and reduces the number of inputs needed to perform an operation.

In some embodiments, the first user portion (e.g., 702a-702c, 704a-704f, and/or 706a-706c) has a first level of detail (e.g., details concerning the physical features (e.g., facial features and/or hand features) of a user and/or the physical appearance of the user, such as one or more portions of the user's face, hands, fingers, and/or body). In some embodiments, displaying the representation (e.g., 716, 718, and/or

720) that includes the first representation portion (e.g., 716a-716c and/or 720a-720c) and the second representation portion (e.g., 716a-716c and/or 720a-720c) includes: displaying, via the display generation component, the first representation portion with a second level of detail (e.g., as described in relation to the second level of detail in method 900) that is lower than (e.g., is less exact to and/or less visually representative of the actual features and/or appearance of the user) the first level of detail (and/or the first representation portion does not include and/or excludes one or more features (e.g., hand features (e.g., fingers, hand markings, fingernails, and/or shape of hands) and facial features (e.g., nose, mouth, ears, eyes, and/or facial hair) of the first user portion). In some embodiments, the second user portion has a third amount of detail. In some embodiments, as a part of displaying the representation that includes the first representation portion and the second representation portion includes, the computer system displays the second representation portion with a fourth amount of detail that is lower than the third amount of detail. Displaying the first representation portion with the second level of detail that is lower than the first level of detail allows the computer system to display a representation of the user that has less details than another representation of the user, which can provide increased security for a user.

In some embodiments, in accordance with a determination that the first user portion (e.g., 702a-702c, 704a-704f, and/or 706a-706c) is a first size (e.g., a size (e.g., head size (e.g., circumference and/or diameter of head), hand size, palm size, finger size and/or length) of the user's head and/or hands), the first representation portion (e.g., 716a-716c and/or 720a-720c) is (e.g., is displayed at and/or is presented at) a second size (and, in some embodiments, the second size is relative to a display area of display generation component). In some embodiments, in accordance with a determination that the first user portion is a third size (e.g., a size (e.g., head size (e.g., circumference and/or diameter of head), hand size, palm size, finger size and/or length) of the user's head and/or hands) that is different from the first size, the first representation portion is (e.g., is displayed at and/or is presented at) a fourth size (and, in some embodiments, the fourth size is relative to a display area of display generation component) that is different from the second size. In some embodiments, in accordance with a determination that the second user portion is a fifth size, the second representation portion is a sixth size; and in accordance with a determination that the second user portion is a seventh size that is different from the fifth size, the second representation portion is an eighth size that is different from the sixth size. Displaying the first representation portion at a size that is based on the size of a user portion allows the computer system to automatically display a representation of the user at a size that is relevant to the size of the user, which provides visual feedback, provides an indication of movement and/or the body language of a user without incurring additional processing and/or network bandwidth costs of generating/transmitting an realistic (e.g., photo realistic and/or a representation that looks like the first participant) or near realistic avatar between devices, and performs an operation when a set of (e.g., one or more) conditions has been met without requiring further user input.

In some embodiments, before receiving the indication of movement of the first user portion (e.g., 702a-702c, 704a-704f, and/or 706a-706c), the first representation portion (e.g., 716a-716c and/or 720a-720c) is displayed with a first level of brightness (e.g., as measured in lumens and/or lux). In some embodiments, in response to receiving the indication of movement of the first user portion: in accordance with a determination that the indication of movement of the first user portion includes a rotation of a head (e.g., 702*a*, 704*a*, and/or 706*a*) (or, in some embodiments, hand) of the user (and the first user portion is the head (or, in some embodiments, hand) of the user), the computer system displays, via the display generation component, the first representation portion (e.g., and/or at least a subset (e.g., a middle area) of the first representation portion) with a second level of brightness that is different from (e.g., higher than or lower than) the first level of brightness (e.g., without displaying the second representation portion with the second level of brightness and/or without changing the level of brightness at which the second representation portion is displayed). In some embodiments, in accordance with a determination that the indication of movement of the first user portion does not include the rotation of a head of the user (and the first user portion is the head of the user), the computer system continues to display the first representation portion (e.g., and/or at least a subset (e.g., a middle area) of the first representation portion) with the first level of brightness and does not display the second representation portion with the second level of brightness. In some embodiments, the brightness of a representation portion is directly and/or indirectly proportional to the amount of movement that the user portion that corresponds to the representation portion moves. Displaying the first representation portion with a second level of brightness that is different from the first level of brightness in accordance with a determination that the indication of movement of the first user portion includes a rotation of a head allows the computer system to automatically display the representation with a different level of brightness and to provide visual feedback to the user that the head of a user has been rotated, which provides visual feedback, provides an indication of movement and/or the body language of a user without incurring additional processing and/or network bandwidth costs of generating/transmitting an realistic (e.g., photo realistic and/or a representation that looks like the first participant) or near realistic avatar between devices, and performs an operation when a set of conditions has been met without requiring further user input.

In some embodiments, before receiving the indication of movement of the first user portion (e.g., 702*a*-702*c*, 704*a*-704*f*, and/or 706*a*-706*c*), the first representation portion (e.g., 716*a*-716*c* and/or 720*a*-720*c*) has a first shape. In some embodiments, in response to receiving the indication of movement of the first user portion and in accordance with a determination that the indication of movement of the first user portion includes a rotation of a hand (e.g., 702*b*, 702*c*, 704*b*, and/or 704*c*) (or, in some embodiments, head) of the user (and the first user portion is the hand (or, in some embodiments, head) of the user), the computer system displays, via the display generation component, the first representation portion having a second shape that is different from the first shape (e.g., changing and/or adjusting the shape of the first representation portion from having the first shape to having the second shape) (e.g., without changing the shape of a representation portion that does not correspond to the hand). In some embodiments, in accordance with a determination that the indication of movement of the first user portion does not include the rotation of the hand of the user (and the first user portion is the hand of the user), the computer system does not display, via the display generation component, the first representation portion as having the second shape and, in some embodiments, continues to display the first representation portion as having the first shape. Displaying the first representation portion having a second shape that is different from the first shape in accordance with a determination that the indication of movement of the first user portion includes a rotation of a hand of the user allows the computer system to automatically display the representation with a different shape and to provide visual feedback to the user that the hand of a user has been rotated, which provides visual feedback, provides an indication of movement and/or the body language of a user without incurring additional processing and/or network bandwidth costs of generating/transmitting an realistic (e.g., photo realistic and/or a representation that looks like the first participant) or near realistic avatar between devices, and performs an operation when a set of conditions has been met without requiring further user input.

In some embodiments, the first representation portion includes a first area (e.g., an area that represents the eyes, eyelids, and/or eyebrows of the user). In some embodiments, before receiving the indication of movement of the first user portion (e.g., 702*a*-702*c*, 704*a*-704*f*, and/or 706*a*-706*c*), the first area is displayed at a first position on the first representation portion. In some embodiments, in response to receiving the indication of movement of the first user portion and in accordance with a determination that the indication of movement of the first user portion includes a rotation of a head (e.g., 702*a*, 704*a*, and/or 706*a*) (or, in some embodiments, hand) of the user (and the first user portion is the head (or, in some embodiments, hand) of the user), the computer system displays, via the display generation component, the first area (e.g., inside of 722) at a second position on the first representation portion that is different from the first position on the first representation portion (e.g., moving the first area from the first position to the second position on the first representation). In some embodiments, the first representation portion surrounds the first area and/or the first area within the first representation portion. In some embodiments, as a part of displaying, via the display generation component, the first area at a second position on the first representation portion, the computer system moves the first area from the first position on the first representation portion to the second position on the first representation portion. Displaying the first area at a second position on the first representation portion that is different from the first position on the first representation portion in accordance with a determination that the indication of movement of the first user portion includes a rotation of a head of the user allows the computer system to automatically display the representation with the first area at a different position and to provide visual feedback to the user that the head of a user has been rotated, which provides visual feedback, provides an indication of movement and/or the body language of a user without incurring additional processing and/or network bandwidth costs of generating/transmitting an realistic (e.g., photo realistic and/or a representation that looks like the first participant) or near realistic avatar between devices, and performs an operation when a set of conditions has been met without requiring further user input.

In some embodiments, at least one of the first representation portion (e.g., 716*a*-716*c* and/or 720*a*-720*c*) and the second representation portion (e.g., 716*a*-716*c* and/or 720*a*-720*c*) is a three-dimensional representation (e.g., a three-dimensional virtual object and/or user interface element).

In some embodiments, at least one of the first representation portion (e.g., 716*a*-716*c* and/or 720*a*-720*c*) and the second representation portion (e.g., 716*a*-716*c* and/or 720*a*-720*c*) is a two-dimensional representation (e.g., a three-dimensional virtual object and/or user interface element). In some embodiments, the two-dimensional representation is moved and/or distorted in three-dimensional space and/or physical space.

In some embodiments, at least one of the first representation portion (e.g., 716a-716c and/or 720a-720c) and the second representation portion (e.g., 716a-716c and/or 720c) includes one or more areas (e.g., one or more subsets of the first representation portion and/or the second representation portion). In some embodiments, displaying at least one of the first representation portion and the second representation portions includes applying one or more simulated light effects (e.g., displaying a representation portion such that a computer generated lighting effect is applied, where the representation portion appears as though light is being reflected off of (and/or emitted from the representation portion) the representation portion to mimic light being reflected off (and/or emitted from) of physical objects in the physical space to the one or more areas) to the one or more areas (e.g., as described above in relation to FIGS. 7A1 and/or 7A2). In some embodiments, the one or more areas are located within at least one of the first representation portion and the second representation portion. In some embodiments, the one or more area represents a set of (e.g., one or more) eyes, a palm, and/or a face of the user. Displaying at least one of the first representation portion and the second representation portions includes applying one or more simulated light effects provides visual feedback to the user concerning movement of the user, which provides visual feedback.

In some embodiments, the one or more simulated light effects are a simulation (e.g., computer and/or device simulated and/or programmatically generated and/or simulated) of light emitted onto an object (e.g., the first representation portion and/or the second representation portion) (e.g., a virtual object and/or a physical and/or real object) in three-dimensional space (e.g., as described above in relation to FIGS. 7A1 and/or 7A2).

In some embodiments, at least one of the first representation portion and the second representation portion includes a first visual property (e.g., color, brightness, and/or blur) that changes (e.g., varies, updates, and/or is modified) based on movement (e.g., and/or direction of movement) of the user (e.g., through the physical space and/or environment). In some embodiments, a visual property of the first representation portion varies based on movement of the first user portion (and, in some embodiments, does not vary based on movement of the second user portion), and a visual property of the second representation portion varies based on movement of the second user portion (and, in some embodiments, does not vary based on movement of the first user portion). Displaying at least the first representation portion and the second representation portion that includes a first visual property that changes based on movement of the user provides visual feedback concerning the movement of the user, which provides improved visual feedback to the user.

In some embodiments, in response to receiving the indication of movement of the first user portion (e.g., 702a-702c, 704a-704f, and/or 706a-706c), the computer system: in accordance with a determination that the first user portion corresponds to a head of the user, visually changes (e.g., an appearance of and/or a visual property of) the first representation portion (e.g., 716a-716c and/or 720a-720c) in a first manner (e.g., with a first type of distortion, with a first type of movement, with a first amount of blur, with a first amount of color, and/or with a first amount of brightness); and in accordance with a determination that the first user portion corresponds to a hand of the user, visually changes (e.g., the appearance of and/or the visual property of) the first representation portion (e.g., 716a-716c and/or 720a-720c) in a second manner (e.g., with a second type of distortion, with a second type of movement, with a second amount of blur, with a second amount of color, and/or with a second amount of brightness) that is different from the first manner. In some embodiments, in accordance with a determination that the first user portion corresponds to a head of the user, the computer system changes one visual property of the first representation portion; and in accordance with a determination that the first user portion corresponds to a hand of the user, the computer system changes a different visual property of the first representation portion. In some embodiments, in accordance with a determination that the first user portion corresponds to a head of the user, the computer system changes a respective visual property of the first representation portion; and in accordance with a determination that the first user portion corresponds to a hand of the user, the computer system changes the respective visual property of the first representation portion in a different way and/or manner than the respective property would have been changed in accordance with a determination that the first user portion corresponds to a head of the user. In some embodiments, in response to receiving the indication of movement of the first user portion, the computer system does not change a visual property of the second representation portion. Visually changing the first representation portion in different matters based on the type of body part to which the first representation portion corresponds provides the user with feedback concerning which body part that the user is moving and to automatically indicate the movement of a particular body part in a different manner, which provides visual feedback, provides indications of movement and/or the body language of a user without incurring additional processing and/or network bandwidth costs of generating/transmitting realistic (e.g., photo realistic and/or a representation that looks like the first participant) or near realistic avatars between devices, and performs an operation when a set of conditions has been met without requiring further user input.

In some embodiments, at least one of the first representation portion (e.g., 716a-716c and/or 720a-720c) and the second representation portion (e.g., 716a-716c and/or 720a-720c) includes a second visual property (e.g., color, brightness, and/or blur) that changes (e.g., varies, updates, and/or is modified) based on detected audio (e.g., audio detected via one or more microphones that is in communication with the computer system) (e.g., and/or direction of movement) from the user. In some embodiments, in response to detecting audio from the user: in accordance with a determination that the audio is a first audio, the second visual property changes in a third manner; and in accordance with a determination that the audio is second audio that is different from first audio, the second visual property changes in a fourth manner that is different from the third manner (e.g., based on the level (e.g., volume level and/or intensity level), amount, duration, and/or type of audio). Displaying at least the first representation portion and the second representation portion that includes a second visual property that changes based on audio of the user provides visual feedback concerning the audio of the user, which provides improved visual feedback to the user.

In some embodiments, spatially distorting the first spatial geometry of the first representation portion (e.g., 716a-716c and/or 720a-720c) into the second spatial geometry includes changing a shape of at least a subset (e.g., a portion or all) of the first representation portion.

In some embodiments, the representation (e.g., 716 and/or 720) of the user includes a representation of a head (e.g., 702*a* and/or 706*a*) of the user and one or more representations (e.g., 716*b*, 716*c*, 720*b*, and/or 720*c*) of one or more hands (e.g., 702*b*, 702*c*, 706*b*, and/or 706*c*) of the user. In some embodiments, the representation of the head of the user and (e.g., via a representation of a body, a neck, and/or arms) the one or more representations of the one or more hands of the user are not connected to (e.g., directly and/or indirectly via one or more other portions of the representation of the user, separated from each other) each other. In some embodiments, the representation of the head of the user is floating in space and the representation of the one or more hands of the user is floating in space. In some embodiments, the first representation portion is the representation of the head of the user or the representation of one or more hands of the user. In some embodiments, the second representation portion is the representation of the head of the user or the representation of one or more hands of the user. Displaying the representation of the user that includes a representation of the head of the user and one or more representations of the one or more hands of the user, where the representation of the head of the user and the one or more representations of the one or more hands of the user are not connected to each other, reduces additional processing and/or network bandwidth costs of generating/transmitting realistic (e.g., photo realistic and/or a representation that looks like the first participant) or near realistic avatars between devices, including the realistic portions of a user that connect the hands to the head of the user (e.g., shoulders, neck, and/or arms).

In some embodiments, the representation of the user includes a third representation portion (e.g., first representation portion and/or the second representation portion) that represents a third user portion (e.g., 702*a*-702*c*, 704*a*-704*f*, and/or 706*a*-706*c*) (e.g., the first user portion and/or the second user portion) of the user. In some embodiments, displaying the representation of the user includes: in accordance with a determination that a set of (e.g., one or more) communication criteria is satisfied, where the set of communication criteria includes a criterion that is satisfied when a determination is made that the third representation portion is relevant to communication of the user (and/or that the user is communicating and/or has been communicating for a predetermined period of time (e.g., 1-10 seconds)), displaying, via the display generation component, the third representation portion (e.g., as a part of the representation of the user) with a respective visual appearance (e.g., an emphasized (e.g., bolded, non-translucent (or with less translucence than a de-emphasized visual appearance), and/or with a certain color) visual appearance); and in accordance with a determination that a set of (e.g., one or more) communication criteria is not satisfied, displaying the representation of the user without displaying the third representation portion with the respective visual appearance (and/or, in some embodiments, ceasing display of the third representation portion, forging display of the third representation portion, and/or de-emphasizing the representation portion). Choosing to display or not display the third representation portion with a respective visual appearance based on the set of communication criteria being satisfied allows the computer system to automatically display the third representation portion when a determination is made that the third representation portion is relevant to communication of the user, which performs an operation when a set of conditions has been met without requiring further user input, increases and/or preserves privacy while enabling a sense of the third representation portion gaze during times when the third representation portion is not relevant to communication of the user, and/or reduces additional processing, displaying, and/or network bandwidth costs of generating/transmitting the indication of the third representation portion when the third representation portion is not relevant to communication of the user.

In some embodiments, the third user portion is a set of (e.g., one or more) eyes of the user. In some embodiments, determining that the third representation portion is relevant to communication of the user includes determining that the user is looking at (e.g., currently looking at and/or previously looking at) another user (and/or a representation of the other user). Choosing to display or not display the third representation portion with a respective visual appearance based on the set of communication criteria being satisfied allows the computer system to automatically display the third representation portion when a determination is made that the user is looking at another user, which performs an operation when a set of conditions has been met without requiring further user input, increases and/or preserves privacy while enabling a sense of eye contact by hiding the location of gaze during times when the user is not making eye contact, and/or reduces additional processing, displaying, and/or network bandwidth costs of generating/transmitting the indication of gaze when the user is not looking at another user.

In some embodiments, the third user portion is a hand of the user (or a head of the user). In some embodiments, determining that the third representation portion is relevant to communication of the user includes determining that the hand of the user is moving. Choosing to display or not display the third representation portion with a respective visual appearance based on the set of communication criteria being satisfied allows the computer system to automatically display the third representation portion when a determination is made that the hand of the user is moving, which performs an operation when a set of conditions has been met without requiring further user input, increases and/or preserves privacy while enabling a sense of hand movement by hiding the location of the hands during times when the user is not using the hands to communicate, and/or reduces additional processing, displaying, and/or network bandwidth costs of generating/transmitting the representation of the hands when the user is not using the hands to communicate.

In some embodiments, the second representation portion is displayed with a respective amount of spatial distortion before the indication of movement of the first user portion (e.g., 702*a*-702*c*, 704*a*-704*f*, and/or 706*a*-706*c*) is received and is displayed at a respective position in three-dimensional space (and/or in a three-dimensional environment). In some embodiments, in response to receiving the indication of movement of the first user portion, the computer system continues, via the display generation component, to display the second representation portion with the respective amount of spatial distortion and at the respective position in three-dimensional space (e.g., without moving the second representation portion) (and, in some embodiments, while moving the first representation portion). Spatially distorting the first spatial geometry of the first representation portion into the second spatial geometry while continuing to display the second representation portion with the respective amount of spatial distortion and at the respective position in three-dimensional space in response to receiving the indication of movement of the first user portion provides visual feedback to participants in the communication session that a portion of the user is moving and a portion of the user is not moving and reduces the number of inputs needed for a user to manually cause the computer system to update the first spatial geometry of the first representation portion into the second spatial geometry, which provides improved visual feedback to the user and reduces the number of inputs needed to perform an operation.

In some embodiments, aspects/operations of method 800 may be interchanged, substituted, and/or added between these methods. For example, the representation of the first user discussed in method 900 can be displayed using the techniques of method 800. For brevity, these details are not repeated here.

FIG. 9 is a flow diagram of an exemplary method 900 for displaying one or more representations of one or more users in accordance with some embodiments. In some embodiments, method 900 is performed at a computer system ((e.g., X700, 708, X708, 710, X710, 712, X712, and/or 714) (e.g., a smartphone, a desktop computer, a laptop, a tablet, a smart watch, a heads-up display unit, a head-mounted display unit, an optical head-mounted display unit, a head mounted augmented reality and/or extended reality device, and/or a wearable device) that is in communication with a display generation component (e.g., 120 and/or X702) (e.g., a display controller, a touch-sensitive display system, and/or a head mounted display system). In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

While in a real-time communication session (e.g., a communication session between the participant of the computer system and a participant of a different computer system) (and, in some embodiments, one or more of audio, text, images, video, and/or graphical representations from the participants are exchanged during the real-time communication session), the computer system displays (902), via the display generation component, a representation (e.g., 716, 718, and/or 720) (e.g., an avatar) of a first user (e.g., 702, 704, and/or 706) (e.g., a user of the computer system or a user of an external computer system participating in the communication session with a user of the computer system). In some embodiments, the representation of the first user is displayed on a computer system that does not belong to the first user. In some embodiments, the representation of the first user is displayed based on processing on a computer system of the first user and/or another computer system that is not the claimed computer system and/or the computer system of the first user. In some embodiments, the representation of the first user is displayed on the computer system of the first user.

In accordance with a determination that a first set of (e.g., one or more) criteria is satisfied, where the first set of criteria includes a criterion that is satisfied when a first representation style (e.g., as described in relation to 718 and/or 726) (e.g., an avatar style; an avatar template; and/or an avatar model) (e.g., a style that depicts more features of a user than the second representation style) is selected (e.g., to represent the first user and/or to represent a group of users that includes the first user) (e.g., by the user) (and does not include a criterion that is satisfied when the second representation style is selected), the representation (e.g., 718 and/or 726) of the first user is displayed (904) with a first level of detail (e.g., a first level of detail with respect to the appearance of the user and/or one or more portions of the user) and indicates a position and movement of a first user portion relative to a position and movement of a second user portion in a first manner.

In accordance with a determination that a second set of criteria is satisfied, where the second set of criteria includes a criterion that is satisfied when a second representation style (e.g., as described in relation to 716, 720, and/or 728) (e.g., an avatar style and/or a style that depicts less features of a user than the first representation style) is selected (e.g., to represent the first user and/or a group of users that includes the first user) (e.g., by the user) (and does not include a criterion that is satisfied when the first representation style is selected), and where the second representation style is different from the first representation style (e.g., as described in relation to 718 and/or 726), the representation (e.g., 716, 720, and/or 728) of the first user is displayed (906) with a second level of detail (e.g., a second level of detail with respective to the appearance of the user and/or one or more portions of the user) that is lower than (e.g., less than and/or mimics the appearance of the user with less detail and/or a lower amount of detail) the first level of detail and indicates the position and movement of the first user portion relative to the position and movement of the second user portion in a second manner that is different from the first manner (e.g., as described above in relation to method 800). In some embodiments, the second representation style has a different label than the first representation style. In some embodiments, the second representation style is referred to as an expressive representation. In some embodiments, the first representation style is referred to as an honest representation. Displaying the representation of the first user with different levels of details based on prescribed conditions allows the computer system to display the first representation of the first user with a level of detail that corresponds to a selected representation style, which performs an operation when a set of conditions has been met without requiring further user input and provides increased security for the user.

In some embodiments, while the first representation style (e.g., as described in relation to 718 and/or 726) is selected, the computer system detects an input (e.g., 750e1-750e3) (e.g., an air input and/or gesture, a gaze input, voice input, a physical input (e.g., a tap input, a swipe input, a mouse click, and/or an input on a hardware button), and/or a combination thereof). In some embodiments, in response to detecting the input, the computer system selects the second representation style (e.g., as described in relation to 716, 720, and/or 728) and deselects the first representation style. In some embodiments, while the second representation style is selected, the computer system detects an input; and, in response to detecting the input, the computer system selects the first representation style and deselects the second representation style. Selecting a representation style in response to detecting the input allows the user to choose a particular representation style for the user, which provides the user with more control over the user interface and provided increased security for the user, provides increased privacy associated with a lower fidelity avatar, and/or reduces additional processing and/or network bandwidth costs of generating/transmitting realistic (e.g., photo realistic and/or a representation that looks like the first participant) or near realistic avatars between devices.

In some embodiments, the first set of criteria includes a criterion that is satisfied when a determination is made that the first user (e.g., 702, 704, and/or 706) is a registered user (e.g., is not a guest user (e.g., a fully registered user and/or a user has completed more than a limited enrollment process)), and the second set of criteria includes a criterion that is satisfied when a determination is made that the first user is a guest user (a user that is not a registered user and/or a user that has not completed more than a limited enrollment process) (e.g., as described above in relation to FIG. 7A1). Displaying the representation of the first user with different levels of details based on prescribed conditions allows the computer system to display the first representation of the first user with a level of detail based on whether the first user is known user or not a known user, which performs an operation when a set of conditions has been met without requiring further user input and provides increased security for the user, improves security by not allowing a guest user to impersonate another user, and provides a visual indication to other participants that a user is either a guest user or a registered user.

In some embodiments, the first set of criteria includes a criterion that is satisfied when a determination is made that the first user has completed a user representation (e.g., an avatar and/or a representation of a user) enrollment process, and the second set of criteria includes a criterion that is satisfied when a determination is not made that the first user has completed the user representation enrollment process (e.g., a determination is made that the first user has not completed the user representation enrollment process and/or a determination cannot be made (e.g., due to a user not being enrolled and/or a connection issue or some other reason where the computer system cannot verify whether or not a user has been enrolled) that the user has completed the user representation enrollment process) (e.g., as described above in relation to FIG. 7A1). Displaying the representation of the first user with different levels of details based on prescribed conditions allows the computer system to display the first representation of the first user with a level of detail based on whether the first user has completed a user representation enrollment process or not, which performs an operation when a set of conditions has been met without requiring further user input and provides increased security for the user and allows a user to use a computer system to participate in a communication session without having to complete the enrollment process and/or a customization process before participating in the communication session.

In some embodiments, displaying the representation (e.g., 730) of the first user includes: in accordance with a determination that a third set of (e.g., one or more) criteria is satisfied, where the third set of criteria includes a criterion that is satisfied when a third representation style (e.g., represented by 730) (e.g., an avatar style, a representation of audio, and/or a style that depicts less features of a user than the first representation style) is selected (e.g., to represent the first user and/or a group of users that includes the first user) (e.g., by the user) (and does not include a criterion that is satisfied when the first representation style is selected), and where the third representation style is different from the first representation style (e.g., as described in relation to 718 and/or 726) and the second representation style (e.g., as described in relation to 716, 720, and/or 728), the representation (e.g., 730) of the first user is displayed with a third level of detail (e.g., a second level of detail with respective to the appearance of the user and/or one or more portions of the user) that is lower than (e.g., less than, lower than, and/or mimics the appearance of the user with less detail and/or a lower amount of detail) the second level of detail and the first level of detail. Displaying the representation of the first user with a third level of detail based on prescribed conditions allows the computer system to display the first representation of the first user with a level of detail based on the third representation style being selected, which performs an operation when a set of conditions has been met without requiring further user input and provides increased security for the user.

In some embodiments, the representation (e.g., 730) of the first user displayed with the third level of detail does not indicate the position and/or movement of the first user portion relative to the position and movement of the second user portion (e.g., in any manner, such as the first manner or the second manner) (e.g., irrespective of whether movement and/or a change in position of the first user is detected). Displaying the representation of the first user that does not indicate the position and/or movement of the first user portion relative to the position and movement of the second user portion based on prescribed conditions allows the computer system to display the first representation of the first user with a level of detail based on the third representation style being selected, which performs an operation when a set of conditions has been met without requiring further user input and provides increased security for the user.

In some embodiments, while in the real-time communication session, displaying a representation (e.g., 716 and/or 720) of a second user (e.g., 702, 704, and/or 706) with the second level of detail concurrently with the representation (e.g., 716, 718, and/or 720) of the first user. In some embodiments, the second user is different from the first user. In some embodiments, while displaying the representation (e.g., 716 and/or 720) of the first user with the second level of detail in accordance with a determination that the second set of criteria is satisfied, the representation of the first user displayed with the second level of detail is a first color (e.g., blue, red, yellow, a gradient of colors, a highlighting, and/or an outline color) and the representation (e.g., 716 and/or 720) of the second user displayed with the second level of detail is a second color (e.g., blue, red, yellow, a gradient of colors, a highlighting, and/or an outline color) that is different from the first color. In some embodiments, the representation of the first user displayed with the third level of detail (e.g., an audio representation and/or a representation that does not include one or more portions or any portions of a user) and/or the representation of the first user displayed with the first level of detail includes the first color and/or the second color (and/or, in some embodiments, the first color and/or the second color is selected based on the clothing the user (e.g., actual clothing that the user is currently wearing and/or clothing set for an avatar by the user)). Displaying the representation of the first user with the second level of detail that is a first color and the representation of the second user with the second level of detail that is a second color provides visual feedback to the user that the representation of the first user represents a different user than the representation of the second user, which provides visual feedback.

In some embodiments, the first color corresponds to an annotation associated with (e.g., made by and/or registered as being performed by, added by, created by, and/or generated by) the first user. In some embodiments, the second color corresponds to an annotation associated with (e.g., made by and/or registered as being performed by, added by, created by, and/or generated by) a second user (e.g., 702, 704, and/or 706) (e.g., as described above in relation to FIGS. 7A1-7E). In some embodiments, in accordance with a determination that an annotation (e.g., a mark made with a writing instrument (e.g., a pencil mark and/or a pen mark) in a three-dimensional environment or a collaboration document) (e.g., previously made annotation and/or most recently made annotation by the user) is a third color, the representation of the first user displayed with the second level of detail (and/or first level of detail and/or third level of detail) is the third color; and, in accordance with a determination that the annotation is a fourth color that is different from the third color, the representation of the first user displayed with the second level of detail (and/or first level of detail and/or third level of detail) includes the fourth color. Displaying the representation of the first user with the second level of detail that is a first color that corresponds to an annotation associated with the first user and the representation of the second user displayed the second level of detail that is a second color that corresponds to an annotation associated with a second user provides visual feedback to the user that the representation of the first user represents a different user than the representation of the second user, which provides visual feedback.

In some embodiments, while in the real-time communication session, displaying a representation (e.g., 718) of a third user with the first level of detail concurrently with the representation (e.g., 716, 718, and/or 720) of the first user. In some embodiments, the third user is different from the first user. In some embodiments, while displaying the representation of the first user with the first level of detail in accordance with a determination that the first set of criteria is satisfied, the representation of the first user displayed with the first level of detail includes one or more features (e.g., facial features, hand features, hairstyle, and/or body appearance) that are different from (e.g., instead of color) one or more features (e.g., facial features, hand features, hairstyle, body appearance, hair, eyes, clothes, hair textual, and/or skin color) of the representation of the third user displayed with the first level of detail (e.g., different facial features, hand features, hairstyle, body appearance, hair, eyes, clothes, hair textual, and/or skin color). Displaying the representation of the first user with the first level of detail that has one or more features and the representation of the third user with the first level of detail that has one or more different features provides visual feedback to the user that the representation of the first user represents a different user than the representation of the third user, which provides visual feedback.

In some embodiments, the representation (e.g., 718) of the first user displayed with the first level of detail is displayed with lighting that has a respective visual property (e.g., color, brightness, tint, and/or shading) and the representation (e.g., 716 and/or 720) of the first user displayed with the second level of detail is displayed with the respective visual property (e.g., color, brightness, tint, and/or shading). Displaying the representation of the first user with the first level of detail and lighting that has a respective visual property and displaying the representation of the first user with the second level of detail and lighting that has the same respective visual property provides visual feedback to the user that the representations displayed with the first level of detail and the second level of detail correspond to the same user, which provides improved visual feedback.

In some embodiments, indicating the position and movement of the first user portion (702a-702c, 704a-704f, and/or 706a-706c) relative to the position and movement of the second user portion (702a-702c, 704a-704f, and/or 706a-706c) in the first manner includes changing (e.g., moving, adjusting, and/or highlighting) a first set of (e.g., one or more) portions (e.g., 716a-716c, 718a-718f, and/or 720a-720c) of the representation of the first user, where the first set of the one or more portions represents one or more sub-features (e.g., one or more portions representing a sub-feature (e.g., hand features, facial features, and/or facial expressions)) of the first user (e.g., without changing an outline of the representation of the first user). In some embodiments, indicating the position and movement of the first user portion relative to the position and movement of the second user portion in the second manner includes changing an outline of the representation of the first user (e.g., without changing one or more portions of the representation of the first user that represent one or more sub-feature of the first user). Changing a first set of portions of the representation of the first user as a part of indicating the position and movement of the first user portion relative to the position and movement of the second user portion in the first manner and changing an outline of the representation of the first user as a part of indicating the position and movement of the first user portion relative to the position and movement of the second user portion in the second manner allows the computer system to automatically indicate the movement of user in different ways based on the selected representation style, which performs an operation when a set of conditions has been met without requiring further user input and provides visual feedback.

In some embodiments, indicating the position and movement of the first user portion (702a-702c, 704a-704f, and/or 706a-706c) relative to the position and movement of the second user portion (702a-702c, 704a-704f, and/or 706a-706c) in the first manner includes rotating a second set of (e.g., one or more) portions (e.g., 716a-716c, 718a-718f, and/or 720a-720c) of the representation of the first user. In some embodiments, the second set of portions represents one or more sub-features of the first user. In some embodiments, indicating the position and movement of the first user portion relative to the position and movement of the second user portion in the second manner includes shifting (e.g., changing, moving, and/or reversing) a direction of a first portion of the representation (e.g., 716a-716c, 718a-718f, and/or 720a-720c) of the first user (e.g., shifting a color and/or a color gradient). Rotating a second set of portions of the representation of the first user as a part of indicating the position and movement of the first user portion relative to the position and movement of the second user portion in the first manner and shifting a direction of a first portion of the representation of the first user as a part of indicating the position and movement of the first user portion relative to the position and movement of the second user portion in the second manner allows the computer system to automatically indicate the movement of user in different ways based on the selected representation style, which performs an operation when a set of conditions has been met without requiring further user input and provides visual feedback.

In some embodiments, indicating the position and movement of the first user portion (702a-702c, 704a-704f, and/or 706a-706c) relative to the position and movement of the second user portion (702a-702c, 704a-704f, and/or 706a-706c) in the first manner includes moving at least a second portion of the representation of the first user by a first amount to indicate that the first user has moved by a respective amount. In some embodiments, indicating the position and movement of the first user portion relative to the position and movement of the second user portion in the second manner includes moving at least the second portion of the representation (e.g., 716a-716c, 718a-718f, and/or 720a-720c) of the first user by a second amount to indicate that the first user has moved by the respective amount, where the second amount is greater than the first amount. In some embodiments, indicating the position and movement of the first user portion relative to the position and movement of the second user portion in the second manner includes emphasizing the movement of the first user more than the movement of the first user is emphasized to indicate the position and movement of the first user portion relative to the position and movement of the second user portion in the first manner. Moving at least a second portion of the representation of the first user by a first amount to indicate that the first user has moved by a respective amount as a part of indicating the position and movement of the first user portion relative to the position and movement of the second user portion in the first manner and moving at least the second portion of the representation of the first user by a second amount to indicate that the first user has moved by the respective amount as a part of indicating the position and movement of the first user portion relative to the position and movement of the second user portion in the second manner allows the computer system to automatically indicate the movement of user in different ways based on the selected representation style, which performs an operation when a set of conditions has been met without requiring further user input and provides visual feedback.

In some embodiments, moving at least the second portion (e.g., that represents the face of the user and/or head position or face position of the user) of the representation (e.g., 716a-716c, 718a-718f, and/or 720a-720c) of the first user by the second amount to indicate that the first user has moved by the respective amount includes moving the second portion of the representation of the first user by the second amount relative to a third portion (702a-702c, 704a-704f, and/or 706a-706c) (e.g., head of the user) of the representation of the first user. In some embodiments, the second portion of the representation of the first user is positioned on the third portion of the representation of the first user (e.g., to move more when user turns to the left or right without otherwise moving head). Moving the second portion of the representation of the first user by the second amount relative to a third portion of the representation of the first user as a part of moving at least the second portion of the representation of the first user by the second amount to indicate that the first user has moved by the respective amount allows the computer system to automatically indicate that the user's has face has turned left or right while the head of the user has not moved based on the selected representation style, which performs an operation when a set of conditions has been met without requiring further user input and provides visual feedback.

In some embodiments, while displaying the representation of the user and in accordance with a determination that the first set of criteria is satisfied and in accordance with a determination that a set of (e.g., one or more) display criteria for the first representation style (e.g., as described in relation to 718 and/or 726) is satisfied (e.g., irrespective of whether the set of display criteria for the second representation style is satisfied) (e.g., in some embodiments, the set of display criteria are satisfied when lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present), the computer system displays the representation (e.g., 718 and/or 726) of the first user with the first level of detail includes displaying a fourth portion (e.g., a portion that represents a hand, face, head, and/or fingers of the first user) of the representation of the first user. In some embodiments, while displaying the representation of the user and in accordance with a determination that the first set of criteria is satisfied and in accordance with a determination that the set of display criteria for the first representation style (e.g., as described in relation to 718 and/or 726) is not satisfied (e.g., irrespective of whether the set of display criteria for the second representation style is satisfied), displaying the representation of the first user with the first level of detail does not include the computer system displays the fourth portion of the representation of the first user. In some embodiments, while displaying the representation of the user and in accordance with a determination that the second set of criteria is satisfied and in accordance with a determination that a set of (e.g., one or more) display criteria for the second representation style (e.g., as described in relation to 716, 720, and/or 728) is satisfied (e.g., irrespective of whether the set of display criteria for the first representation style is satisfied) (e.g., in some embodiments, the set of display criteria are satisfied when lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present), where the set of display criteria for the first representation style is different from the set of display criteria for the second representation style, the computer system displays the representation (e.g., 716, 720, and/or 728) of the first user with the second level of detail includes displaying the fourth portion of the representation of the first user. In some embodiments, while displaying the representation of the user and in accordance with a determination that the second set of criteria is satisfied and in accordance with a determination that the set of display criteria for the second representation style (e.g., as described in relation to 716, 720, and/or 728) is not satisfied (e.g., irrespective of whether the set of display criteria for the first representation style is satisfied), the computer system displays the representation of the first user with the second level of detail does not include displaying the fourth portion of the representation of the first user. In some embodiments, in response to detecting that the hands (or head) of the user has stopped moving (e.g., based on lack of motion, lack of presence, lack of being detected in the field-of-view of one or more cameras at a particular instance in time, too much motion (e.g., moving too fast) or too little motion (e.g., moving too slow and/or not moving a certain distance (e.g., 0.1-5 mm)) of the portion being detected), the computer system hides (or does not display) the representation of the hands of the user while the computer system is configured to display the representation of the user with the second level of detail but displays (or does not hide) the representation of the hands of the user while the computer system is configured to the display the representation of the user with the first level of detail, or vice-versa. In some embodiments, in response to detecting that the hands (or head) of the user has moved, the computer system does not display and/or hide the representation of the hands of the user while the computer system is configured to the display the representation of the user with the third level of detail (e.g., because displaying third representation of the user and/or the audio representation does not include displaying representations of the body of the user). Displaying or not displaying the fourth portion of the representation of the first user based on prescribed conditions allows the computer system to automatically choose to display the fourth portion of the representation based on the selected representation style and based on display criteria for the particular selected representation style, which performs an operation when a set of conditions has been met without requiring further user input and provides visual feedback.

In some embodiments, at least one of the set of display criteria for the first representation style (e.g., as described in relation to 718 and/or 726) and the set of display criteria for the second representation style (e.g., as described in relation to 716, 720, and/or 728) include a criterion that is satisfied based on motion (e.g., lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present) of a body part (e.g., arms, hands, fingers, set of eyes, and/or head) of the first user. In some embodiments, the fourth portion of the representation of the first user represents a first hand of the first user. Displaying or not displaying the fourth portion of the representation of the first user based on prescribed conditions allows the computer system to automatically choose to display the fourth portion of the representation based on the selected representation style and based on display criteria that includes motion of a body part for the particular selected representation style, which performs an operation when a set of conditions has been met without requiring further user input and provides visual feedback.

In some embodiments, while displaying the fourth representation (e.g., 716, 718, and/or 720) of the user that includes the fourth portion of the representation of the first user that represents the first hand of the first user, the computer system detects a first motion set of characteristics (e.g., lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present) (e.g., of the first hand of the user, of the head of the user, and/or another body part of the user). In some embodiments, in response to detecting the first set of motion characteristics and in accordance with detecting the first set of motion characteristics while the first representation style (e.g., as described in relation to 718 and/or 726) is selected, the computer system ceases to display the fourth portion of the representation of the first user that represents the first hand of the first user (e.g., as described above in relation to FIGS. 7A1-7E). In some embodiments, in response to detecting the first set of motion characteristics and in accordance with detecting the first set of motion characteristics while the second representation style (e.g., as described in relation to 716, 720, and/or 728) is selected, the computer system continues to display the fourth portion of the representation of the first user that represents the first hand of the first user (e.g., as described above in relation to FIGS. 7A1-7E). In some embodiments, while displaying the fourth portion of the representation of the first user in accordance with a determination that the first set of criteria is satisfied and in accordance with a determination that the set of display criteria for the first representation style is satisfied, the computer system detects a request to display the representation of the first user with the second level of detail. In some embodiments, in response to detecting the request to display the representation of the first user with the second level detail and while the set of display criteria for the first representation style continue to be satisfied, the computer system displays, via the display generation component, the representation of the first user with the second level of detail without displaying the fourth portion of the representation of the first user. In some embodiments, the fourth portion of the representation of the first user that represents a second hand of the first user. In some embodiments, the computer system hides a portion of the representation that represents the hands of the first user while displaying the representation of the first user with the second representation style in scenarios where computer system displays a portion of the representation that represents the hands of the first user while displaying the representation of the first user with the second representation style, and/or vice-versa. Displaying the first hand of the first user in certain situations while the first user is displayed with the first level of detail and not displaying the hand of the first user in the same situations while the first user is displayed with the second level of detail allows the computer system to display or not display the hand of the user in certain situations based on the selected representation style, which performs an operation when a set of conditions has been met without requiring further user input and provides visual feedback.

In some embodiments, while displaying the fourth representation of the user that includes the fourth portion of the representation of the first user that represents the first hand of the first user, the computer system detects a set of (e.g., one or more) second motion characteristics (e.g., lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present) (e.g., of the first hand of the user, of the head of the user, and/or another body part of the user). In some embodiments, in response to detecting the second set of motion characteristics and in accordance with detecting the second set of motion characteristics while the first representation style (e.g., as described in relation to 718 and/or 726) is selected (and/or in accordance with a determination that the first representation has been selected), the computer system continues to display the fourth portion of the representation of the first user that represents the first hand of the first user. In some embodiments, in response to detecting the second set of motion characteristics and in accordance with detecting the second set of motion characteristics while the second representation style (e.g., as described in relation to 716, 720, and/or 728) is selected (and/or in accordance with a determination that the second representation has been selected), the computer system ceases to display the fourth portion of the representation of the first user that represents the first hand of the first user. In some embodiments, the first set of motion characteristics are different from (e.g., different levels and/or amounts of motions are detected) the second set of motion characteristics (e.g., the first hand of the user is moved and/or not moved in different ways and/or in different situations). In some embodiments, while displaying the fourth portion of the representation of the first user in accordance with a determination that the second set of criteria is satisfied and in accordance with a determination that the set of display criteria for the second representation style is satisfied, the computer system detects a request to display the representation of the first user with the first level of detail. In some embodiments, in response to detecting the request to display the representation of the first user with the first level detail and while the set of display criteria for the second representation style continue to be satisfied, the computer system displays, via the display generation component, the representation of the first user with the first level of detail without displaying the fourth portion of the representation of the first user. In some embodiments, the fourth portion of the representation of the first user that represents a third hand of the first user. Displaying the hand of the first user in certain situations while the first user is displayed with the second level of detail and not displaying the hand of the first user in the same situations while the first user is displayed with the first level of detail allows the computer system to display or not display the hand of the user in certain situations based on the selected representation style, which performs an operation when a set of conditions has been met without requiring further user input and provides visual feedback.

In some embodiments, at least one of the set of display criteria for the first representation style (e.g., as described in relation to 718 and/or 726) and the set of display criteria for the second representation style (e.g., as described in relation to 716, 720, and/or 728) include a criterion that is satisfied based a detected gaze direction (e.g., direction of the gaze of the first user, such as in a North, South, East, West, or any combination thereof direction) of the first user. In some embodiments, the fourth portion of the representation of the first user that represents a first set (e.g., one or more) of eyes of the first user. Displaying or not displaying the fourth portion of the representation of the first user based on prescribed conditions allows the computer system to automatically choose to display the fourth portion of the representation based on the selected representation style and based on display criteria that includes detecting the gaze direction of the first user for the particular selected representation style, which performs an operation when a set of conditions has been met without requiring further user input and provides visual feedback.

In some embodiments, while displaying the fourth representation (e.g., 716, 718, and/or 720) of the user that includes the fourth portion of the representation of the first user that represents the first set of eyes of the first user, the computer system detects a third set (e.g., one or more) of motion characteristics (e.g., lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present) (e.g., of the first hand of the user, of the head of the user, and/or another body part of the user). In some embodiments, in response to detecting the third set of motion characteristics and in accordance with detecting the third set of motion characteristics while the first representation style (e.g., as described in relation to 718 and/or 726) is selected and/or in accordance with a determination that the first representation has been selected), the computer system ceases to display the fourth portion of the representation of the first user that represents the first set of eyes of the first user. In some embodiments, in response to detecting the third set of motion characteristics and in accordance with detecting the third set of motion characteristics while the second representation style (e.g., as described in relation to 716, 720, and/or 728) is selected and/or in accordance with a determination that the second representation has been selected), the computer system continues to display the fourth portion of the representation of the first user that represents the first set of eyes of the first user. In some embodiments, while displaying the fourth portion of the representation of the first user in accordance with a determination that the first set of criteria is satisfied and in accordance with a determination that the set of display criteria for the first representation style (e.g., as described in relation to 718 and/or 726) is satisfied, the computer system detects a request to display the representation of the first user with the second level of detail. In some embodiments, in response to detecting the request to display the representation of the first user with the second level detail and while the set of display criteria for the first representation style (e.g., as described in relation to 718 and/or 726) continue to be satisfied, the computer system displays, via the display generation component, the representation of the second level of detail without displaying the fourth portion of the representation of the first user. In some embodiments, the fourth portion of the representation of the first user that represents a second set of eyes of the first user. In some embodiments, the computer system hides a portion of the representation that represents the set of eyes of the first user while displaying the representation of the first user with the second representation style in scenarios where computer system displays a portion of the representation that represents the set of eyes of the first user while displaying the representation of the first user with the second representation style, and/or vice-versa. Displaying the set of eyes of the first user in certain situations while the first user is displayed with the first level of detail and not displaying the set of eyes of the first user in the same situations while the first user is displayed with the second level of detail allows the computer system to display or not display the set of eyes of the user in certain situations based on the selected representation style, which performs an operation when a set of conditions has been met without requiring further user input and provides visual feedback.

In some embodiments, while displaying the fourth representation (e.g., 716, 718, and/or 720) of the user that includes the fourth portion of the representation of the first user that represents the first set of eyes of the first user, the computer system detects a fourth set (e.g., one or more) of motion characteristics (e.g., lack of motion of a portion (e.g., body part, hands, and/or head) of the user being detected, the lack of the portion of the user being detected in the field-of-view of one or more cameras, too much motion (e.g., moving too fast) or too little motion (e.g., moving too slow and/or not moving a certain distance (e.g., 0.1-5 mm)) of the portion being detected, and/or the lack of the portion of the user being present) (e.g., of the first hand of the user, of the head of the user, and/or another body part of the user). In some embodiments, in response to detecting the fourth set of motion characteristics and in accordance with a detecting the fourth set of motion characteristics while the first representation style (e.g., as described in relation to 718 and/or 726) is selected (and/or in accordance with a determination that the first representation has been selected), the computer system continues to display the fourth portion of the representation of the first user that represents the first set of eyes of the first user. In some embodiments, in response to detecting the fourth set of motion characteristics and in accordance with detecting the fourth set of motion characteristics while the second representation style (e.g., as described in relation to 716, 720, and/or 728) is selected (and/or in accordance with a determination that the second representation has been selected), the computer system ceases to display the fourth portion of the representation of the first user that represents the first set of eyes of the first user. In some embodiments, the third set of motion characteristics are different from the fourth set of motion characteristics. In some embodiments, while displaying the fourth portion of the representation of the first user in accordance with a determination that the second set of criteria is satisfied and in accordance with a determination that the set of display criteria for the second representation style is satisfied, the computer system detects a request to display the representation of the first user with the first level of detail. In some embodiments, in response to detecting the request to display the representation of the first user with the first level detail and while the set of display criteria for the second representation style continue to be satisfied, the computer system displays, via the display generation component, the representation of the first user with the first level of detail without displaying the fourth portion of the representation of the first user. In some embodiments, the fourth portion of the representation of the first user that represents a third set (e.g., one or more) of eyes of the first user. Displaying the set of eyes of the first user in certain situations while the first user is displayed with the second level of detail and not displaying the set of eyes of the first user in the same situations while the first user is displayed with the first level of detail allows the computer system to display or not display the set of eyes of the user in certain situations based on the selected representation style, which performs an operation when a set of conditions has been met without requiring further user input and provides visual feedback.

In some embodiments, displaying the representation (e.g., 716, 718, and/or 720) of the first user with the first level of detail includes displaying a representation (e.g., 716a, 718a, and/or 720a) of a first set (e.g., one or more) of facial expressions (e.g., detected facial expressions (e.g., a smile, a frown, a happy facial expression, an angry facial expression, an upset facial expression, and/or a joyful facial expression)) of the first user. In some embodiments, displaying the representation of the first user with the second level of detail does not include displaying the representation of the first set of facial expressions (e.g., detected facial expressions) of the first user. In some embodiments, in response to detecting that the first user has performed a facial expression: in accordance with a determination that the representation of the first user is displayed with the first level of detail, the computer system changes the representation of the first user to represent the facial expression; and in accordance with a determination that the representation of the first user is displayed with the second level of detail, the computer system does not the representation of the first user to represent the facial expression (and/or forgoes to change the representation of the first user based on the detecting that the facial expression has been performed). Displaying or not displaying one or more facial expressions based on the selected representation style allows the computer system to automatically choose whether to display one or more facial expressions, which performs an operation when a set of conditions has been met without requiring further user input and increases security for the user.

In some embodiments, displaying the representation of the first user with the first level of detail includes displaying a representation (e.g., 718 and/or 726) of one or more features (e.g., eyes, nose, mouth, ears, fingers, and/or markings on face and/or hands) of a face of the first user. In some embodiments, displaying the representation of the first user with the second level of detail does not include displaying the representation of one or more features of a face of the first user. Displaying or not displaying one or more features of a face of the first user based on the selected representation style allows the computer system to automatically choose whether to display one or more features of the face of the first user, which performs an operation when a set of conditions has been met without requiring further user input and increases security for the user.

In some embodiments, while displaying the representation of the first user, the computer system detects a set of (e.g., one or more) hand motions of the user. In some embodiments, in response to detecting the set of hand motions of the user (e.g., a hand waving, pointing, clapping, touching, gliding, snapping, pinching, and/or sliding motion) and in accordance with a detecting the set of hand motions while the first representation style (e.g., as described in relation to 718 and/or 726) is selected, the computer system updates the indication of the position and movement of the first user portion relative to the position and movement of the second user portion to indicate the set of hand motions of the user (e.g., changing the representation of the first user to indicate the set hand motions of the user (e.g., a hand waving, pointing, clapping, touching, gliding, snapping, pinching, and/or sliding motion)). In some embodiments, in response to detecting the set of hand motions of the user (e.g., a hand waving, pointing, clapping, touching, gliding, snapping, pinching, and/or sliding motion) and in accordance with a detecting the set of hand motions while the second representation style (e.g., as described in relation to 716, 720, and/or 728) is selected, the computer system forgoes updating the indication of the position and movement of the first user portion relative to the position and movement of the second user portion to indicate the set of hand motions of the user. In some embodiments, indicating the position and movement of the first user portion relative to the position and movement of the second user portion in the first manner includes changing the representation of the first user to indicate the set of hand motions of the user (e.g., a hand waving, pointing, clapping, touching, gliding, snapping, pinching, and/or sliding motion); and indicating the position and movement of the first user portion relative to the position and movement of the second user portion in the second manner includes forgoing changing the representation of the first user to indicate the first of hand motions of the user. Changing or not changing the representation of the first user to indicate a set of hand motions based on the selected representation style allows the computer system to automatically choose whether to change the representation of the first user to indicate a set of hand motions, which performs an operation when a set of conditions has been met without requiring further user input and increases security for the user.

In some embodiments, displaying the representation of the first user with the first level of detail includes displaying a representation of a set of (e.g., one or more) features (e.g., fingers, thumbs, hand markings, finger joints, and/or fingernails) of a hand of the first user. In some embodiments, displaying the representation of the first user with the second level of detail does not include displaying the representation of the set of features of the hand of the first user. Displaying or not displaying the representation of one or more features of the hand of the first user based on the selected representation style allows the computer system to automatically choose whether to display the representation of the first user to indicate a set of features of the hand of the user, which performs an operation when a set of conditions has been met without requiring further user input and increases security for the user.

In some embodiments, displaying the representation of the first user with the first level of detail includes displaying a representation of the body (e.g., a middle or central portion of the user; the portion of the user that does not include the head and/or hands of the user; a portion of the user that contains one or more vital organs of the user, and/or the mid-section, chest, and/or chest of the user) of the first user. In some embodiments, displaying the representation of the first user with the second level of detail does not include displaying a representation of the body of the first user. Displaying or not displaying the representation of the first user with a representation of the body of the first user based on the selected representation style allows the computer system to automatically choose whether to display the representation of the first user with a representation of the body of the first user, which performs an operation when a set of conditions has been met without requiring further user input and increases security for the user, reduces (or avoids) processing, displaying, and/or network bandwidth costs of generating and/or displaying the body of the user (e.g., between multiple devices), and provides additional privacy by not showing information concerning the position of the body of the user.

In some embodiments, while displaying the representation of the first user, the computer system detects a change to a second set (e.g., one or more) of facial expressions of the user (e.g., detected facial expressions (e.g., a smile, a frown, a happy facial expression, an angry facial expression, an upset facial expression, and/or a joyful facial expression)). In some embodiments, in response to detecting the change in the second set of facial expressions of the user and in accordance with detecting the change in the second set of facial expressions is detected while the first representation style (e.g., as described in relation to 718 and/or 726) is selected, the computer system displays an indication that one or more of the facial expressions of the user has changed (e.g., updating or displaying a representation of the second set of facial expressions (e.g., detected facial expressions (e.g., a smile, a frown, a happy facial expression, an angry facial expression, an upset facial expression, and/or a joyful facial expression)) of the first user). In some embodiments, in response to detecting the change in the second set of facial expressions of the user and in accordance with detecting the change in the second set of facial expressions while the first representation style is selected, the computer system forgoes displaying the indication that one or more of the facial expressions of the user has changed (e.g., forgoing updating or not displaying the representation of the second set of facial expressions (e.g., detected facial expressions (e.g., a smile, a frown, a happy facial expression, an angry facial expression, an upset facial expression, and/or a joyful facial expression)) of the first user). Displaying or not displaying one or more facial expressions based on the selected representation style allows the computer system to automatically choose whether to display one or more facial expressions, which performs an operation when a set of conditions has been met without requiring further user input and increases security for the user.

In some embodiments, aspects/operations of method 900 may be interchanged, substituted, and/or added between these methods. For example, the representation of the first user discussed in method 900 can be displayed using the techniques of method 800. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during regis- tration for services or anytime thereafter. In another example, users can select not to provide data for display of avatars. In yet another example, users can select to limit the length of time data is maintained or entirely prohibit the development of the display of avatars. In addition to pro- viding "opt in" and "opt out" options, the present disclosure contemplates providing notifications relating to the access or use of personal information. For instance, a user may be notified upon downloading an app that their personal infor- mation data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identi- fiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components, the computer system comprising:
   one or more processors; and
   memory storing one or more programs configured to be executed by the one or more processors, the one or more programs including instructions for:
      while in a real-time communication session, display- ing, via the one or more display generation compo- nents, a representation of a first user, wherein:
         in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and move- ment of a second user portion in a first manner; and
         in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

2. The computer system of claim 1, the one or more programs further including instructions for:
   while the first representation style is selected, detecting an input; and
   in response to detecting the input, selecting the second representation style and deselecting the first represen- tation style.

3. The computer system of claim 1, wherein the first set of criteria includes a criterion that is satisfied when a determination is made that the first user is a registered user, and the second set of criteria includes a criterion that is satisfied when a determination is made that the first user is a guest user.

4. The computer system of claim 1, wherein the first set of criteria includes a criterion that is satisfied when a determination is made that the first user has completed a user representation enrollment process, and the second set of criteria includes a criterion that is satisfied when a determi- nation is not made that the first user has completed the user representation enrollment process.

5. The computer system of claim 1, wherein displaying the representation of the first user includes:
   in accordance with a determination that a third set of criteria is satisfied, where the third set of criteria includes a criterion that is satisfied when a third rep- resentation style is selected, and where the third rep- resentation style is different from the first representa- tion style and the second representation style, the representation of the first user is displayed with a third level of detail that is lower than the second level of detail and the first level of detail.

6. The computer system of claim 5, wherein the repre- sentation of the first user displayed with the third level of detail does not indicate the position and/or movement of the first user portion relative to the position and movement of the second user portion.

7. The computer system of claim 1, the one or more programs further including instructions for:
   while in the real-time communication session, displaying a representation of a second user with the second level of detail concurrently with the representation of the first user, wherein the second user is different from the first user, and wherein:
      while displaying the representation of the first user with the second level of detail in accordance with a determination that the second set of criteria is satis- fied, the representation of the first user displayed with the second level of detail is a first color and the representation of the second user displayed with the second level of detail is a second color that is different from the first color.

8. The computer system of claim 7, wherein the first color corresponds to an annotation associated with the first user, and wherein the second color corresponds to an annotation associated with a second user.

9. The computer system of claim 1, the one or more programs further including instructions for:

while in the real-time communication session, displaying a representation of a third user with the first level of detail concurrently with the representation of the first user, wherein the third user is different from the first user, and wherein:

while displaying the representation of the first user with the first level of detail in accordance with a determination that the first set of criteria is satisfied, the representation of the first user displayed with the first level of detail includes one or more features that are different from one or more features of the representation of the third user displayed with the first level of detail.

10. The computer system of claim 1, wherein the representation of the first user displayed with the first level of detail is displayed with lighting that has a respective visual property and the representation of the first user displayed with the second level of detail is displayed with the respective visual property.

11. The computer system of claim 1, wherein:

indicating the position and movement of the first user portion relative to the position and movement of the second user portion in the first manner includes changing a first set of one or more portions of the representation of the first user, where the first set of the one or more portions represents one or more sub-features of the first user; and indicating the position and movement of the first user portion relative to the position and movement of the second user portion in the second manner includes changing an outline of the representation of the first user.

12. The computer system of claim 1, wherein:

indicating the position and movement of the first user portion relative to the position and movement of the second user portion in the first manner includes rotating a second set of portions of the representation of the first user, wherein the second set of portions represents one or more sub-features of the first user; and indicating the position and movement of the first user portion relative to the position and movement of the second user portion in the second manner includes shifting a direction of a first portion of the representation of the first user.

13. The computer system of claim 1, wherein:

indicating the position and movement of the first user portion relative to the position and movement of the second user portion in the first manner includes moving at least a second portion of the representation of the first user by a first amount to indicate that the first user has moved by a respective amount; and indicating the position and movement of the first user portion relative to the position and movement of the second user portion in the second manner includes moving at least the second portion of the representation of the first user by a second amount to indicate that the first user has moved by the respective amount, where the second amount is greater than the first amount.

14. The computer system of claim 13, wherein moving at least the second portion of the representation of the first user by the second amount to indicate that the first user has moved by the respective amount includes moving the second portion of the representation of the first user by the second amount relative to a third portion of the representation of the first user, and wherein the second portion of the representation of the first user is positioned on the third portion of the representation of the first user.

15. The computer system of claim 1, the one or more programs further including instructions for:

while displaying the representation of the first user:

in accordance with a determination that the first set of criteria is satisfied and in accordance with a determination that a set of display criteria for the first representation style is satisfied displaying the representation of the first user with the first level of detail includes displaying a fourth portion of the representation of the first user;

in accordance with a determination that the first set of criteria is satisfied and in accordance with a determination that the set of display criteria for the first representation style is not satisfied, displaying the representation of the first user with the first level of detail does not include displaying the fourth portion of the representation of the first user;

in accordance with a determination that the second set of criteria is satisfied and in accordance with a determination that a set of display criteria for the second representation style is satisfied, where the set of display criteria for the first representation style is different from the set of display criteria for the second representation style, displaying the representation of the first user with the second level of detail includes displaying the fourth portion of the representation of the first user; and in accordance with a determination that the second set of criteria is satisfied and in accordance with a determination that the set of display criteria for the second representation style is not satisfied, displaying the representation of the first user with the second level of detail does not include displaying the fourth portion of the representation of the first user.

16. The computer system of claim 15, wherein at least one of the set of display criteria for the first representation style and the set of display criteria for the second representation style include a criterion that is satisfied based on motion of a body part of the first user, and wherein the fourth portion of the representation of the first user represents a first hand of the first user.

17. The computer system of claim 16, the one or more programs further including instructions for:

while displaying the representation of the first user that includes the fourth portion of the representation of the first user that represents the first hand of the first user, detecting a first motion set of characteristics; and in response to detecting the first set of motion characteristics:

in accordance with detecting the first set of motion characteristics while the first representation style is selected, ceasing to display the fourth portion of the representation of the first user that represents the first hand of the first user; and in accordance with detecting the first set of motion characteristics while the second representation style is selected, continuing to display the fourth portion of the representation of the first user that represents the first hand of the first user.

18. The computer system of claim 16, the one or more programs further including instructions for:

while displaying the representation of the first user that includes the fourth portion of the representation of the first user that represents the first hand of the first user, detecting a set of second motion characteristics; and in response to detecting the second set of motion characteristics:

in accordance with detecting the second set of motion characteristics while the first representation style is selected continuing to display the fourth portion of the representation of the first user that represents the first hand of the first user; and in accordance with detecting the second set of motion characteristics while the second representation style is selected, ceasing to display the fourth portion of the representation of the first user that represents the first hand of the first user.

19. The computer system of claim 15, wherein at least one of the set of display criteria for the first representation style and the set of display criteria for the second representation style include a criterion that is satisfied based a detected gaze direction of the first user, and wherein the fourth portion of the representation of the first user that represents a first set of eyes of the first user.

20. The computer system of claim 19, the one or more programs further including instructions for:

while displaying the representation of the first user that includes the fourth portion of the representation of the first user that represents the first set of eyes of the first user, detecting a third set of motion characteristics; and in response to detecting the third set of motion characteristics:

in accordance with detecting the third set of motion characteristics while the first representation style is selected, ceasing to display the fourth portion of the representation of the first user that represents the first set of eyes of the first user; and in accordance with detecting the third set of motion characteristics while the second representation style is selected, continuing to display the fourth portion of the representation of the first user that represents the first set of eyes of the first user.

21. The computer system of claim 19, the one or more programs further including instructions for:

while displaying the representation of the first user that includes the fourth portion of the representation of the first user that represents the first set of eyes of the first user, detecting a fourth set of motion characteristics; and in response to detecting the fourth set of motion characteristics:

in accordance with a detecting the fourth set of motion characteristics while the first representation style is selected, continuing to display the fourth portion of the representation of the first user that represents the first set of eyes of the first user; and in accordance with detecting the fourth set of motion characteristics while the second representation style is selected, ceasing to display the fourth portion of the representation of the first user that represents the first set of eyes of the first user.

22. The computer system of claim 1, wherein:

displaying the representation of the first user with the first level of detail includes displaying a representation of a first set of facial expressions of the first user; and displaying the representation of the first user with the second level of detail does not include displaying the representation of the first set of facial expressions of the first user.

23. The computer system of claim 1, wherein:

displaying the representation of the first user with the first level of detail includes displaying a representation of one or more features of a face of the first user; and displaying the representation of the first user with the second level of detail does not include displaying the representation of one or more features of a face of the first user.

24. The computer system of claim 1, wherein:

while displaying the representation of the first user, detecting a set of hand motions of the first user; and in response to detecting the set of hand motions of the first user:

in accordance with detecting the set of hand motions while the first representation style is selected, updating the indication of the position and movement of the first user portion relative to the position and movement of the second user portion to indicate the set of hand motions of the first user; and in accordance with detecting the set of hand motions while the second representation style is selected, forgoing updating the indication of the position and movement of the first user portion relative to the position and movement of the second user portion to indicate the set of hand motions of the first user.

25. The computer system of claim 1, wherein:

displaying the representation of the first user with the first level of detail includes displaying a representation of a set of features of a hand of the first user; and displaying the representation of the first user with the second level of detail does not include displaying the representation of the set of features of the hand of the first user.

26. The computer system of claim 1, wherein:

displaying the representation of the first user with the first level of detail includes displaying a representation of a body of the first user; and displaying the representation of the first user with the second level of detail does not include displaying a representation of the body of the first user.

27. The computer system of claim 1, the one or more programs further including instructions for:

while displaying the representation of the first user, detecting a change to a second set of facial expressions of the first user; and in response to detecting the change in the second set of facial expressions of the first user:

in accordance with detecting the change in the second set of facial expressions while the first representation style is selected, displaying an indication that one or more of the facial expressions of the first user has changed; and in accordance with detecting the change in the second set of facial expressions while the first representation style is selected, forgoing displaying the indication that one or more of the facial expressions of the user has changed.

28. A non-transitory computer-readable storage medium storing one or more programs configured to be executed by one or more processors of a computer system that is in communication with one or more display generation components, the one or more programs including instructions for:

while in a real-time communication session, displaying, via the one or more display generation components, a representation of a first user, wherein:

in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

29. The non-transitory computer-readable storage medium of claim 28, the one or more programs further including instructions for:

while in the real-time communication session, displaying a representation of a second user with the second level of detail concurrently with the representation of the first user, wherein the second user is different from the first user, and wherein:

while displaying the representation of the first user with the second level of detail in accordance with a determination that the second set of criteria is satisfied, the representation of the first user displayed with the second level of detail is a first color and the representation of the second user displayed with the second level of detail is a second color that is different from the first color.

30. The non-transitory computer-readable storage medium of claim 28, the one or more programs further including instructions for:

while in the real-time communication session, displaying a representation of a third user with the first level of detail concurrently with the representation of the first user, wherein the third user is different from the first user, and wherein:

while displaying the representation of the first user with the first level of detail in accordance with a determination that the first set of criteria is satisfied, the representation of the first user displayed with the first level of detail includes one or more features that are different from one or more features of the representation of the third user displayed with the first level of detail.

31. The non-transitory computer-readable storage medium of claim 28, wherein:

indicating the position and movement of the first user portion relative to the position and movement of the second user portion in the first manner includes changing a first set of one or more portions of the representation of the first user, where the first set of the one or more portions represents one or more sub-features of the first user; and indicating the position and movement of the first user portion relative to the position and movement of the second user portion in the second manner includes changing an outline of the representation of the first user.

32. The non-transitory computer-readable storage medium of claim 28, wherein:

indicating the position and movement of the first user portion relative to the position and movement of the second user portion in the first manner includes rotating a second set of portions of the representation of the first user, wherein the second set of portions represents one or more sub-features of the first user; and indicating the position and movement of the first user portion relative to the position and movement of the second user portion in the second manner includes shifting a direction of a first portion of the representation of the first user.

33. The non-transitory computer-readable storage medium of claim 28, wherein:

indicating the position and movement of the first user portion relative to the position and movement of the second user portion in the first manner includes moving at least a second portion of the representation of the first user by a first amount to indicate that the first user has moved by a respective amount; and indicating the position and movement of the first user portion relative to the position and movement of the second user portion in the second manner includes moving at least the second portion of the representation of the first user by a second amount to indicate that the first user has moved by the respective amount, where the second amount is greater than the first amount.

34. The non-transitory computer-readable storage medium of claim 28, wherein:

displaying the representation of the first user with the first level of detail includes displaying a representation of a first set of facial expressions of the first user; and displaying the representation of the first user with the second level of detail does not include displaying the representation of the first set of facial expressions of the first user.

35. The non-transitory computer-readable storage medium of claim 28, wherein:

displaying the representation of the first user with the first level of detail includes displaying a representation of one or more features of a face of the first user; and displaying the representation of the first user with the second level of detail does not include displaying the representation of one or more features of a face of the first user.

36. The non-transitory computer-readable storage medium of claim 28, wherein:

while displaying the representation of the first user, detecting a set of hand motions of the first user; and in response to detecting the set of hand motions of the first user:

in accordance with detecting the set of hand motions while the first representation style is selected, updating the indication of the position and movement of the first user portion relative to the position and movement of the second user portion to indicate the set of hand motions of the first user; and in accordance with detecting the set of hand motions while the second representation style is selected, forgoing updating the indication of the position and movement of the first user portion relative to the position and movement of the second user portion to indicate the set of hand motions of the first user.

37. The non-transitory computer-readable storage medium of claim 28, wherein:

displaying the representation of the first user with the first level of detail includes displaying a representation of a set of features of a hand of the first user; and displaying the representation of the first user with the second level of detail does not include displaying the representation of the set of features of the hand of the first user.

38. The non-transitory computer-readable storage medium of claim 28, the one or more programs further including instructions for:

while displaying the representation of the first user, detecting a change to a second set of facial expressions of the first user; and in response to detecting the change in the second set of facial expressions of the first user:

in accordance with detecting the change in the second set of facial expressions while the first representation style is selected, displaying an indication that one or more of the facial expressions of the first user has changed; and in accordance with detecting the change in the second set of facial expressions while the first representation style is selected, forgoing displaying the indication that one or more of the facial expressions of the first user has changed.

39. A method, comprising:

at a computer system that is in communication with one or more display generation components:

while in a real-time communication session, displaying, via the one or more display generation components, a representation of a first user, wherein:

in accordance with a determination that a first set of criteria is satisfied, where the first set of criteria includes a criterion that is satisfied when a first representation style is selected, the representation of the first user is displayed with a first level of detail and indicates a position and movement of a first user portion relative to a position and movement of a second user portion in a first manner; and in accordance with a determination that a second set of criteria is satisfied, where the second set of criteria includes a criterion that is satisfied when a second representation style is selected, and where the second representation style is different from the first representation style, the representation of the first user is displayed with a second level of detail that is lower than the first level of detail and indicates the position and movement of the first user portion relative to the position and movement of the second user portion in a second manner that is different from the first manner.

40. The method of claim 39, further comprising:

while in the real-time communication session, displaying a representation of a second user with the second level of detail concurrently with the representation of the first user, wherein the second user is different from the first user, and wherein:

while displaying the representation of the first user with the second level of detail in accordance with a determination that the second set of criteria is satisfied, the representation of the first user displayed with the second level of detail is a first color and the representation of the second user displayed with the second level of detail is a second color that is different from the first color.

41. The method of claim 39, further comprising:

while in the real-time communication session, displaying a representation of a third user with the first level of detail concurrently with the representation of the first user, wherein the third user is different from the first user, and wherein:

while displaying the representation of the first user with the first level of detail in accordance with a determination that the first set of criteria is satisfied, the representation of the first user displayed with the first level of detail includes one or more features that are different from one or more features of the representation of the third user displayed with the first level of detail.

42. The method of claim 39, wherein:

indicating the position and movement of the first user portion relative to the position and movement of the second user portion in the first manner includes changing a first set of one or more portions of the representation of the first user, where the first set of the one or more portions represents one or more sub-features of the first user; and indicating the position and movement of the first user portion relative to the position and movement of the second user portion in the second manner includes changing an outline of the representation of the first user.

43. The method of claim 39, wherein:

indicating the position and movement of the first user portion relative to the position and movement of the second user portion in the first manner includes rotating a second set of portions of the representation of the first user, wherein the second set of portions represents one or more sub-features of the first user; and indicating the position and movement of the first user portion relative to the position and movement of the second user portion in the second manner includes shifting a direction of a first portion of the representation of the first user.

44. The method of claim 39, wherein:

indicating the position and movement of the first user portion relative to the position and movement of the second user portion in the first manner includes moving at least a second portion of the representation of the first user by a first amount to indicate that the first user has moved by a respective amount; and indicating the position and movement of the first user portion relative to the position and movement of the second user portion in the second manner includes moving at least the second portion of the representation of the first user by a second amount to indicate that the first user has moved by the respective amount, where the second amount is greater than the first amount.

45. The method of claim 39, wherein:

displaying the representation of the first user with the first level of detail includes displaying a representation of a first set of facial expressions of the first user; and displaying the representation of the first user with the second level of detail does not include displaying the representation of the first set of facial expressions of the first user.

46. The method of claim 39, wherein:

displaying the representation of the first user with the first level of detail includes displaying a representation of one or more features of a face of the first user; and displaying the representation of the first user with the second level of detail does not include displaying the representation of one or more features of a face of the first user.

47. The method of claim 39, wherein:

while displaying the representation of the first user, detecting a set of hand motions of the first user; and in response to detecting the set of hand motions of the first user:

in accordance with detecting the set of hand motions while the first representation style is selected, updating the indication of the position and movement of the first user portion relative to the position and movement of the second user portion to indicate the set of hand motions of the first user; and in accordance with detecting the set of hand motions while the second representation style is selected, forgoing updating the indication of the position and movement of the first user portion relative to the position and movement of the second user portion to indicate the set of hand motions of the first user.

48. The method of claim 39, wherein:

displaying the representation of the first user with the first level of detail includes displaying a representation of a set of features of a hand of the first user; and displaying the representation of the first user with the second level of detail does not include displaying the representation of the set of features of the hand of the first user.

49. The method of claim 39, further comprising:

while displaying the representation of the first user, detecting a change to a second set of facial expressions of the first user; and in response to detecting the change in the second set of facial expression of the first user:

in accordance with detecting the change in the second set of facial expression while the first representation style is selected, displaying an indication that one or more of the facial expressions of the first user has changed; and in accordance with detecting the change in the second set of facial expressions while the first representation style is selected, forgoing displaying the indication that one or more of the facial expressions of the first user has changed.

\* \* \* \* \*